US012728777B2

(12) United States Patent
Akutsu et al.

(10) Patent No.: US 12,728,777 B2
(45) Date of Patent: Sep. 8, 2026

(54) CONVEYANCE SEAT

(71) Applicant: TS TECH CO., LTD., Asaka (JP)

(72) Inventors: Shuichi Akutsu, Tochigi (JP); Hirokazu Onitsuka, Tochigi (JP); Kazuya Aoki, Tochigi (JP); Kazuya Inoue, Tochigi (JP); Soichiro Tanaka, Tochigi (JP)

(73) Assignee: TS TECH CO., LTD., Asaka (JP)

( * ) Notice: Subject to any disclaimer, the term of this patent is extended or adjusted under 35 U.S.C. 154(b) by 165 days.

(21) Appl. No.: 18/561,949

(22) PCT Filed: May 24, 2022

(86) PCT No.: PCT/JP2022/021271
§ 371 (c)(1),
(2) Date: Nov. 17, 2023

(87) PCT Pub. No.: WO2022/250056
PCT Pub. Date: Dec. 1, 2022

(65) Prior Publication Data

US 2024/0227644 A1 Jul. 11, 2024

Related U.S. Application Data

(60) Provisional application No. 63/289,264, filed on Dec. 14, 2021.

(30) Foreign Application Priority Data

May 26, 2021 (JP) ................................ 2021-088331
May 26, 2021 (JP) ................................ 2021-088332

(51) Int. Cl.
*B60N 2/58* (2006.01)
*B60N 2/60* (2006.01)
*B60N 2/70* (2006.01)

(52) U.S. Cl.
CPC ............ *B60N 2/5825* (2013.01); *B60N 2/58* (2013.01); *B60N 2/5816* (2013.01); *B60N 2/60* (2013.01); *B60N 2/6018* (2013.01); *B60N 2/7041* (2013.01)

(58) Field of Classification Search
CPC ...... B60N 2/58; B60N 2/5816; B60N 2/5825; B60N 2/60; B60N 2/6018; B60N 2/7041
(Continued)

(56) References Cited

U.S. PATENT DOCUMENTS 4,789,201 A * 12/1988 Selbert ................ B60N 2/5825 297/218.1 X
4,865,379 A * 9/1989 Aoki ........................ B60N 2/70 297/452.27 X (Continued)

FOREIGN PATENT DOCUMENTS

CN 101968826 A 2/2011
DE 19535181 A1 3/1997

(Continued)

OTHER PUBLICATIONS

PCT International Search Report (w/ English translation) for corresponding PCT Application No. PCT/JP2022/021271, mailed Jul. 26, 2022, 6 pages.

(Continued)

*Primary Examiner* — Rodney B White
(74) *Attorney, Agent, or Firm* — Dority & Manning, P.A.

(57) ABSTRACT

There is provided a conveyance seat in which in a seat pad composed of two layers of pad members, the number of components is reduced by fixing a skin to the seat pad without using a locking member such as a clip. A conveyance seat includes a seat pad; and a skin covering the seat pad. The seat pad includes a first pad member and a second pad member harder than the first pad member. The second (Continued)

pad member is provided with a protruding portion integrally formed with the second pad member to lock the skin. The skin is provided with a locked portion locked to the protruding portion.

11 Claims, 47 Drawing Sheets

(58) Field of Classification Search
USPC .............................. 297/218.1, 218.2, 452.27
See application file for complete search history.

(56) References Cited

U.S. PATENT DOCUMENTS

| | | | | |
|---|---|---|---|---|
| 5,028,472 | A * | 7/1991 | Gray | B60N 2/60 297/218.1 X |
| 5,338,092 | A | 8/1994 | Wiltsey et al. | |
| 5,630,240 | A * | 5/1997 | Matsuoka | B60N 2/58 297/452.27 X |
| 5,654,069 | A * | 8/1997 | Matsuoka | B29C 44/0469 297/228.13 X |
| 5,702,159 | A * | 12/1997 | Matsuoka | B60N 2/5875 297/218.2 X |
| 5,716,096 | A * | 2/1998 | Pryde | B60N 2/609 297/228.11 |
| 5,931,538 | A * | 8/1999 | Cayet | B60N 2/58 297/229 |
| 6,089,657 | A * | 7/2000 | Banno | A47C 7/029 297/218.1 |
| 8,360,530 | B2 * | 1/2013 | Onoda | B60N 2/7035 297/452.27 X |
| 8,662,560 | B2 * | 3/2014 | Galbreath | B60N 2/015 297/452.27 X |
| 10,682,939 | B2 * | 6/2020 | Araki | B60N 2/7017 |
| 2009/0146472 | A1 * | 6/2009 | Galbreath | B60N 2/646 297/452.27 X |
| 2010/0259079 | A1 * | 10/2010 | Matsuzaki | B60N 2/5883 297/218.2 X |
| 2011/0018300 | A1 | 1/2011 | Galbreath et al. | |
| 2012/0126606 | A1 | 5/2012 | Takakura et al. | |
| 2016/0129820 | A1 | 5/2016 | Cloutier | |
| 2018/0272905 | A1 | 9/2018 | Ruff et al. | |
| 2019/0100122 | A1 | 4/2019 | Hagedorn et al. | |
| 2023/0211712 | A1 | 7/2023 | Tsurumi et al. | |

FOREIGN PATENT DOCUMENTS

| | | | |
|---|---|---|---|
| DE | 202011005145 | U1 | 6/2012 |
| DE | 102011012367 | | 8/2012 |
| DE | 102012003243 | A1 | 8/2012 |
| JP | S57102352 | U | 6/1982 |
| JP | S5898862 | U | 7/1983 |
| JP | S58173367 | U | 11/1983 |
| JP | 60043434 | U | 3/1985 |
| JP | S6141484 | A | 2/1986 |
| JP | S64019399 | U | 1/1989 |
| JP | H02086399 | U | 7/1990 |
| JP | H0353163 | U | 5/1991 |
| JP | H1992004899 | U | 1/1992 |
| JP | H06044499 | U | 6/1994 |
| JP | 2000189282 | A | 7/2000 |
| JP | 2006082759 | A | 3/2006 |
| JP | 2009208495 | A | 9/2009 |
| JP | 2010105304 | A | 5/2010 |
| JP | 2010259710 | A | 11/2010 |
| JP | 2011016458 | A | 1/2011 |
| JP | 20131111113 | A | 6/2013 |
| JP | 2014058183 | A | 4/2014 |
| JP | 2017171053 | A | 9/2017 |
| JP | 2018158096 | A | 10/2018 |
| JP | 201988386 | A | 6/2019 |
| JP | 2020152201 | A | 9/2020 |
| JP | 2020179715 | A | 11/2020 |
| JP | 2021079839 | A | 5/2021 |
| WO | WO2018173835 | A1 | 9/2018 |
| WO | WO2020/241173 | A1 | 12/2020 |

OTHER PUBLICATIONS

PCT Written Opinion for corresponding PCT Application No. PCT/JP2022/021271, mailed Jul. 26, 2022, 4 pages.
Japanese Office Action (w/English translation) for corresponding Application No. 2022-106693, dated Feb. 17, 2026, 6 pages.
Japanese Office Action (w/English translation) for corresponding Application No. 2022-106694, dated Jan. 27, 2026, 5 pages.
Japanese Office Action (w/English translation) for corresponding Application No. 2022-106695, daed Jan. 27. 2026, 6 pages.
Japanese Office Action (w/English translation) for corresponding Application No. 2022-106696, dated Mar. 3, 2026, 6 pages.
Japanese Office Action (w/English translation) for Application No. 2022-193757, dated Jun. 30, 2026, 8 pages.
Japanese Office Action (w/English translation) for Application No. 2025-002972, dated Jul. 21, 2026, 10 pages.

* cited by examiner

A
20
(5)
21
31
23
32
11
3
14
22
10
(5)
31
30
23A
UP
DOWN
REAR
FRONT

FIG. 19

212
(210)
220
230
240
237
225
REAR
RIGHT
LEFT
FRONT 201
204
220
222
202
B
212
(210)
XXIII
203
205
A
XXVIII
REAR
LEFT
RIGHT
FRONT 211
(210)
211d
211b
211b
211b
250
242
250
242
250
250
242
250
REAR
RIGHT
LEFT
FRONT

CONVEYANCE SEAT

CROSS-REFERENCE TO RELATED APPLICATIONS

This application is the U.S. National Stage entry of International Application No. PCT/JP2022/021271, filed on May 24, 2022, which claims priority to Japanese Patent Application No. 2021-088331, filed on May 26, 2021; Japanese Patent Application No. 2021-088332, filed on May 26, 2021; and U.S. Provisional Patent Application No. 63/289,264, filed on Dec. 14, 2021, all of which are hereby incorporated herein by reference in their entireties for all purposes.

TECHNICAL FIELD

The present invention relates to a conveyance seat, particularly to a conveyance seat including a seat pad and a skin covering the seat pad.

BACKGROUND ART

A conveyance seat mounted in a conveyance such as an automobile and configured to cover a seat pad made of foamed resin with a skin for improving seating comfort is known. In addition, in recent years, as shown in PATENT LITERATURE 1, there is a seat pad composed of two layers of pad members having different hardnesses. The pad member on a seating surface side (surface layer side) is made of urethane and the pad member on a back layer side is made of expanded polypropylene (EPP), so that rigidity is maintained while improving seating comfort.

CITATION LIST

Patent Literature

PATENT LITERATURE 1: JP 2018-158096 A

SUMMARY OF INVENTION

Technical Problem

When the seat pad composed of two layers of pad members as shown in PATENT LITERATURE 1 is covered with the skin, in the related art, the skin is fixed to the seat pad by inserting locking members such as clips or arrowheads provided at an end portion of the skin, into hole portions formed in the pad members.

However, since the locking members such as clips are used to fix the skin, the number of components increases, so that the manufacturing cost increases, which is a problem.

The present invention has been made in view of the foregoing problem, and an object of the present invention is to provide a conveyance seat in which in a seat pad composed of two layers of pad members, the number of components is reduced by fixing a skin to the seat pad without using a locking member such as a clip.

Solution to Problem

The foregoing problem is solved by a conveyance seat according to present invention, the seat including: a seat pad; and a skin covering the seat pad. The seat pad includes a first pad member and a second pad member harder than the first pad member. The second pad member is provided with a protruding portion integrally formed with the second pad member to lock the skin. The skin is provided with a locked portion locked to the protruding portion.

By providing the protruding portion on the second pad member, the protruding portion being integrally formed with the second pad member to lock the skin, it is possible to provide the conveyance seat in which the skin can be fixed without using a locking member such as a clip and in which the number of components is reduced.

In addition, in the conveyance seat, the locked portion of the skin may be a hole portion into which the protruding portion is inserted.

The locked portion that is easily locked to the protruding portion can be formed by forming a hole portion as the locked portion.

In addition, in the conveyance seat, the protruding portion may include a bent portion bent at a tip.

By providing the bent portion bent at the tip of the protruding portion, the locked portion of the skin that is locked is made less likely to come off from the protruding portion.

In addition, in the conveyance seat, an elevated portion having a height higher than a height of the protruding portion may be provided around the protruding portion of the second pad member.

By providing the elevated portion higher than the height of the protruding portion around the protruding portion, the protruding portion is embedded by the elevated portion, and the protruding portion is prevented from becoming an obstacle when the seat pad is installed. In addition, when the seat pad is placed on a floor surface or the like, no load is directly applied to the protruding portion, so that damage to the protruding portion is suppressed.

In addition, in the conveyance seat, a thickness of a base portion of the protruding portion may be larger than a thickness of a tip portion.

The strength of the protruding portion can be increased by setting the thickness of the base portion of the protruding portion to be larger than the thickness of the tip portion.

In addition, in the conveyance seat, a first through-hole may be formed in the second pad member at a position adjacent to the protruding portion, and a second through-hole communicating with the first through-hole may be formed in the first pad member.

By forming the second through-hole in the first pad member, the second through-hole communicating with the first through-hole, when the first pad member is formed, the first through-hole can be blocked using a mold for forming the second through-hole, so that the material of the first pad member can be prevented from leaking from the first through-hole. The two-layer seat pad in which the protruding portion and the through-holes are provided can be easily manufactured.

In addition, in the conveyance seat, the locked portion of the skin may be locked to the protruding portion through the first through-hole and the second through-hole.

The skin can be locked to the protruding portion from the inside using the locked portion, so that the skin can be more firmly fixed to the seat pad.

In addition, in the conveyance seat, the first pad member may be provided with a pull-in groove for pulling the skin, and the second through-hole may be formed in the pull-in groove.

By forming the second through-hole in the pull-in groove, the pull-in member can be locked to the protruding portion using the pull-in member for pulling the skin as the locked portion.

In addition, in the conveyance seat, a third through-hole having a width wider than a width of the first through-hole may be formed in the second pad member, and the first through-hole may be disposed at a position overlapping the third through-hole in a seat width direction.

By disposing the first through-hole at the position overlapping the third through-hole in the seat width direction, the position of the first through-hole is easily identified, and the position of the protruding portion adjacent thereto is easily recognized, so that the first through-hole becomes a reference point when the skin is attached, thereby improving workability.

In addition, the conveyance seat may further include: a seat cushion including the seat pad and the skin; a seat back including a seat back frame forming a skeleton and connected to a rear end portion of the seat cushion; and a headrest provided on an upper side of the seat back.

Advantageous Effects of Invention

By providing the protruding portion on the second pad member, the protruding portion being integrally formed with the second pad member to lock the skin, it is possible to provide the conveyance seat in which the skin can be fixed without using a locking member such as a clip and in which the number of components is reduced.

In addition, the locked portion that is easily locked to the protruding portion can be formed by forming a hole portion as the locked portion.

In addition, by providing the bent portion bent at the tip of the protruding portion, the locked portion of the skin that is locked is made less likely to come off from the protruding portion.

In addition, by providing the elevated portion higher than the height of the protruding portion around the protruding portion, the protruding portion is embedded by the elevated portion, and the protruding portion is prevented from becoming an obstacle when the seat pad is installed.

In addition, when the seat pad is placed on a floor surface or the like, no load is directly applied to the protruding portion, so that damage to the protruding portion is suppressed.

In addition, the strength of the protruding portion can be increased by setting the thickness of the base portion of the protruding portion to be larger than the thickness of the tip portion.

In addition, by forming the second through-hole in the first pad member, the second through-hole communicating with the first through-hole, when the first pad member is formed, the first through-hole can be blocked using the mold for forming the second through-hole, so that the material of the first pad member can be prevented from leaking from the first through-hole. The two-layer seat pad in which the protruding portion and the through-holes are provided can be easily manufactured.

In addition, the skin can be locked to the protruding portion from the inside using the locked portion, so that the skin can be more firmly fixed to the seat pad.

In addition, by forming the second through-hole in the pull-in groove, the pull-in member can be locked to the protruding portion using the pull-in member for pulling the skin as the locked portion.

By disposing the first through-hole at the position overlapping the third through-hole in the seat width direction, the position of the first through-hole is easily identified, and the position of the protruding portion adjacent thereto is easily recognized, so that the first through-hole becomes a reference point when the skin is attached, thereby improving workability.

BRIEF DESCRIPTION OF DRAWINGS

FIG. 19 is a top view of a second pad member.

DESCRIPTION OF EMBODIMENTS

First Embodiment

Hereafter, a vehicle seat 1 (one example of a conveyance seat) according to an embodiment of the present invention (hereafter, the present embodiment) will be described with reference to FIGS. 1 to 8B.

The following embodiment is merely one example for facilitating understanding of the present invention, and does not limit the present invention. Namely, the shapes, dimensions, dispositions, and the like of members to be described below can be modified or improved without departing from the concept of the present invention, and it goes without saying that the present invention includes equivalents thereof.

Incidentally, hereinafter, the vehicle seat 1 to be mounted in a vehicle will be provided as one example of a seat, and a configuration example of the vehicle seat 1 will be described. In addition, in the following description, a "front to rear direction" is a front to rear direction of the vehicle seat, and is a direction that coincides with a forward direction of the vehicle when traveling. In addition, a "seat width direction" is a lateral width direction of the vehicle seat (in other words, a width direction of a seat body), and is a direction that coincides with a right to left direction when viewed from an occupant seated in the vehicle seat. In addition, an "up to down direction" is an up to down direction of the vehicle seat, and is a direction that coincides with a vertical direction when the vehicle travels on a horizontal surface.

Incidentally, unless otherwise specified, the shape, the position, the posture, and the like of each part of the vehicle seat to be described below will be described based on the assumption that the vehicle seat is in a seated state.

<<Vehicle Seat>>

Figure 1:
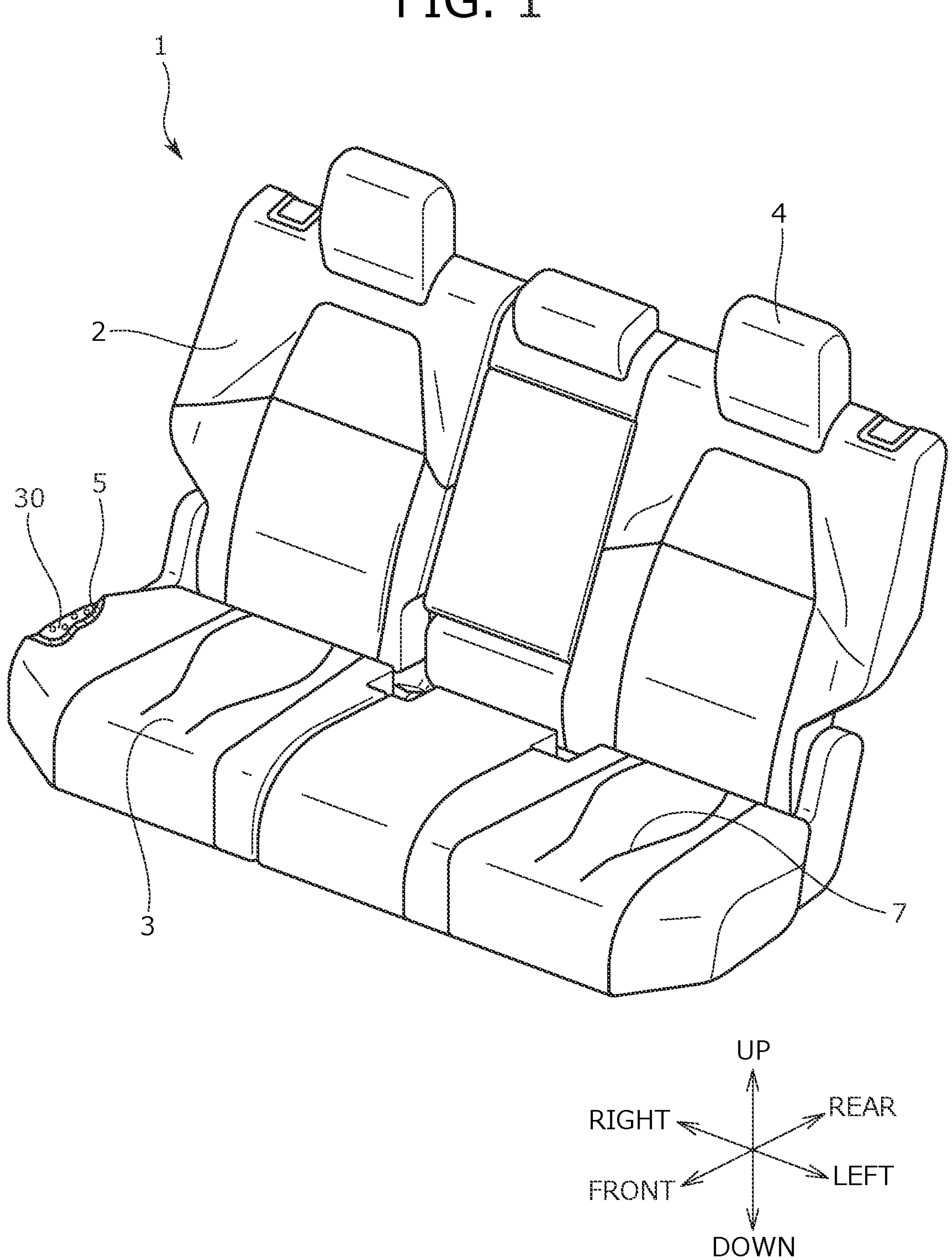
FIG. 1 is a perspective view of a vehicle seat according to a first embodiment.
Figure 2:
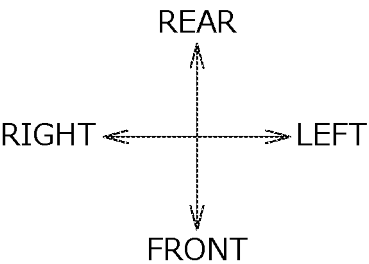
FIG. 2 is a top view of the vehicle seat.

A basic configuration of the vehicle seat 1 according to the present embodiment will be described with reference to FIGS. 1 and 2. FIG. 1 is a perspective view of the vehicle seat 1, and FIG. 2 is a top view of the vehicle seat 1. In FIG. 1, a part of the vehicle seat 1 is illustrated with a skin 30 removed from a seat cushion pad 5 for illustration purposes.

The vehicle seat 1 is a rear seat of an automobile which is placed on a vehicle body floor and in which three occupants can be seated. However, the vehicle seat 1 is not limited thereto, and the vehicle seat 1 may be a front seat disposed on a front side of a vehicle, and can be used as a middle seat in a second row or a rear seat in a third row in a vehicle including three rows of seats in the front to rear direction.

Further, the vehicle seat 1 includes, as main components, a seat back 2 serving as a backrest portion that supports the back of the seated occupant; a seat cushion 3 serving as a backrest portion that supports the back of the seated occupant; and a headrest 4 disposed on an upper portion of the seat back 2 to support the head of the seated occupant.

In addition, a seat back frame (not illustrated) serving as a skeleton is provided inside the seat back 2. As shown in FIG. 1, the seat cushion 3 includes the seat cushion pad 5 (seat pad) and the skin 30 covering the seat cushion pad 5. In addition, the skin 30 is partly pulled into a pad side (bottom side of the seat cushion 3), and skin grooves 7 are formed on a surface of the seat cushion 3.

Figure 3:
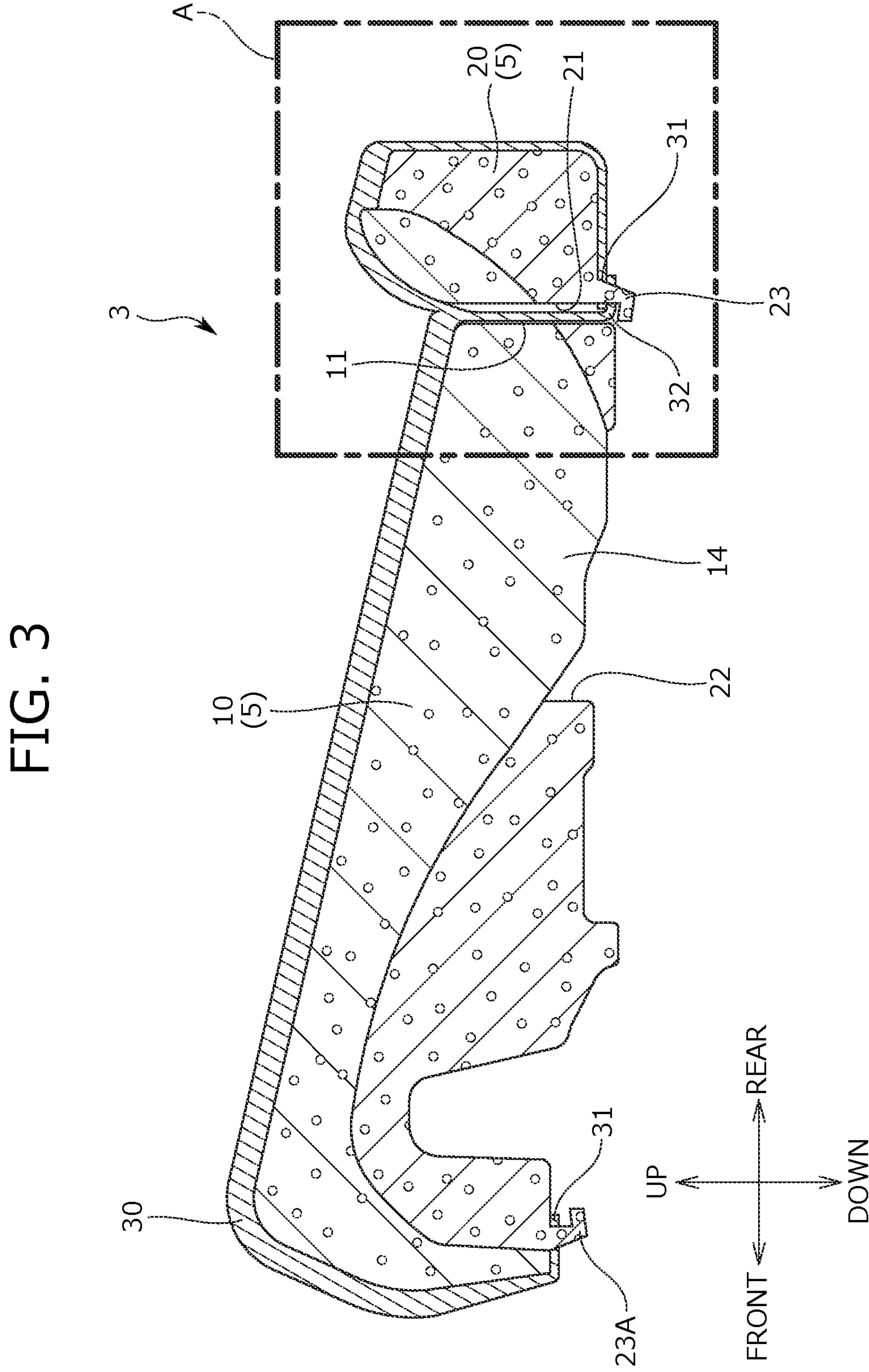
FIG. 3 is a cross-sectional view of a seat cushion taken along line III-III of FIG. 2.
Figure 4:
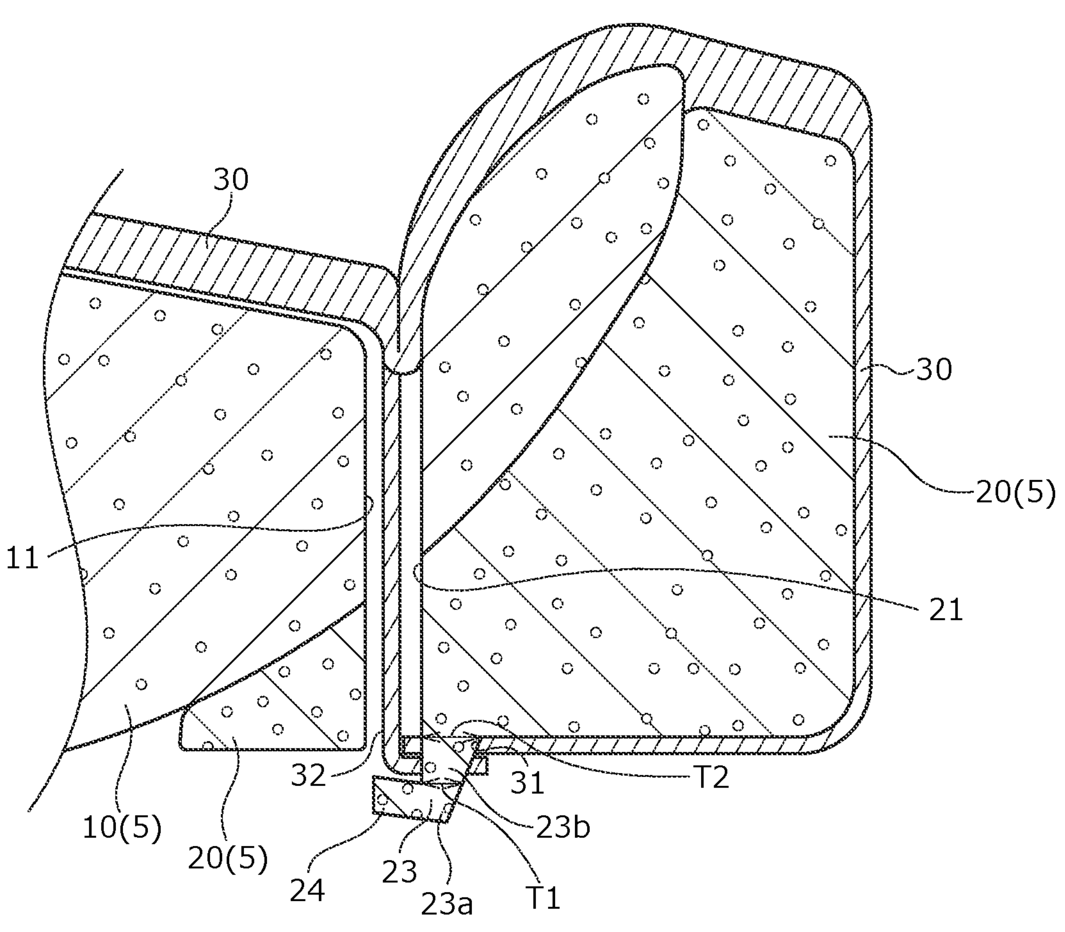
FIG. 4 is an enlarged cross-sectional view in which a portion A of FIG. 3 is enlarged.

FIG. 3 is a cross-sectional view of the seat cushion 3, and mainly shows a configuration of the seat cushion pad 5. FIG. 4 is an enlarged cross-sectional view in which a portion A of FIG. 3 is enlarged.

As shown in FIG. 3, the seat cushion pad 5 includes a first pad member 10 and a second pad member 20 made of a harder material than the first pad member 10. The first pad member 10 is disposed on the second pad member 20, and the first pad member 10 is supported from below by the second pad member 20.

<<First Pad Member>>

Figure 7:
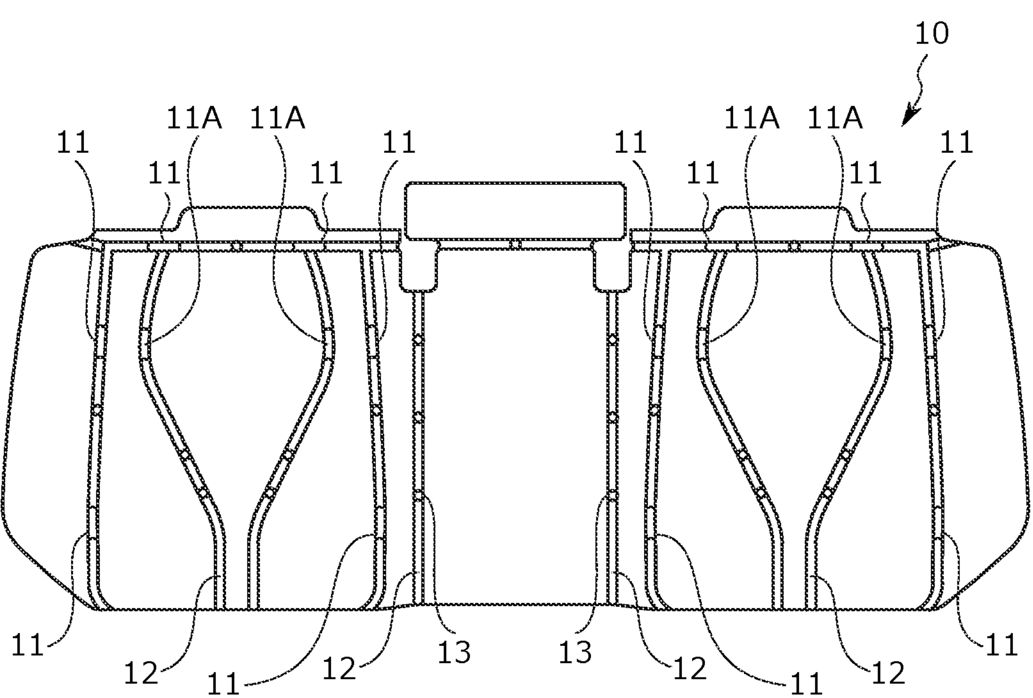
FIG. 7 is a top view of a first pad member constituting the seat cushion pad.

Here, a configuration of the first pad member 10 will be described with reference to FIGS. 3 and 7. FIG. 7 shows an upper surface of the first pad member 10. The first pad member 10 is, for example, a cushioning member made of foamed resin such as urethane foam. As shown in FIG. 7, the first pad member 10 has substantially the same shape as the upper surface shape of the seat cushion 3 shown in FIG. 2.

As shown in FIG. 3, a bulging portion 14 of which a bottom surface portion bulges downward is formed in the first pad member 10. The bulging portion 14 is a portion that supports the buttocks of the occupant. Incidentally, when the first pad member 10 is disposed on the second pad member 20, the bottom surface portion of the bulging portion 14 fits into an opening portion 22 of the second pad member 20.

In addition, as shown in FIG. 7, a plurality of pull-in grooves 12 for pulling the skin 30 are formed on the first pad member 10 to form the skin grooves 7. In addition, pull-in holes 13 are formed in some of the pull-in grooves 12, and the skin 30 is drawn into a bottom surface side of the first pad member 10 through the pull-in holes 13. Incidentally, a plurality of second through-holes 11 to be described later are also formed in the pull-in grooves 12, and the second through-holes 11 are also used at the same time when the skin 30 is fixed to the seat cushion pad 5.

<<Second Pad Member>>

Next, a configuration of the second pad member 20 will be described. As described above, the second pad member 20 is made of a harder material than the first pad member 10, and in the present embodiment, is made of foamed resin such as expanded polypropylene (EPP). The first pad member 10 is disposed on an upper surface side of the second pad member 20, and the second pad member 20 supports the first pad member 10 from below. The seat cushion pad 5 is composed of two layers of pad members having different hardnesses in such a manner, so that seating comfort is improved and rigidity is maintained while forming the seat cushion pad 5 to be thinner than a cushion pad configured in one layer.

As shown in FIG. 3, the opening portion 22 is formed in the second pad member 20 at a position facing a seating surface portion in which the occupant is seated, and the bulging portion 14 of the first pad member 10 is configured to fit into the opening portion 22.

Figure 6:
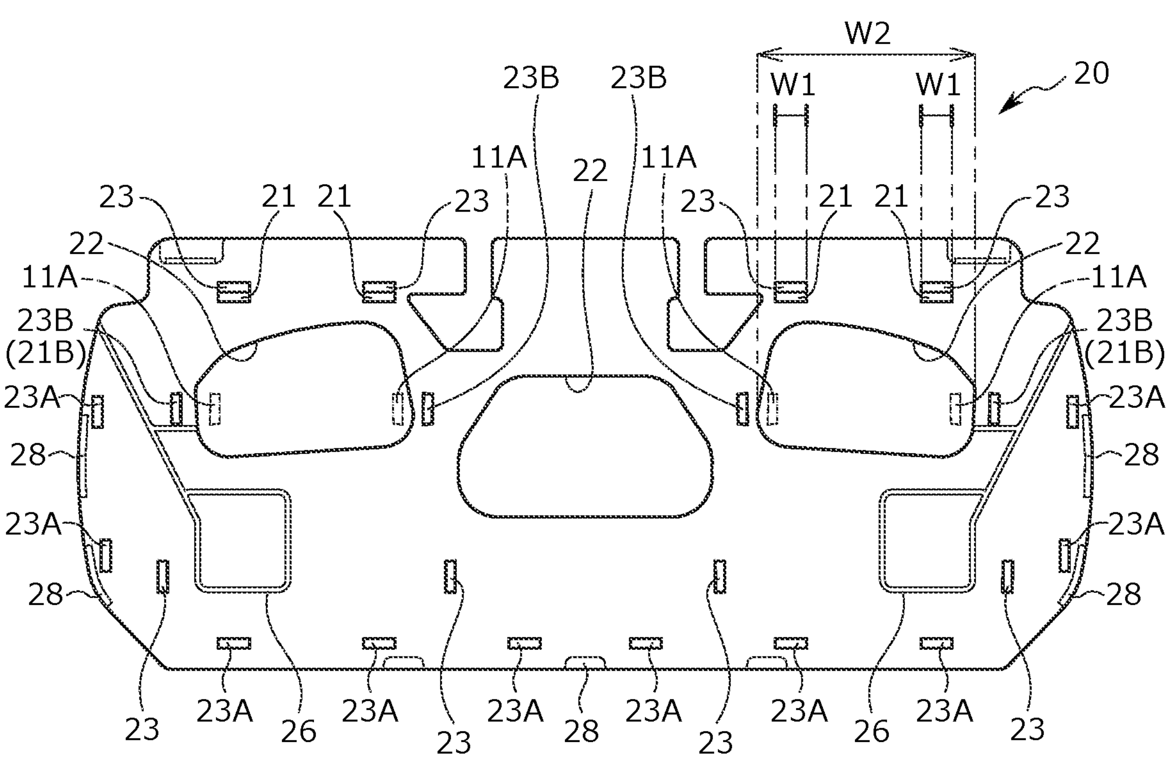
FIG. 6 is a bottom view of a second pad member constituting the seat cushion pad.
Figure 6:
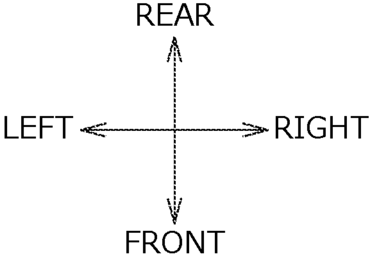

In addition, as shown in FIGS. 3 and 6, a plurality of protruding portions 23, 23A, and 23B are provided on a lower surface of the second pad member 20, and an end portion of the skin 30 covering the seat cushion pad 5 is configured to be locked to the protruding portions 23, 23A, and 23B. Hole portions 31 into which the protruding portions 23 are inserted are formed at the end portion of the skin 30 as locked portions. As shown in FIGS. 3 and 4, a rear portion of the seat cushion pad 5 is covered with the skin 30, and then the hole portions 31 formed at the end portion of the skin 30 are hooked onto the protruding portions 23, so that the skin 30 is attached to the seat cushion pad 5.

Incidentally, the protruding portions 23 are protruding portions provided adjacent to first through-holes 21 to be described later, and the protruding portions 23A are protruding portions formed on the periphery of the second pad member 20 and not provided adjacent to the first through-holes 21. The protruding portions 23B are protruding portions that are provided around the opening portion 22 and that lock the skin 30 using pull-in portions 32 extending through the opening portion 22.

In addition, the hole portions 31 formed at the end portion of the skin 30 are one example of the locked portion and are not limited thereto. The locked portions provided at the end portion of the skin 30 may be, for example, U-shaped hooks.

As shown in FIG. 4, a bent portion 24 bent forward is provided at a tip portion 23*a* of the protruding portion 23, and the protruding portion 23 is formed in a J shape as a whole. For that reason, after the hole portion 31 of the skin 30 is inserted onto the protruding portion 23, the hole portion 31 of the skin 30 that is locked is made less likely to come off from the protruding portion 23 by the bent portion 24.

In addition, as shown in FIG. 4, a head portion of the bent portion 24 is inclined at an angle toward a lower surface side of the second pad member 20. For that reason, when the skin 30 is attached, the hole portion 31 is easily hooked onto the protruding portion 23, and on the other hand, after the hole portion 31 is hooked, the end portion of the skin 30 is less likely to come off from the protruding portion 23.

In addition, as shown in FIG. 4, the protruding portion 23 is formed such that a thickness T2 of a base portion 23*b* of the protruding portion 23 is larger than a thickness T1 of the tip portion 23*a*. By forming the base portion 23*b* serving as an attachment portion to be thicker than the tip portion 23*a*, the strength of the attachment portion can be increased, and the rigidity of the protruding portion 23 can be increased.

Figure 5:
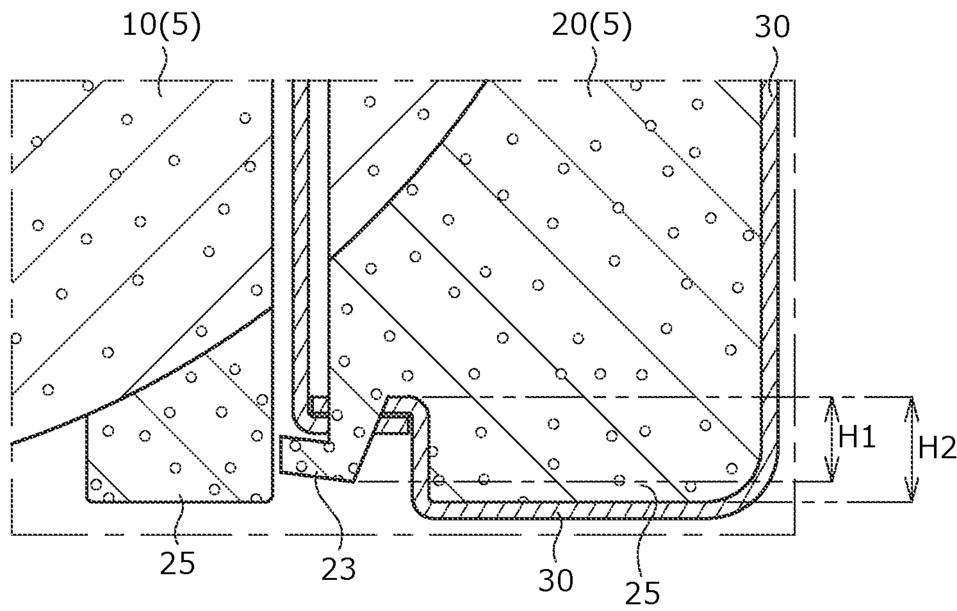
FIG. 5 is an enlarged cross-sectional view showing another example of a seat cushion pad at the portion A.

Since the protruding portion 23 shown in FIG. 4 protrudes downward from a bottom surface of the second pad member 20, when the seat cushion pad 5 is installed, there is a possibility that the protruding portion comes into contact with other members. For that reason, for example, as shown in FIG. 5, an elevated portion 25 elevated at a height H2 higher than a height H1 by which the protruding portion 23 protrudes from the bottom surface of the second pad member 20 may be provided around the protruding portion 23.

By surrounding and embedding the protruding portion 23 with the elevated portion 25, the contact of the protruding portion 23 with other members is suppressed, and the protruding portion 23 is prevented from becoming an obstacle when the seat cushion pad 5 is installed. In addition, for example, even when the seat pad is placed on a floor surface or the like, no load is applied to the protruding portion 23, so that damage to the protruding portion 23 is suppressed. In the example shown in FIG. 5, the protruding portion 23 is formed in such a manner that the elevated portion 25 is separately provided around the protruding portion 23; however, a recessed portion may be formed in the second pad member 20, and the protruding portion 23 may be provided in the recessed portion.

<<First Through-Hole and Second Through-Hole>>

In addition, the first through-holes 21 are formed in the second pad member 20 to extend from a back surface toward a surface (surface that comes into contact with the first pad member 10) of the second pad member 20 at positions adjacent to the protruding portions 23. In addition, as shown in FIGS. 3 and 4, the second through-holes 11 communicating with the first through-holes 21 are formed in the first pad member 10. As shown in FIG. 7, the second through-holes 11 are formed in the pull-in grooves 12 for pulling the skin 30.

As shown in FIG. 4, the pull-in portions 32 extending from a back surface of the skin 30 are provided on the skin 30 as locked members. The pull-in portions 32 can be inserted into the first through-holes 21 and the second through-holes 11, and tips of the pull-in portions 32 can be locked to the protruding portions 23 adjacent to the first through-holes 21. By hooking the pull-in portions 32 onto the protruding portions 23, the skin 30 can be attached to the seat cushion pad 5 at the same time when the skin 30 is pulled. In such a manner, the protruding portions 23 can be used for both fixing a rear end portion of the skin 30 using the hole portions 31 and fixing the skin 30 using the pull-in portions 32.

Here, the effect of forming the second through-holes 11 in the first pad during manufacturing, the second through-holes 11 communicating with the first through-holes 21, will be described.

Figure 8A:
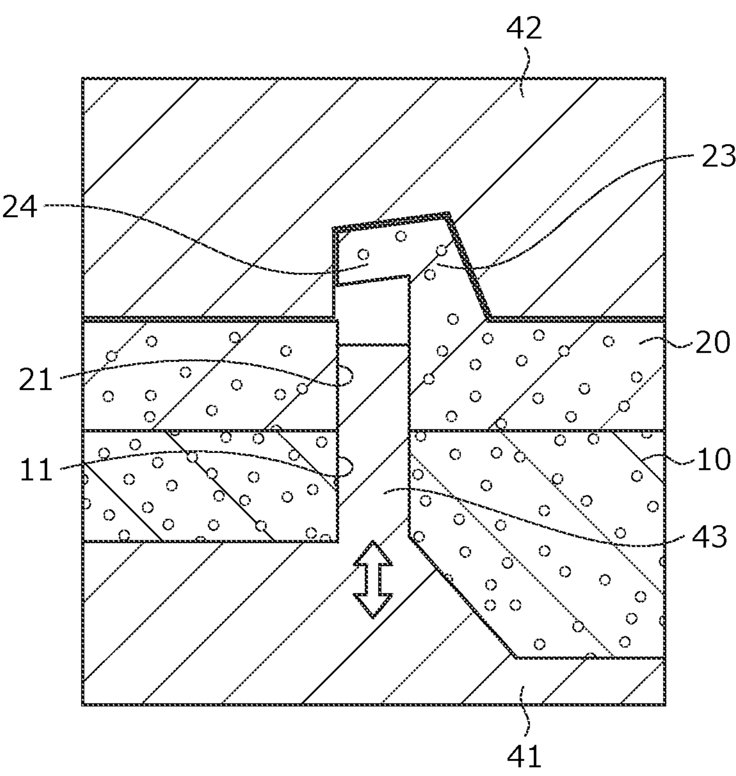
FIG. 8A is an explanatory view explaining a method for manufacturing the seat cushion pad.
Figure 8A:
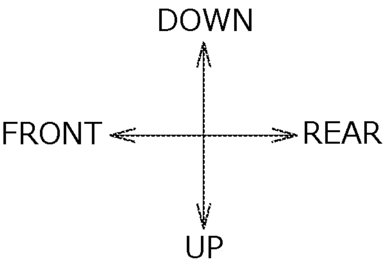
Figure 8B:
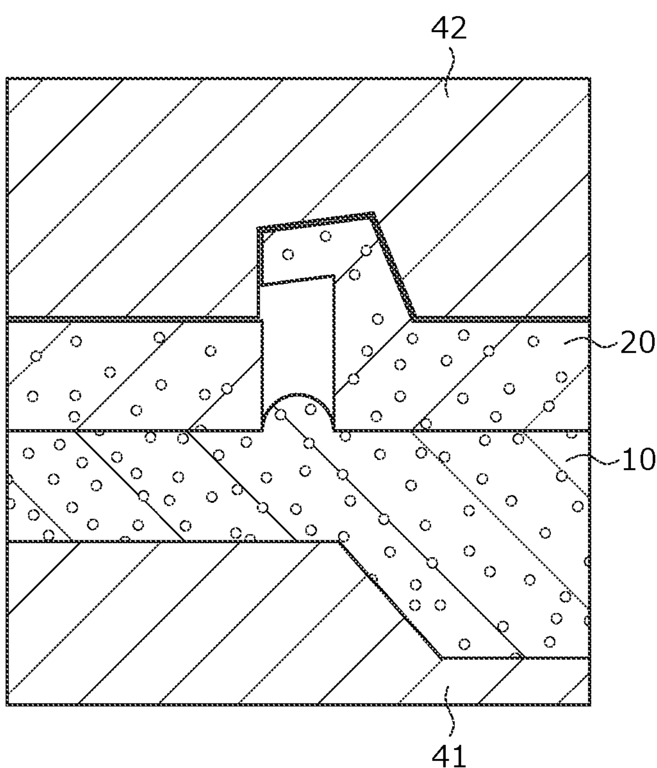
FIG. 8B is an explanatory view explaining a manufacturing method when there is no second through-hole.
Figure 8B:
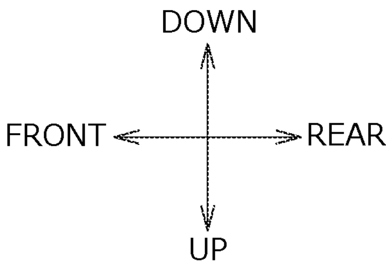

When the first pad member 10 made of foamed urethane is formed, as shown in FIG. 8A, the first pad member 10 is molded by supplying a foamed raw material into a first pad-side mold 41, by foaming and curing the foamed raw material, and by performing integral foaming with the second pad member 20 and a second pad-side mold 42 disposed. During molding, when the first pad member 10 does not include the second through-holes 11 communicating with the first through-holes 21, as shown in FIG. 8B, the foamed raw material (urethane) may flow into the first through-holes 21 to block the first through-holes 21.

As shown in FIG. 8A, when the first pad-side mold 41 is formed to form the second through-holes 11 in the first pad member 10, the flow of the foamed raw material into the first through-holes 21 can be suppressed since the first through-holes 21 are blocked by protrusions inserted into the first through-holes 21.

<<Third Through-Hole>>

As described above, the opening portion 22 is formed in the second pad member 20 as a third through-hole. As described above, the opening portion 22 is formed such that the bulging portion 14 of the first pad member 10 is fitted into the opening portion 22, and as shown in FIG. 6, the opening portion 22 has a width W2 wider than a width W1 of the first through-holes 21 formed with the same width as the protruding portions 23.

As shown in FIG. 6, the first through-holes 21 are disposed at positions overlapping the opening portion 22 in the seat width direction. By disposing the first through-holes 21 at the positions overlapping the opening portion 22 in the seat width direction (seat right to left direction), when the skin 30 is attached to the seat cushion pad 5, the approximate positions of the first through-holes 21 can be grasped using the opening portion 22 as a reference point, and the hole portions 31 of the skin 30 are easily hooked onto the protruding portions 23 adjacent to the first through-holes 21, so that workability is improved.

In addition, the second through-holes 11A formed in the first pad member 10 may be formed through the bulging portion 14, and may be formed to communicate with the opening portion 22 of the second pad member 20. In this case, as shown in FIG. 6, the pull-in portions 32 extending from the back surface of the skin 30 are locked to the protruding portions 23B formed around the opening portion 22.

In addition, the pull-in portions 32 passing through the first through-holes 21B communicating with the second through-holes 11 of the pull-in grooves 12 extending in the front to rear direction may be locked to the protruding portions 23B.

A length of the opening portion 22 in the front to rear direction is provided to be longer than a length of the first through-holes 21B in the front to rear direction, and the first through-holes 21B are disposed at positions overlapping the opening portion 22 in the front to rear direction. Accordingly, for example, the positions of the first through-holes 21B are easily identified by the opening portion 22, so that workability is improved.

In addition, as shown in FIG. 6, a guide groove 26 capable of accommodating a harness connected to an ECU, a seating sensor, and the like is formed on the bottom surface of the second pad member 20. The guide groove 26 is connected to the opening portion 22, and the harness is easily disposed toward the rear of the second pad member 20 through the opening portion 22 and the guide groove 26. In addition, the workability of attaching the harness is improved by disposing the harness along the guide groove 26. In addition, breakage of the harness can be suppressed by protecting the harness with the guide groove 26.

In addition, as shown in FIG. 6, a plurality of recesses 28 that are cut out toward the inside of the seat are formed on a side surface of the second pad member 20. By engaging the recesses 28 with protrusions provided at an outer edge portion of the first pad member 10 shown in FIG. 7, misalignment between the first pad member 10 and the second pad member 20 can be suppressed.

In addition, the second pad member 20 may be made of a foam molded body or three-dimensional mesh structure other than EPP having a higher compressive strength than the first pad member 10. For example, thermoplastic resin such as polystyrene resin, polyolefin resin, or composite resin thereof may be used for the foam molded body.

In addition, the present invention can be applied not only to the vehicle seat, but also to seats for various conveyances such as a train, an aircraft, and a ship.

Second Embodiment

Next, a second embodiment of the present invention will be described. The second embodiment relates to a conveyance seat, particularly to a conveyance seat including an engaging member for pulling a skin.

Background Art

In the related art, in a vehicle seat, in order to pull a skin into a back pad, attachment members for pull-in extending from a back surface along skin grooves are provided, and hooks provided at tips of the attachment members are hooked onto wires embedded in the back pad to pull the skin. For that reason, the work of attaching the wires to the back pad is required, so that the manufacturing cost increases.

In addition, in a seat including pull-ins disclosed in JP S61-41484 A, a film material is embedded in a recess formed in a pad, and a back surface of a skin is welded to the film material to fix the skin and to form a groove on a surface side of the skin.

Technical Problem

In the seat disclosed in JP S61-41484 A, in order to attach the film material in the recess, the film material is integrated with the pad during molding. The film material is attached during molding, but the skin is fixed to the film material by welding or the like, so that once the skin is attached, it is difficult to remove the skin from the seat pad.

The present invention has been made in view of the foregoing problem, and an object of the present invention is to provide a conveyance seat in which a skin can be detachably attached to a pad without embedding wires in the seat pad.

Solution to Problem

The foregoing problem is solved by a conveyance seat according to the present invention, the conveyance seat including: a seat pad; a skin covering the seat pad; and an engaging member provided on the skin to be engageable or disengageable from the seat pad. The engaging member includes an insertion portion insertable into the seat pad.

By providing the engaging member including the insertion portion insertable into the seat pad, on the skin, the skin can be detachably attached to the seat pad without embedding a wire in the seat pad.

In addition, in the conveyance seat, a plurality of the insertion portions may be provided on the engaging member. The plurality of insertion portions may include at least a first insertion portion disposed at one end portion of the engaging member, and a second insertion portion disposed at the other end portion located opposite to the one end portion.

By providing the insertion portion at each of the one end portion of the engaging member and the other end portion located opposite thereto, the engaging member can be more firmly fixed to the seat pad.

In addition, in the conveyance seat, the insertion portion may be formed in a protrusion shape.

By forming the insertion portion in a protrusion shape, the insertion portion can be more deeply inserted into the seat pad, and the engaging member can be more firmly fixed to the seat pad.

In addition, in the conveyance seat, the engaging member may have a flat plate shape, and the insertion portion may protrude from an end portion of the engaging member in an in-plane direction.

By forming the insertion portion so as to protrude from the end portion of the engaging member in the in-plane direction, the insertion portion is allowed to more strongly resist a force in a direction in which the engaging member is pulled (direction perpendicular to the engaging member), so that the engaging member can be firmly fixed to the seat pad.

In addition, in the conveyance seat, a cut may be formed on a surface of the engaging member facing a seat pad side.

By forming the cut on the surface facing the seat pad side, the engaging member having a plate shape is easily bent, and the engaging member can be more easily attached to the seat pad.

In addition, in the conveyance seat, a hole portion or a cutout portion may be formed in the engaging portion.

By forming the hole portion or the cutout portion in the engaging portion, the engaging member having a plate shape is easily bent, and the engaging member can be more easily attached to the seat pad.

In addition, in the conveyance seat, a recess that engages with the engaging member may be formed in the seat pad. An inserted portion into which the insertion portion of the engaging member is inserted may be formed on a side wall of the recess.

By forming the recess in the seat pad and by forming the inserted portion on the side wall of the recess, the engaging member can be more firmly attached to the seat pad.

In addition, in the conveyance seat, the recess may be formed such that a width increases from an opening portion toward a bottom portion of the recess.

By forming the recess such that the width increases from the opening portion toward the bottom portion of the recess, the width of the opening portion is made narrower than the width of the bottom portion, so that the engaging member that is inserted is less likely to come off. Therefore, the engaging member is more firmly attached to the seat pad.

In addition, in the conveyance seat, a rigid portion having a higher rigidity than the seat pad may be provided around the recess of the seat pad.

By providing the portion having a higher rigidity than the seat pad around the recess, the periphery of the recess is made less likely to deform, so that the engaging member can be more firmly attached.

In addition, the conveyance seat may further include: a seat back including the seat pad and the skin; a seat cushion connected to a lower end portion of the seat back; a headrest provided on an upper side of the seat back; and a seat frame forming a skeleton of the seat cushion and the seat back.

Advantageous Effects of Invention

According to the conveyance seat of the second embodiment, by providing the engaging member including the insertion portion insertable into the seat pad, on the skin, the skin can be detachably attached to the seat pad without embedding a wire in the seat pad.

In addition, by providing the insertion portion at each of the one end portion of the engaging member and the other end portion located opposite thereto, the engaging member can be more firmly fixed to the seat pad.

In addition, by forming the insertion portion in a protrusion shape, the insertion portion can be more deeply inserted into the seat pad, and the engaging member can be more firmly fixed to the seat pad.

In addition, by forming the insertion portion so as to protrude from the end portion of the engaging member in the in-plane direction, the insertion portion is allowed to more strongly resist a force in the direction in which the engaging member is pulled (direction perpendicular to the engaging member), so that the engaging member can be firmly fixed to the seat pad.

In addition, by forming the cut on the surface facing the seat pad side, the engaging member having a plate shape is easily bent, and the engaging member can be more easily attached to the seat pad.

In addition, by forming the hole portion or the cutout portion in the engaging portion, the engaging member having a plate shape is easily bent, and the engaging member can be more easily attached to the seat pad.

In addition, by forming the recess in the seat pad and by forming the inserted portion on the side wall of the recess, the engaging member can be more firmly attached to the seat pad.

In addition, by forming the recess such that the width increases from the opening portion toward the bottom portion of the recess, the width of the opening portion is made narrower than the width of the bottom portion, so that the engaging member that is inserted is less likely to come off. Therefore, the engaging member is more firmly attached to the seat pad.

In addition, by providing the portion having a higher rigidity than the seat pad around the recess, the periphery of the recess is made less likely to deform, so that the engaging member can be more firmly attached.

DESCRIPTION OF EMBODIMENT

Hereinafter, a configuration of a conveyance seat according to the second embodiment of the present invention (present embodiment) will be described with reference to the drawings. However, the embodiment to be described below is one example for facilitating understanding of the present invention, and does not limit the present invention. Namely, the present invention can be modified or improved without departing from the concept of the present invention, and it goes without saying that the present invention includes equivalents thereof.

Incidentally, hereinafter, a vehicle seat will be provided as one example of the conveyance seat, and a configuration example of the vehicle seat will be described. In the following description, a “front to rear direction” is a front to rear direction of a vehicle seat S, and is a direction that coincides with a forward direction of a vehicle when traveling. In addition, a “seat width direction” is a width direction of the vehicle seat, and is a direction that coincides with a right to left direction when viewed from an occupant seated in the vehicle seat S. In addition, an “up to down direction” is an up to down direction of the vehicle seat S, and is a direction that coincides with a vertical direction when the vehicle travels on a horizontal surface.

In addition, in the following description, various directions to which the term “seat” is added, such as the “seat width direction” and a “seat height direction”, indicate directions with respect to the vehicle seat S, and directions to which the term "vehicle" is added, such as a "vehicle inside" and a "vehicle outside", indicate directions with respect to the vehicle.

In addition, unless otherwise specified, the shape, position, posture, and the like of each part of the vehicle seat S to be described below will be described based on the assumption that the vehicle seat S is in a seatable state.

<<Basic Configuration of Vehicle Seat>>

Figure 9:
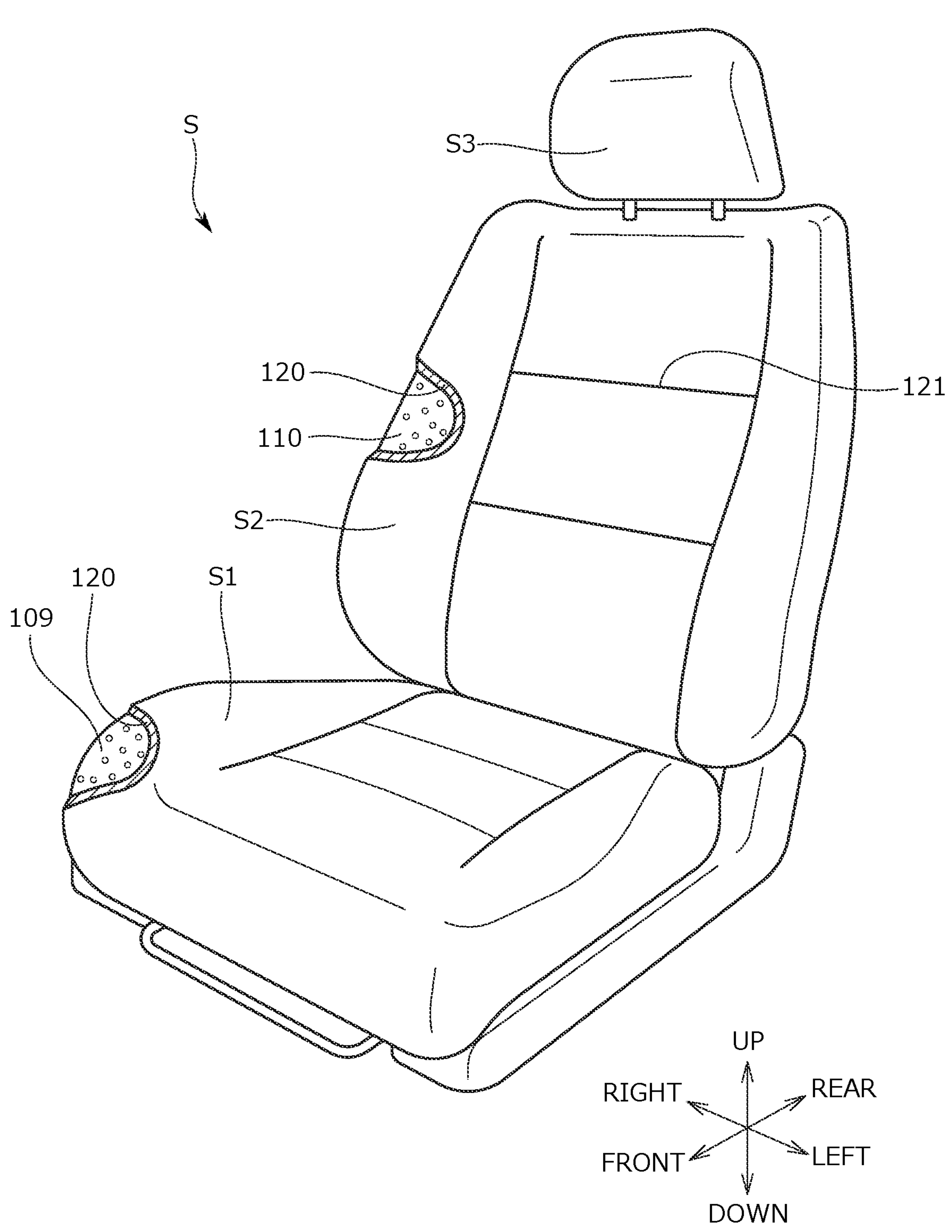
FIG. 9 is a perspective view of a vehicle seat according to a second embodiment when viewed obliquely from the front.

A basic configuration of the vehicle seat S according to the second embodiment will be described with reference to FIG. 9. FIG. 9 is a perspective view of the vehicle seat S when viewed obliquely from the front. In FIG. 9, a part of the vehicle seat S is illustrated with a skin 120 removed for illustration purposes.

The vehicle seat S is a seat which is placed on a vehicle body floor and in which the occupant of the vehicle is seated. In the present embodiment, the vehicle seat S is used as a front seat corresponding to a front seat of the vehicle. However, the vehicle seat S is not limited thereto, and may be a rear seat of the vehicle.

As shown in FIG. 9, the vehicle seat S includes, as main components, a seat cushion S1 serving as a seating portion that supports the buttocks of the seated occupant; a seat back S2 serving as a backrest portion that supports the back of the seated occupant; and a headrest S3 disposed on an upper portion of the seat back S2 to support the head of the seated occupant.

A rear end portion of the seat cushion S1 is connected to a lower end portion of the seat back S2. In addition, although not illustrated, a slide rail is installed below the seat cushion S1, and the vehicle seat S is placed on the vehicle body floor in a state where the vehicle seat S is movable in a sliding manner in the front to rear direction by the slide rail.

Figure 10:
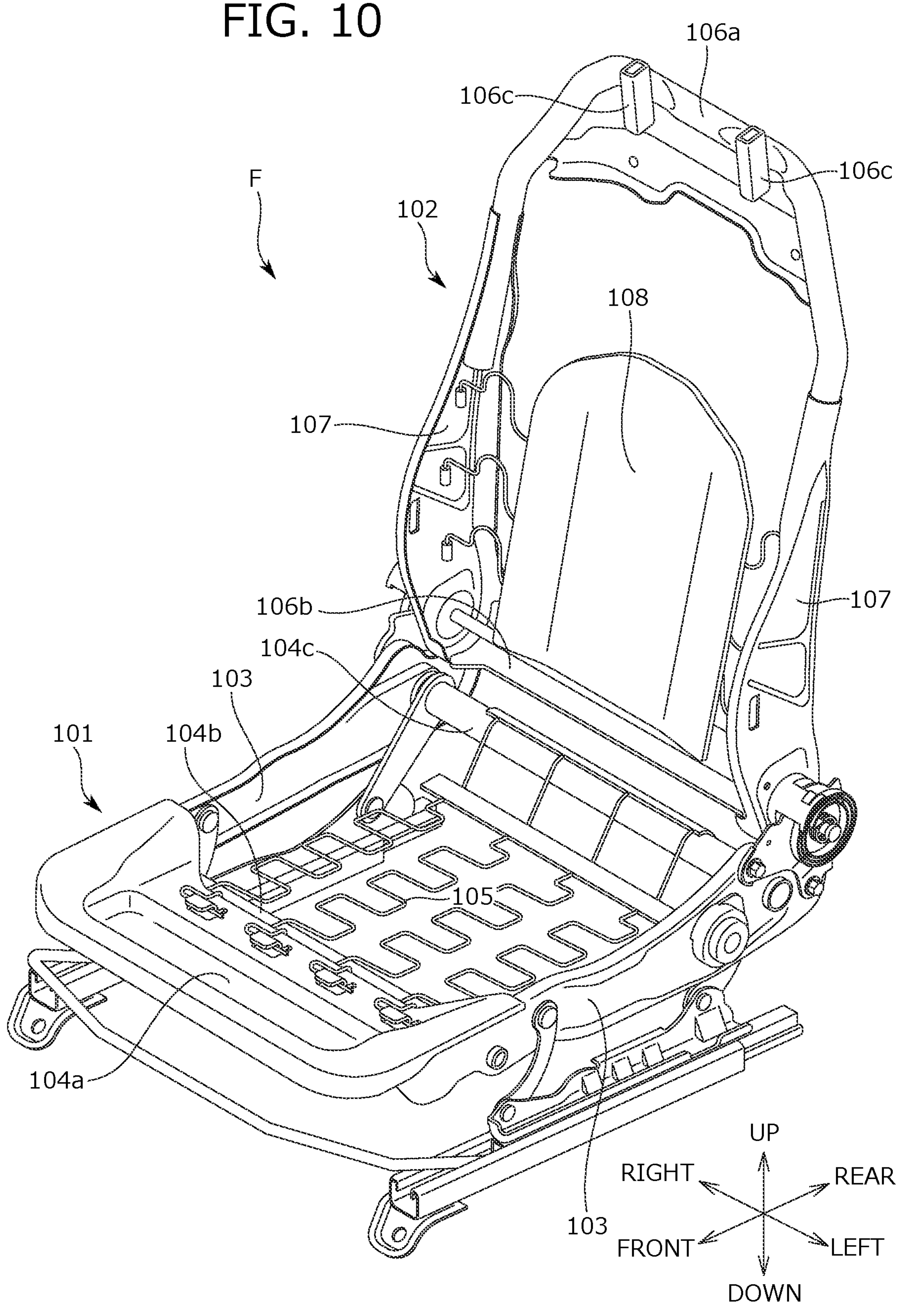
FIG. 10 is a perspective view showing a seat frame of the vehicle seat.

A seat frame F shown in FIG. 10 is provided inside the vehicle seat S, and the seat frame F mainly includes a cushion frame 101 and a back frame 102. The cushion frame 101 forms a skeleton of the seat cushion S1 in the seat frame F, and the back frame 102 forms a skeleton of the seat back S2 in the seat frame F.

As shown in FIG. 10, the cushion frame 101 of the seat frame F has a substantially square frame-shaped outer shape. Further, the cushion frame 101 includes, as main components, a pair of cushion side frames 103 constituting respective right and left end portions in the seat width direction; a pan frame 104*a* constituting a front end portion of the cushion frame 101; and springs 105 (S springs).

In order to define a width of the cushion frame 101, two cushion side frames 103 are disposed to be separated from each other in the right to left direction and to extend in the front to rear direction of the vehicle. Further, a front pipe 104*b* and a rear pipe 104*c* that connect the two cushion side frames 103 are attached to front end portions and rear end portions of the two cushion side frames 103, respectively.

The back frame 102 is mainly made of a pipe processed in a square frame shape, and as shown in FIG. 10, the back frame 102 includes an upper frame 106*a* having an inverted U shape; a pair of back side frames 107 forming right and left end portions in the seat width direction; and a lower frame 106*b* connecting lower end portions of the pair of back side frames 107.

In addition, the back frame 102 is provided with a pressure receiving plate 108 suspended on the back frame 102. Headrest guides 106*c* having a tubular shape are attached to an upper end central portion of the back frame 102. The headrest S3 is attached to the seat back S2 by inserting headrest pillars into the headrest guides 106*c*, the headrest pillars extending from a lower end of the headrest S3.

In addition, the seat cushion S1 is formed by placing a cushion pad 109 that is a seat pad, on the cushion frame 101 and further by covering the cushion pad 109 with the skin 120. The seat back S2 is formed by disposing a back pad 110 that is a seat pad, on the back frame 102 and further by covering the back pad 110 with the skin 120.

The cushion pad 109 and the back pad 110 that are seat pads are, for example, urethane base materials molded by foam molding using a urethane foaming agent. In addition, the skin 120 covering the back pad 110 and the cushion pad 109 is made of fabric, film, cloth, leather, sheet, or the like, and is attached to cover the cushion pad 109 and the back pad 110 in a state where the skin 120 is stretched to be subjected to a predetermined tension. Further, as shown in FIG. 9, a skin groove 121 created by pull-in is formed on a surface of the seat back S2.

<<Pull-In Structure>>

Hereinafter, a structure in which the skin 120 is pulled into the back pad 110 to form the skin groove 121 on the surface of the seat back S2 will be described with reference to FIGS. 11 to 14B.

Figure 11:
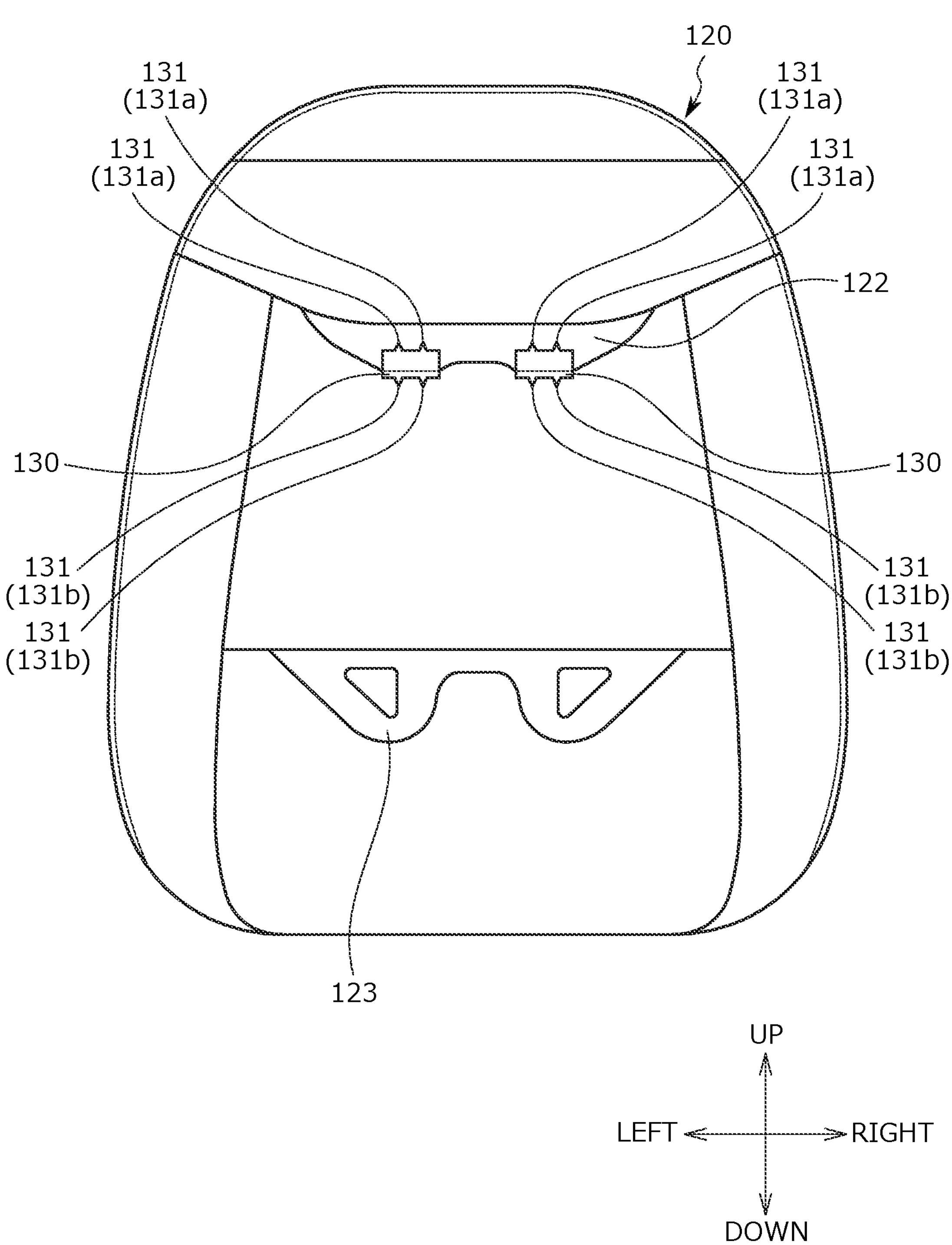
FIG. 11 is a view showing a back surface of a skin covering a backrest surface of a seat back.
Figure 12:
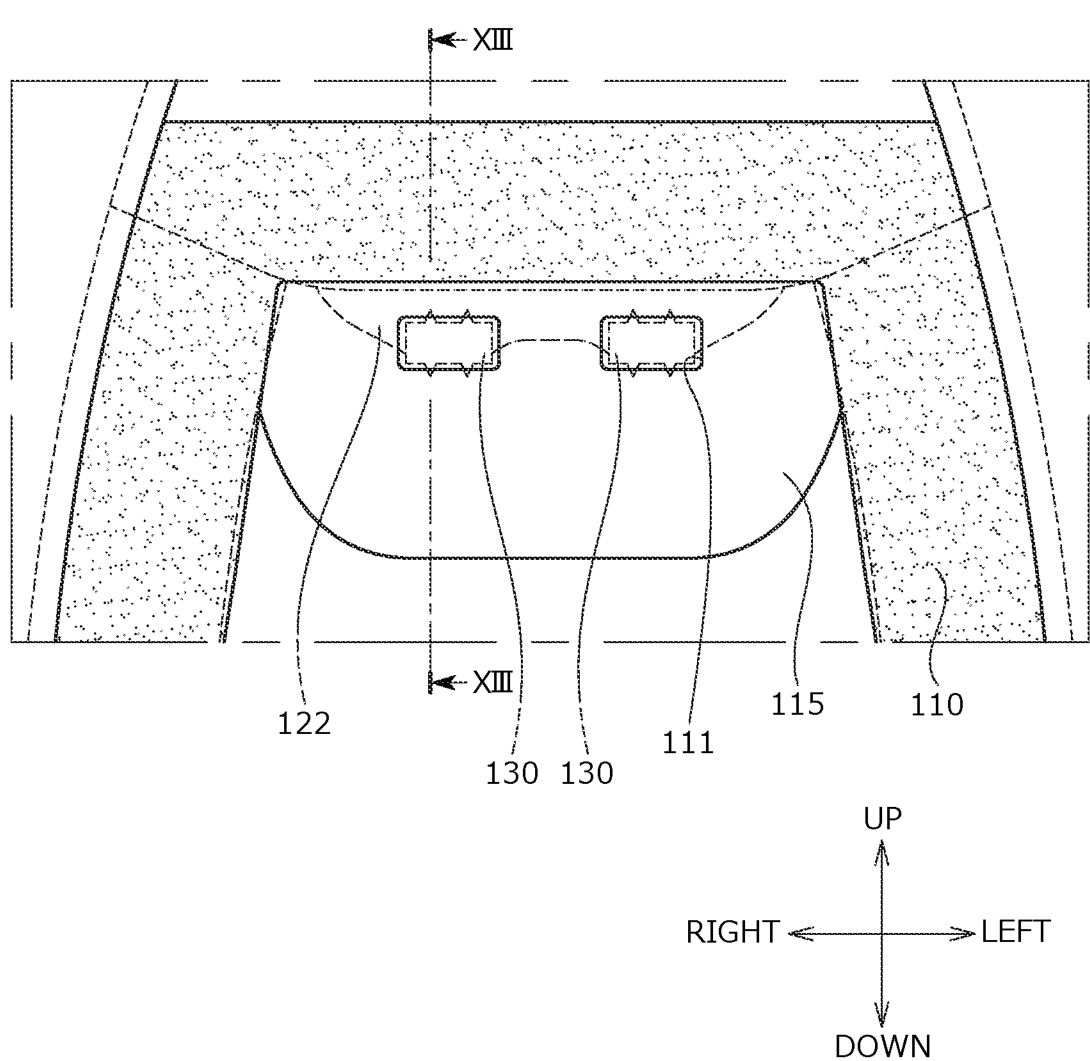
FIG. 12 is a view showing an upper portion of a back pad.
Figure 13A:
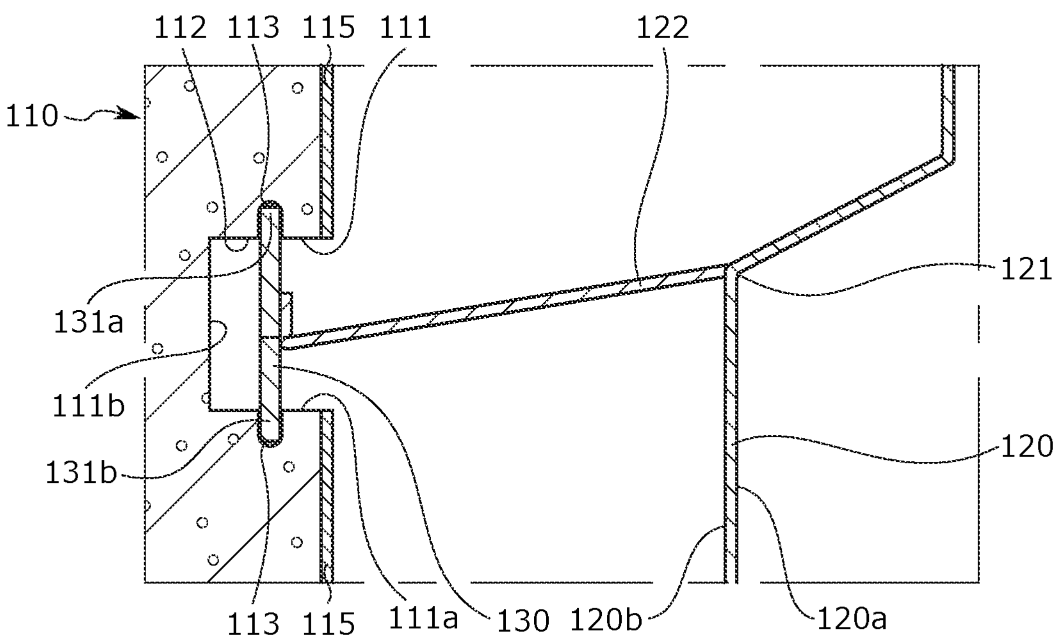
FIG. 13A is a cross-sectional view taken along line XIII-XIII of FIG. 12, and is a view showing a state where the skin is attached to the back pad.
Figure 13A:
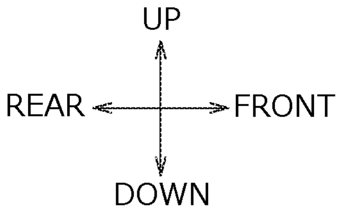
Figure 13B:
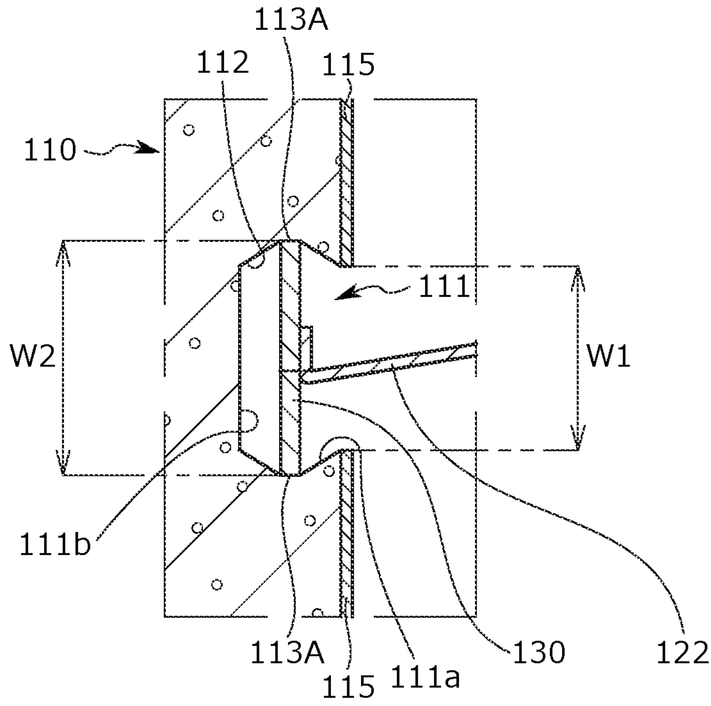
FIG. 13B is a cross-sectional view showing another example of a recess.
Figure 13B:
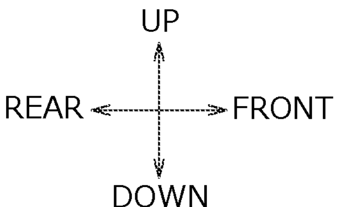
Figure 14A:
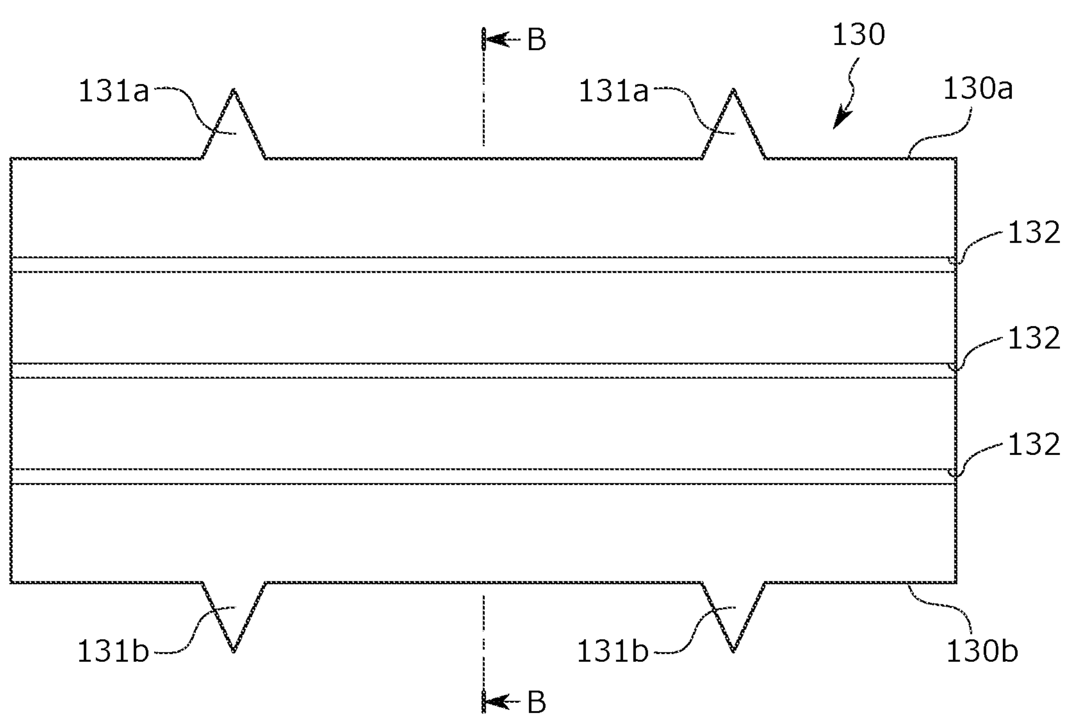
FIG. 14A is a view of an engaging member when viewed from a back surface side of the skin.
Figure 14B:
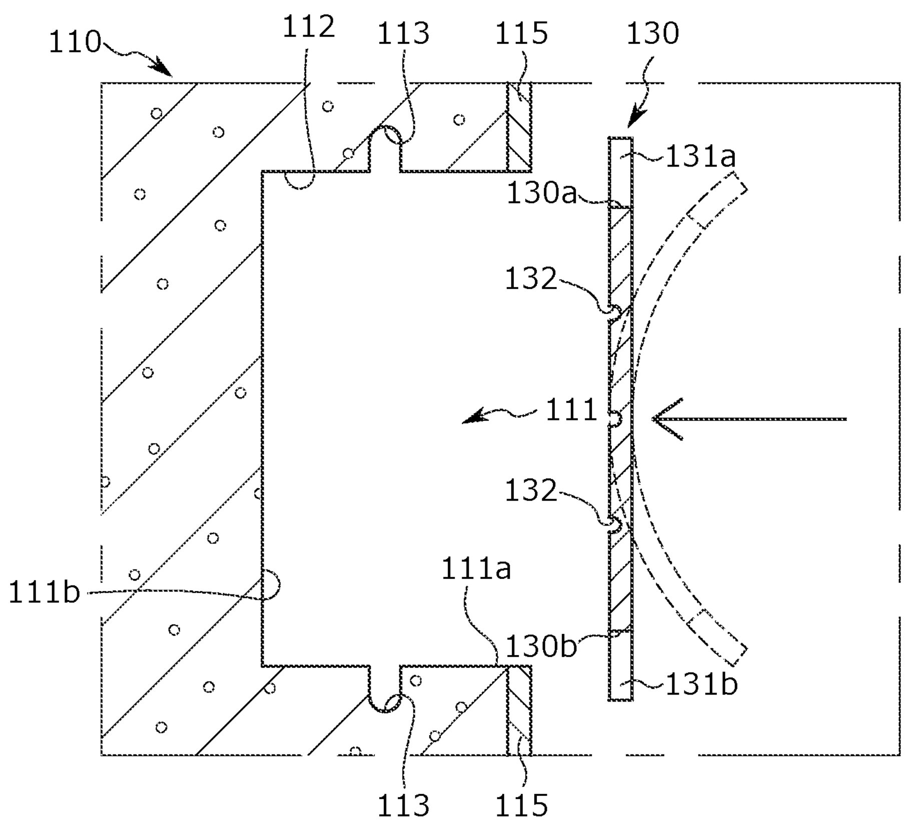
FIG. 14B is a cross-sectional view taken along line B-B of FIG. 14A showing the engaging member.
Figure 14B:
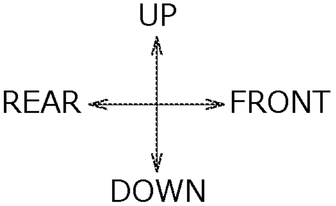

FIG. 11 is a view showing a back surface 120*b* of the skin 120 covering a backrest surface of the seat back S2. FIG. 12 is a view showing an upper portion of the back pad 110 with the skin 120 removed. FIG. 13A is a cross-sectional view showing a state where the skin 120 is attached to the back pad 110, and FIG. 13B is a view showing another example of a recess 111 formed in the back pad 110. FIG. 14A is a view showing an engaging member 130 provided on the skin 120, and FIG. 14B is a cross-sectional view of the engaging member 130.

A connecting member 122 attached along the skin groove 121 is provided on the back surface 120*b* of the skin 120 which covers the backrest surface of the back pad 110. The connecting member 122 is, for example, a member made of resin, nonwoven fabric, or the like. The engaging member 130 that is engageable or disengageable from the back pad 110 is provided at a tip of the connecting member 122. The connecting member 122 and the engaging member 130 are joined by sewing. For that reason, the engaging member 130 is rotatable about a sewing portion with respect to the connecting member 122. As shown in FIGS. 13A and 14A, the engaging member 130 is a resin member formed in a flat plate shape.

Incidentally, an attachment member 123 of the skin 120, which is attached to the back pad 110 on a lower side, is provided on the back surface 120*b* of the skin 120 below the connecting member 122.

In the related art, a J-hook is provided at the tip of the connecting member, and the skin is attached by hooking the J-hook onto a wire embedded in the back pad.

In the vehicle seat S of the present embodiment, the engaging member 130 including an insertion portion 131 insertable into the back pad 110 is provided at one end of the connecting member 122, and the engaging member 130 is detachably fixed to the back pad 110.

In more detail, as shown in FIG. 13A, the recess 111 that engages with the engaging member 130 is formed in the back pad 110, and an inserted portion 113 into which the insertion portion 131 is insertable is formed on an inner wall 112 of the recess 111. For example, the inserted portion 113 is formed in a slit or groove shape on the inner wall 112 to surround a bottom portion 111*b* of the recess 111. By forming the inserted portion 113 that is an undercut portion, on the recess 111, the engaging member 130 can be more firmly engaged with the recess 111. The inserted portion 113 may be a cutout formed on the inner wall 112 to correspond to a tip shape of the insertion portion 131.

In addition, as in the recess 111 shown in FIG. 13B, an inserted portion 113A may be configured as an inclined surface recessed in the vicinity of the center of the inner wall 112. Namely, the recess 111 shown in FIG. 13B is formed such that a width W1 (interval between facing inner walls) in the up to down direction increases from an opening portion 111*a* toward the bottom portion 111*b* of the recess 111. In addition, the recess 111 may be formed such that a width in the right to left direction increases toward the bottom portion 111*b*. In such a manner, by setting the width W1 of the opening portion 111*a* to be smaller than a width W2 of the inserted portion 113A of the recess 111 in the up to down direction, the engaging member 130 that is inserted is made less likely to come off, and can be more firmly attached.

In addition, as shown in FIGS. 12 and 13A, a lining 115 impregnated with resin, paint, or the like is integrally provided around the opening portion 111*a* of the recess 111 as a rigid portion. The lining 115 is a member having a higher rigidity than the back pad 110, and is made of, for example, nonwoven fabric or woven fabric. By providing the lining 115 around the recess 111, the deformation of the opening portion 111*a* of the recess 111 is suppressed, and the holding force of the engaging member 130 is further enhanced. Incidentally, the lining 115 is one example, and the lining 115 may be a plastic plate as a rigid portion. In addition, the rigidity may be increased by directly impregnating the periphery of the recess 111 with resin, paint, or the like.

As shown in FIG. 14B, the engaging member 130 is inserted from the opening portion 111*a* of the recess 111 in a state where the engaging member 130 is bent, and then the engaging member 130 returns to the original flat plate shape, so that the insertion portion 131 is inserted into the inserted portion 113.

By inserting the insertion portion 131 into the inserted portion 113, as shown in FIG. 13A, the engaging member 130 is fixed to the recess 111, and the skin 120 is pulled by the connecting member 122, so that the skin groove 121 is formed on a surface 120*a* of the skin 120.

When the engaging member 130 is removed from the recess 111, by bending the engaging member 130 in the same manner as during insertion and by removing the insertion portion 131 from the inserted portion 113, the engaging member 130 can be disengaged and removed from the recess 111.

In such a manner, by providing the engaging member 130 that is engageable or disengageable from the recess 111, the skin 120 can be detachably attached to the back pad 110 without embedding a wire in the back pad 110.

As shown in FIG. 14A, the engaging member 130 used in the present embodiment is provided with a plurality of the insertion portions 131, and the engaging member 130 is attached to the recess 111 by inserting the plurality of insertion portions 131 into the inserted portion 113. More specifically, the connecting member 122 is provided with two engaging members 130, and two first insertion portions 131*a* are provided at an upper end 130*a* (one end portion) of each of the engaging members 130, and two second insertion portions 131*b* are provided at a lower end 130*b* (the other end portion) of located opposite to the upper end. Incidentally, hereinafter, unless otherwise distinguished, the first insertion portion 131*a* and the second insertion portion 131*b* may be collectively referred to as the insertion portion 131.

As shown in FIGS. 11 and 14A, each of the insertion portions 131 is formed in a protrusion shape, and protrudes from an end portion of the engaging member 130 having a flat plate shape in an in-plane direction. Namely, the insertion portions 131 protrude in an up direction or a down direction in a state where the engaging member 130 is attached to the recess 111. Incidentally, the protruding direction is one example, and the insertion portions 131 may protrude from a right or left end portion of the engaging member 130 in a right direction or a left direction (width direction of the seat).

By forming the insertion portions 131 so as to protrude from the end portions of the engaging member 130 in the in-plane direction, the engaging member 130 is allowed to more strongly resist a force in a direction in which the engaging member 130 is pulled by the connecting member 122 (direction perpendicular to the engaging member 130). Therefore, the engaging member 130 can be more firmly fixed to the back pad 110.

The insertion portions 131 shown in FIGS. 11 and 14A have a triangular shape with a tapered tip. By forming the insertion portions 131 in a triangular shape, the insertion portions 131 are allowed to easily bite into the pad material and to be more deeply inserted into the inner wall 112 of the recess 111. Incidentally, the triangular shape is one example, and the insertion portions 131 may be formed in a quadrilateral shape, a trapezoidal shape, or a semicircular shape.

In addition, as shown in FIGS. 14A and 14B, a plurality of cuts 132 are formed on a back surface side (surface facing the back pad 110) of the engaging member 130. The plurality of cuts 132 are disposed parallel to each other to extend in the right to left direction. By forming the cuts 132, as shown in FIG. 14B, the engaging member 130 is easily flexed when bent. The cross section of the cut 132 may have a semicircular shape as shown in FIG. 14B, or may have a wedge shape. As indicated by dotted lines in FIG. 14B, a worker bends the engaging member 130 until the height of the engaging member 130 including the insertion portions 131 is resized such that the engaging member 130 can be inserted into the opening portion 111*a* of the recess 111, and inserts the engaging member 130 into the recess 111. The engaging member 130 that is inserted returns to the original flat plate shape inside the recess 111, and the insertion portions 131 are inserted into the inserted portion 113, so that the engaging member 130 is fixed. In such a manner, by forming the cuts 132, the engaging member 130 is easily flexed in an insertion direction and is made less likely to bend in a removal direction, so that the engaging member 130 easily enters the recess 111 and is less likely to come off.

Engaging Member: Another Example 1

In the skin 120 shown in FIGS. 11 and 12, the two engaging members 130 are attached to the connecting member 122. The number of the engaging members 130 to be attached is not limited to a plural number, and for example, as shown in the upper part of FIG. 15A, one engaging member 130A may be attached. Since attachment can be performed in one work, the manufacturing process can be simplified. As shown in the lower part of FIG. 15A, one recess 111A is formed in the back pad 110, and the skin 120 is attached to the back pad 110.

Figure 15A:
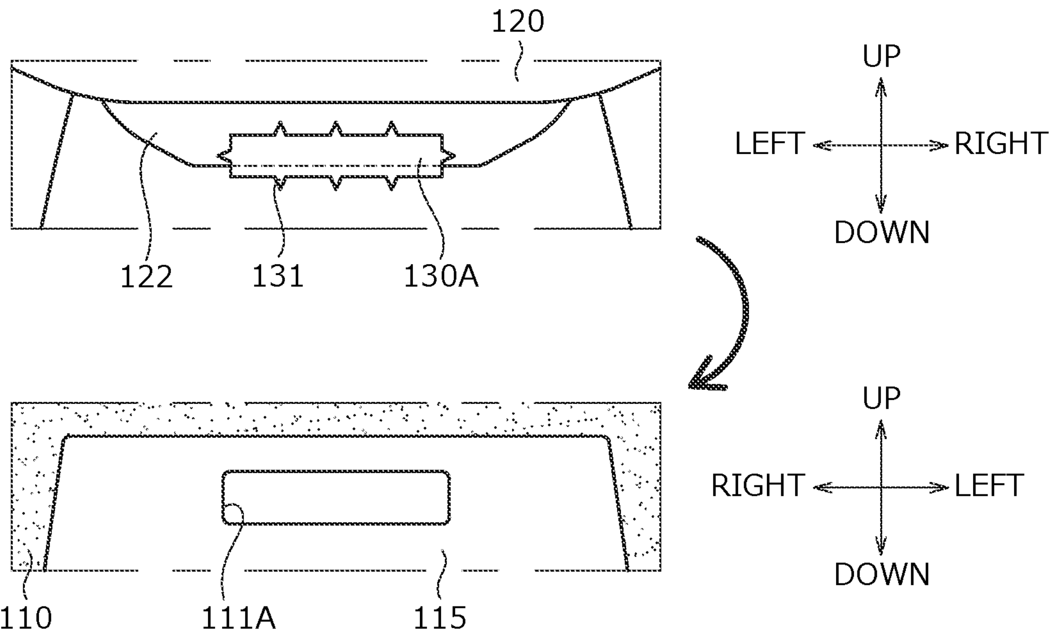
FIG. 15A is a view showing the back surface of the skin showing another example of the engaging member, and is a view showing a recess that engages with the engaging member.

The configuration is such that a length of the engaging member 130A in the seat width direction in the case of attaching one engaging member 130A is formed to be longer than a length of the engaging members 130 in the case of attaching two engaging members 130, so that the skin 120 can be pulled in over a wider range. In addition, as shown in FIG. 15A, three insertion portions 131 are provided at each of an upper end portion and a lower end portion of the engaging member 130A. In addition, the insertion portions 131 are provided not only at the upper and lower end portions of the engaging member 130A, but also at right and left end portions.

Figure 15B:
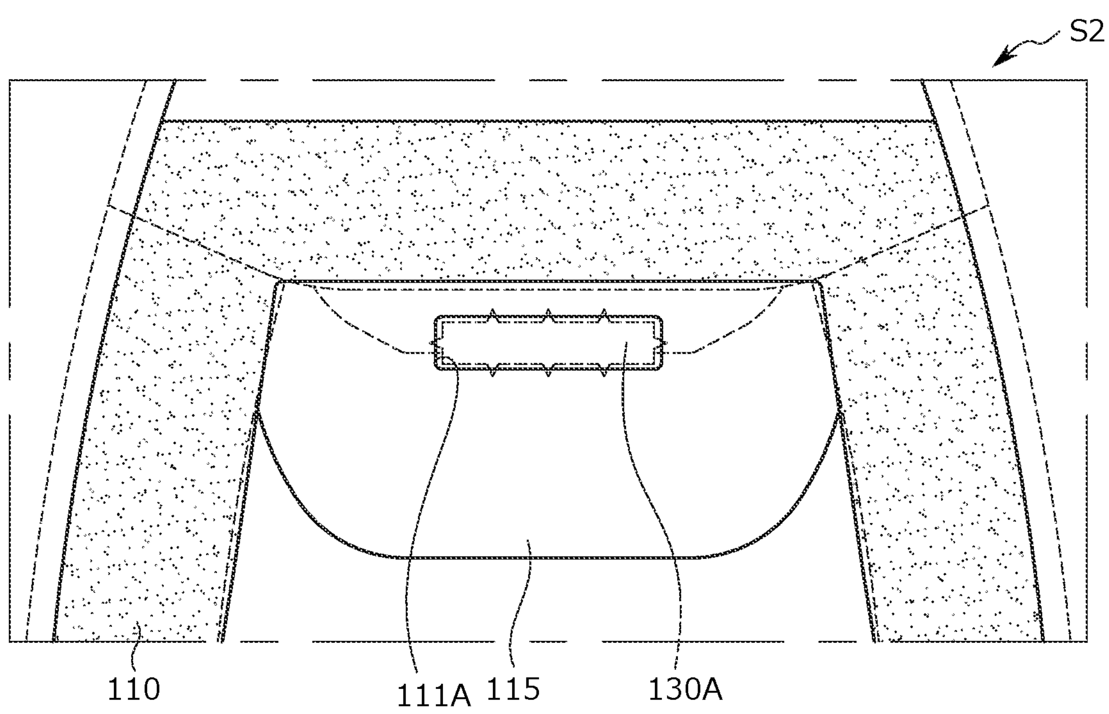
FIG. 15B is a front view of the back pad showing a state where the skin shown in FIG. 15A is attached to the recess.
Figure 15B:
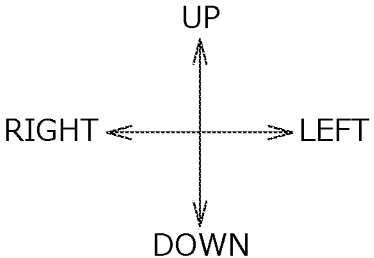

By providing the insertion portions 131 at the respective right and left end portions, as shown in FIG. 15B, when the engaging member 130A is inserted into the recess 111A, the insertion portions 131 bite into not only the upper and lower inner walls 112 but also the inserted portion 113 of the right and left inner walls 112, and the engaging member 130A is more firmly fixed.

Engaging Member: Another Example 2

The engaging member 130 shown in FIGS. 11 to 14B engages with the recess 111 by being inserted into the recess 111 with the engaging member 130 bent and by returning to the original flat plate shape from the bent state after insertion. The method for attaching the engaging member 130 is one example, and for example, as shown in FIGS. 16A and 16B, the engaging member 130B or 130C may be engaged with the recess 111 by inserting the engaging member 130B or 130C into the recess 111 and then by rotating the engaging member 130B or 130C in the direction of arrow A.

Figure 16A:
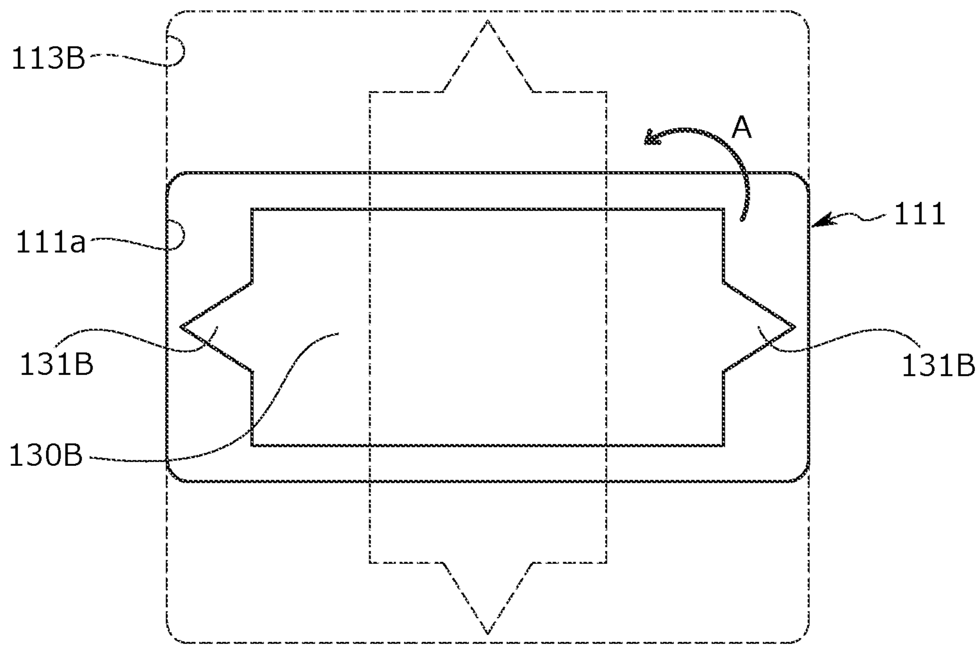
FIG. 16A is a view showing another example of the engaging member, and is a view showing a relationship between the engaging member and a recess.
Figure 16B:
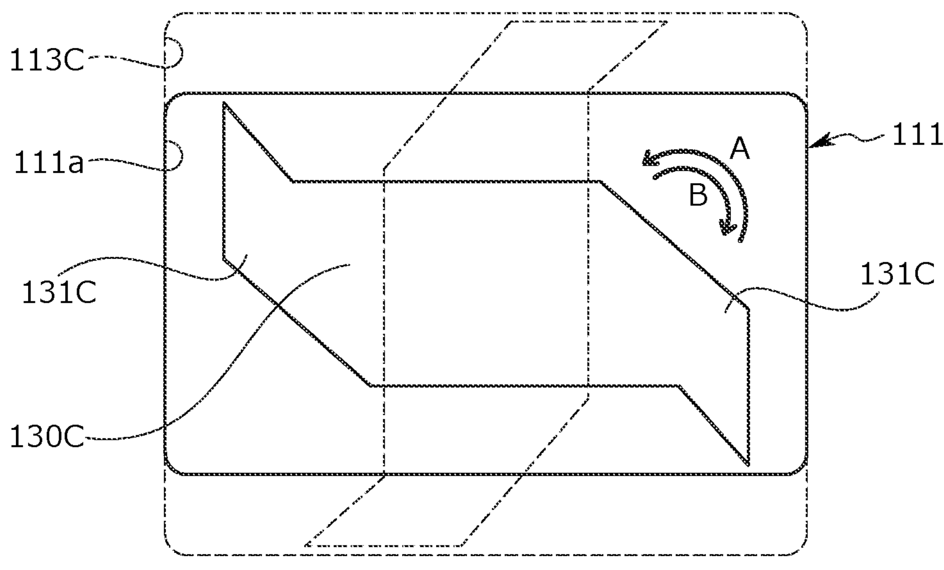
FIG. 16B is a view showing another example of the engaging member, and is a view showing a relationship between the engaging member and a recess.

In more detail, as shown in FIGS. 16A and 16B, the engaging members 130B and 130C including insertion portions 131B and 131C are formed to a size that fits into the opening portion 111*a* of the recess 111. The engaging member 130B or 130C is inserted into the recess 111, and then the engaging member 130B or 130C is rotated in the direction of arrow A. The insertion portion 131B or 131C is inserted into an inserted portion 113B or 113C as indicated by dotted lines. The insertion of the engaging member 130B or 130C into the inserted portion 113B or 113C causes a tip of the engaging member 130B or 130C to bite thereinto, and the engaging member 130B or 130C is engaged with the recess 111.

As shown in FIG. 16A, the insertion portion 131B is formed at each of end portions of the engaging member 130B in the right to left direction. During engagement, the engaging member 130B is rotated, so that the insertion portion 131A is located in the up to down direction. Since the engaging member 130B has a line-symmetrical shape with respect to a center line, the engaging member 130B may be engaged by being rotated not only in the direction of arrow A but also in an opposite direction.

On the other hand, the insertion portion 131C is formed at each of end portions of the engaging member 130C shown in FIG. 16B in the right to left direction; however, an inclined portion is provided in a direction in which the engaging member 130C is rotated during engagement (the direction of arrow A), and the engaging member 130C is formed in a point-symmetrical shape with respect to a center point of the engaging member 130B. Since a side to be inserted during engagement is inclined, the insertion portion 131 easily enters the inserted portion 113C, and is easily rotated by 90 degrees. In addition, a projection portion is provided on a side opposite to the inclined portion, so that the rotation in a direction opposite to an insertion direction (the direction of arrow B) becomes difficult. Therefore, the engaging member 130C is less likely to come off from the recess 111.

Engaging Member: Another Example 3

Figure 17A:
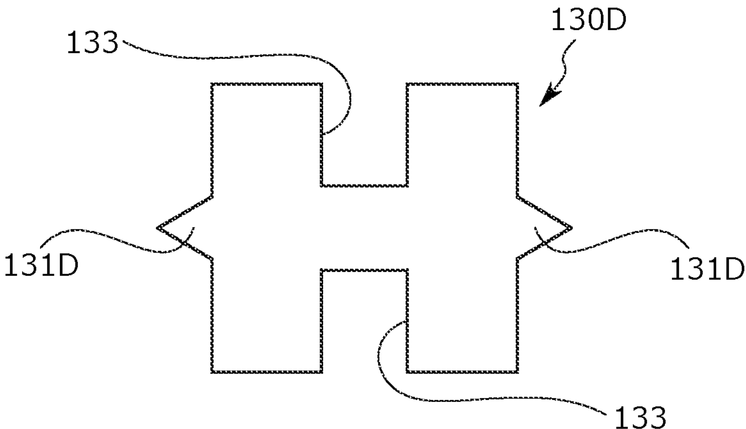
FIG. 17A is a view showing another example of the engaging member.
Figure 17:
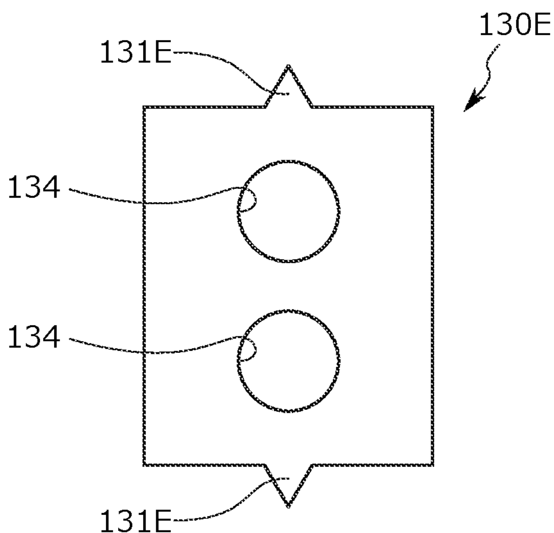
FIG. 17B is a view showing another example of the engaging member.
FIG. 17C is a view showing another example of the engaging member.

In the engaging members 130, 130A, and 130B shown in FIGS. 11 to 16B, a rectangular body is provided with the insertion portions 131; however, as in an engaging member 130D shown in FIG. 17A, cutout portions 133 having a rectangular shape may be formed at parts of a body. Since the cutout portions 133 are formed on upper and lower sides, the engaging member 130D is formed in an H shape as a whole. By forming the cutout portions 133, a central portion of the engaging member 130D is more easily flexed than outer portions, so that as shown in FIG. 17A, insertion portions 131D are provided at right and left end portions of the engaging member 130D.

In addition, as in an engaging member 130E shown in FIG. 17B, two hole portions 134 may be formed at parts of a body on upper and lower sides. The flexing of the engaging member 130E is facilitated by inserting the fingers into the respective hole portions 134 and by pinching the engaging member 130E. In addition, even after the engaging member 130E is attached to the recess 111, the engaging member 130E is easily pinched by using the hole portions 134, so that the removal of the engaging member 130E is facilitated.

Figure 17C:
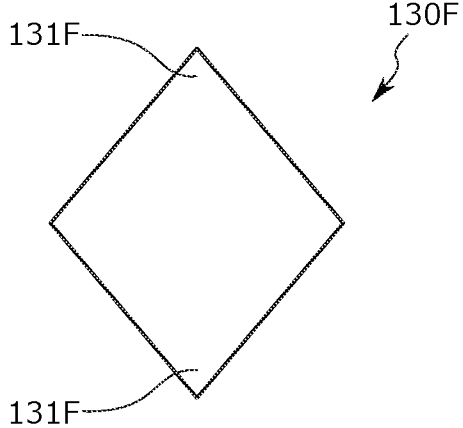

In addition, as in an engaging member 130F shown in FIG. 17C, the engaging member 130F including an insertion portion 131F may be formed in a diamond shape. The engaging member 130F is simply shaped by forming the engaging member 130F in a diamond shape, so that the manufacturing of the engaging member 130F is facilitated.

The vehicle seat according to the second embodiment has been described above with reference to the drawings. Particularly, the pull-in structure for forming the skin groove 121 on the surface 120*a* of the skin 120 covering the back pad 110 of the seat back S2 has been mainly described. However, this application is one example, and the pull-in structure may be applied to the seat cushion S1. Namely, by providing the engaging member 130 including the insertion portions 131 on the back surface of the skin 120 covering the cushion pad 109 of the seat cushion S1 and by engaging the engaging member 130 with a recess formed in the cushion pad 109, the skin 120 may be fixed to the cushion pad 109 to form the skin groove. Similarly to the seat back S2, the skin 120 can be detachably attached to the cushion pad 109 without embedding a wire that is attached in the cushion pad 109 in the related art.

In addition, the present invention can be applied not only to the vehicle seat, but also to seats for various conveyances such as a train, an aircraft, and a ship.

Third Embodiment

A third embodiment relates to a conveyance seat, particularly to a conveyance seat including a seat pad and a skin covering the seat pad.

In the related art, among conveyance seats including a seat cushion, a conveyance seat including a connection member (for example, wire harness) provided inside a seat cushion to connect electrical devices is known (for example, refer to JP 2018-158096 A).

A conveyance seat disclosed in JP 2018-158096 A includes a seat cushion configured by vertically overlapping a first pad member and a second pad member formed to be harder than the first pad member. Further, an accommodation groove (guide groove) for accommodating a harness for connecting electrical devices (electrical components) is formed on the second pad member.

By the way, in the conveyance seat including the pad members having different hardnesses, the pad members in an overlapped state are covered with a skin, but means for suitably attaching the skin to the pad members has been required. For example, it has been required to suppress the unintentional coming-off or misalignment of the skin from the pad members after the skin is attached to the pad members.

In addition, it has been required to suitably hold the harness for connecting the electrical devices and the like inside the seat. For example, when the harness is accommodated in the accommodation groove formed on a surface of the pad member, it has been required to suppress the unintentional coming-off of the harness from the accommodation groove or misalignment in the accommodation groove.

The third embodiment has been made in view of the foregoing problems, and an object of the third embodiment is to provide a conveyance seat in which means for suitably attaching a skin to a pad member is provided.

In addition, another object is to provide the conveyance seat in which means for suitably holding a harness in the pad member is provided.

In the following embodiment, a vehicle seat SA mounted in a vehicle is provided as one example of a conveyance seat, and a configuration example of the vehicle seat SA will be described with reference to FIGS. 18 to 37.

Incidentally, in the following description, a "front to rear direction" is a front to rear direction of the vehicle seat SA, and is a direction that coincides with a forward direction of the vehicle when traveling. In addition, a "seat width direction" is a lateral width direction of the vehicle seat SA, and is a direction that coincides with a right to left direction when viewed from an occupant seated in the vehicle seat SA. In addition, an "up to down direction" is an up to down direction of the vehicle seat SA, and is a direction that coincides with a vertical direction when the vehicle travels on a horizontal surface.

Figure 18:
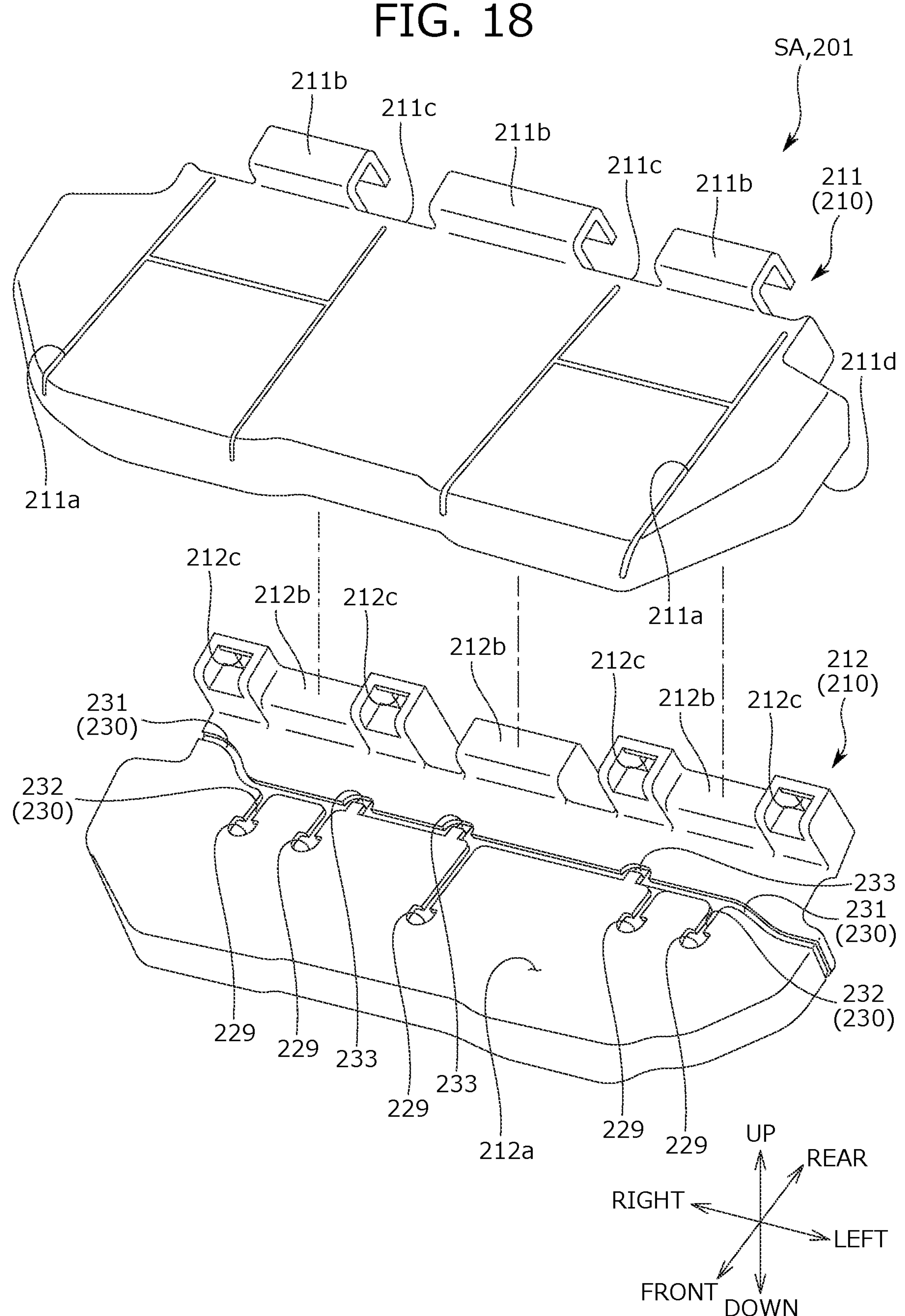
FIG. 18 is an exploded perspective view of a pad member of a seat cushion of a vehicle seat according to a third embodiment.
Figure 19:
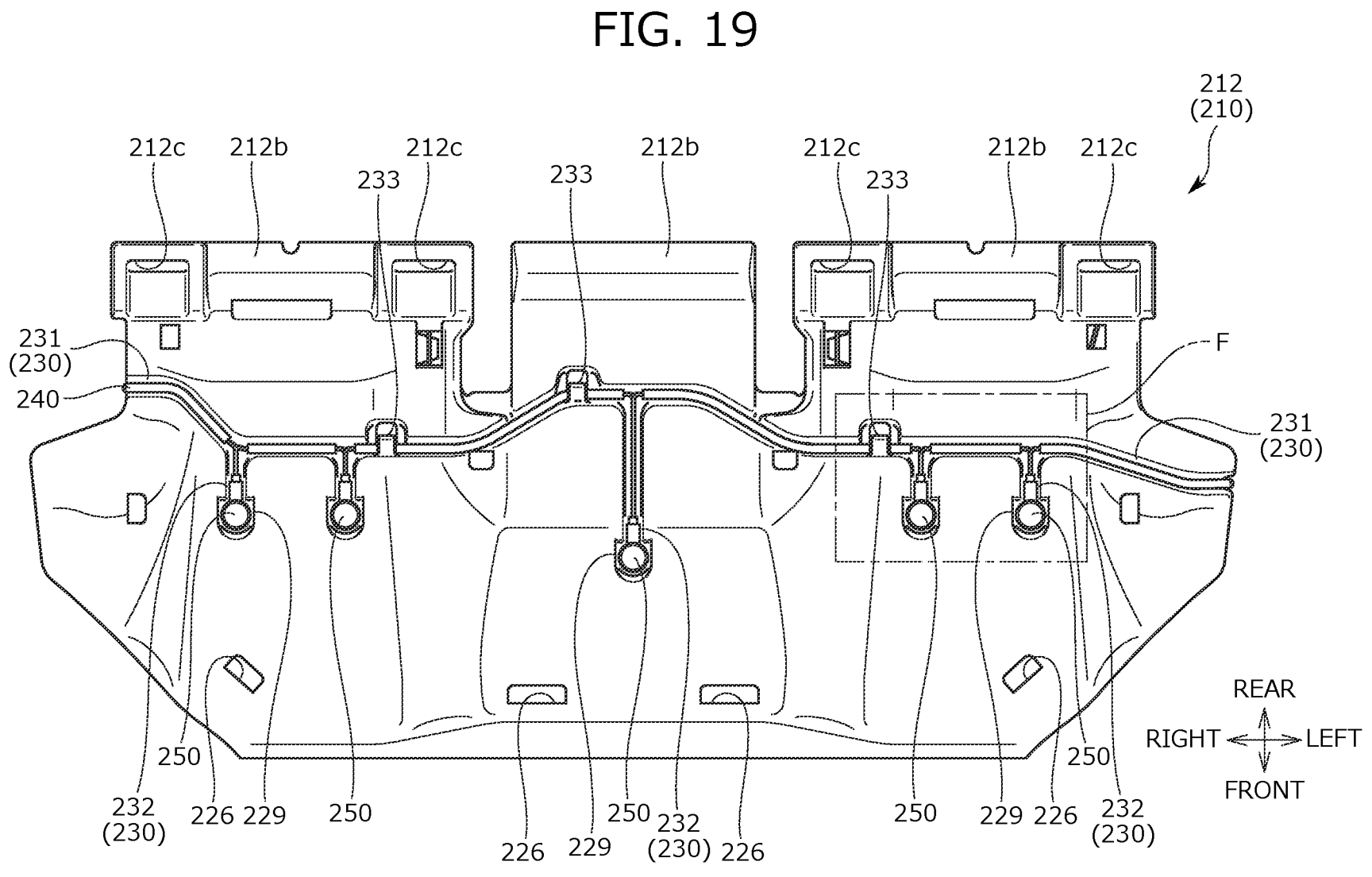
Figure 20:
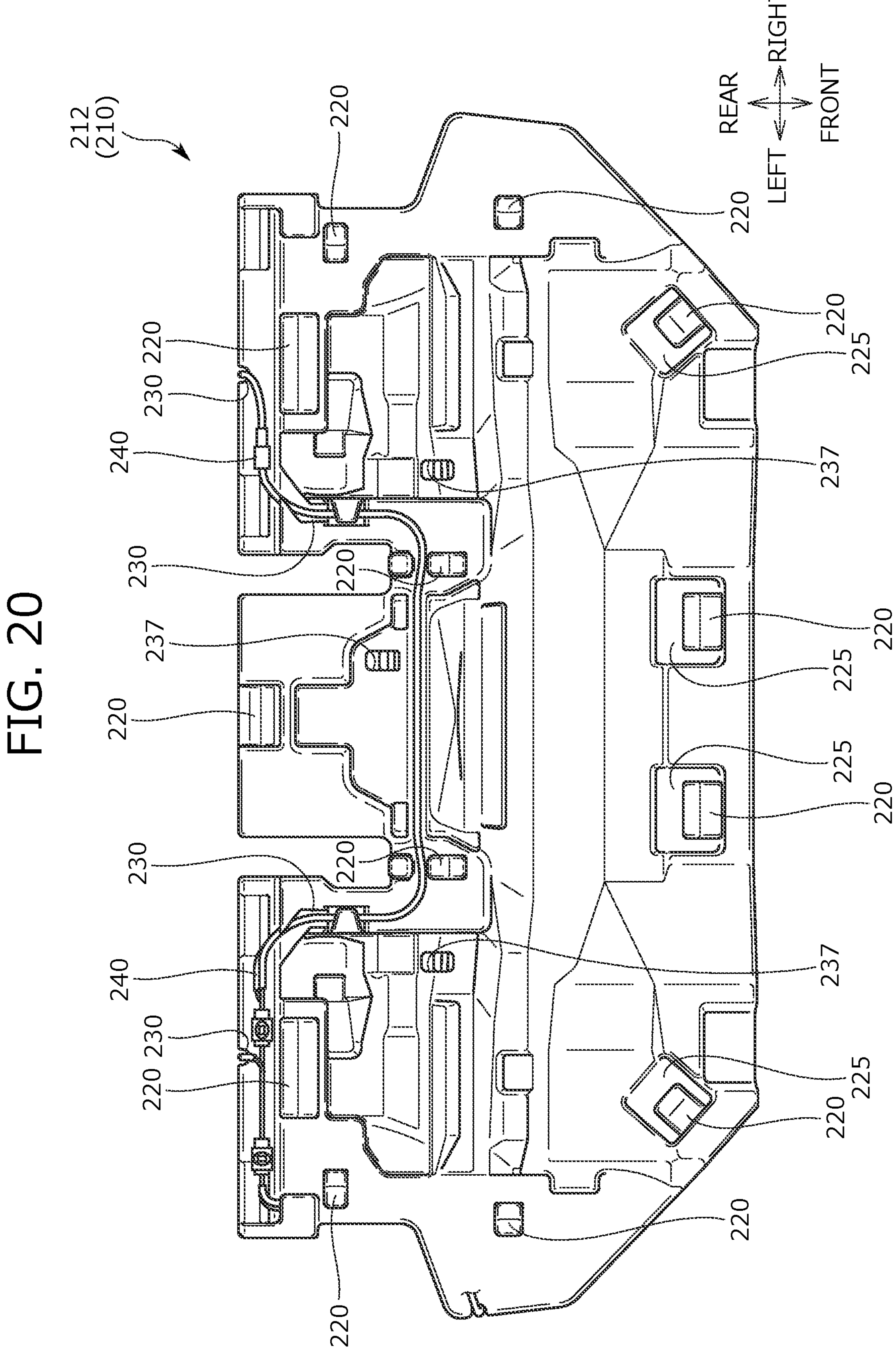
FIG. 20 is a bottom view of the second pad member.
Figure 21:
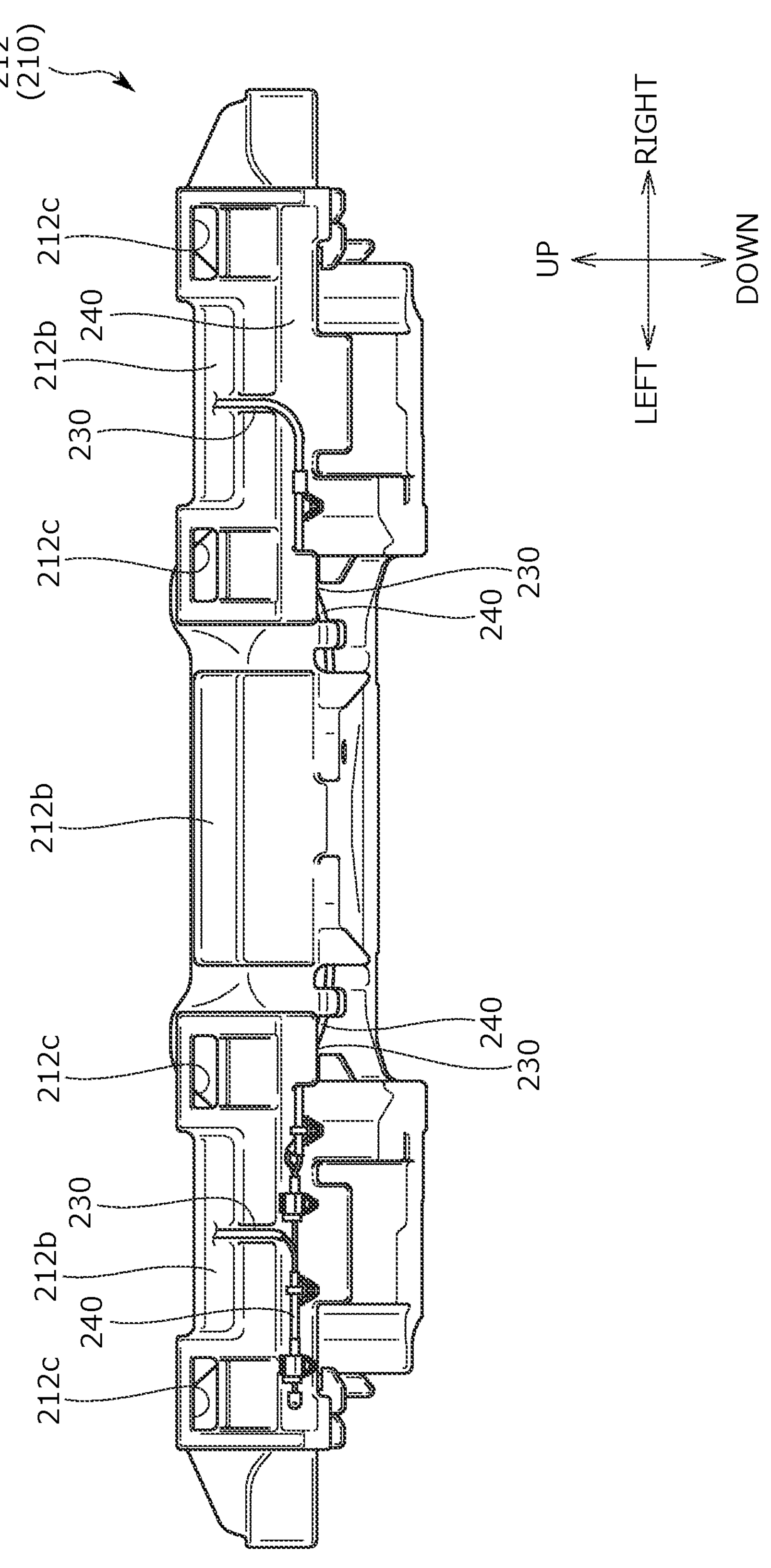
FIG. 21 is a rear view of the second pad member when viewed from the rear.
Figure 22:
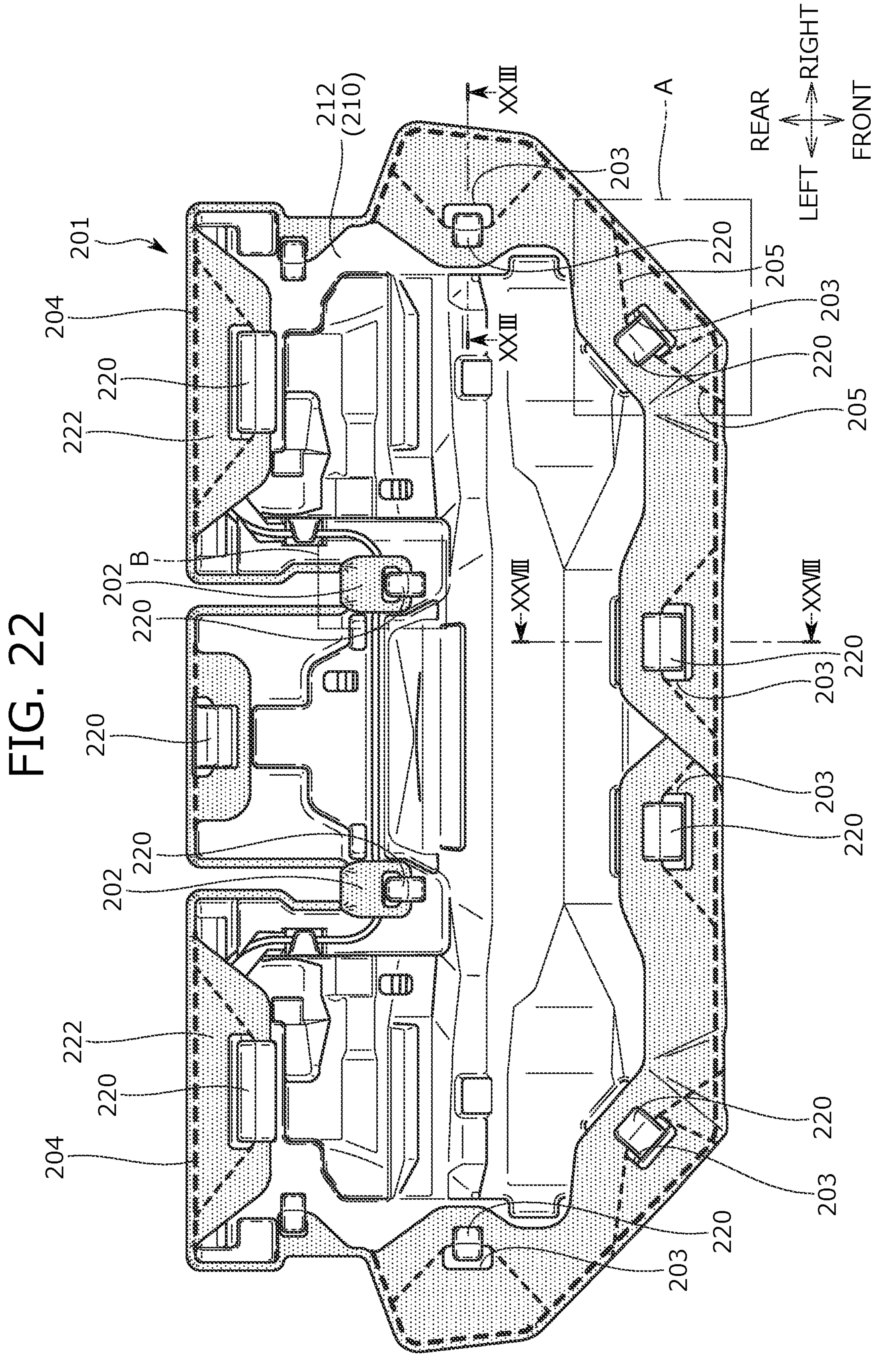
FIG. 22 is a bottom view of the seat cushion showing a state where a skin is attached to the second pad member.

FIG. 18 is an exploded perspective view showing a pad 210 of a seat cushion 201 of the vehicle seat SA according to the third embodiment. FIG. 19 is a top view of a second pad member 212 constituting the pad 210, FIG. 20 is a bottom view of the second pad member 212, and FIG. 21 is a rear view of the second pad member 212 when viewed from the rear. FIG. 22 is a bottom view of the pad 210 showing a state where a skin 202 is attached to the pad 210.

The seat cushion 201 of the vehicle seat SA is a seating portion that supports the seated occupant from below, and includes the pad 210 serving as a body portion of the seat cushion 201, and the skin 202 covering the pad 210.

As shown in FIG. 18, the pad 210 is a pad laminated body formed by vertically laminating a plurality of pad members. The pad 210 includes a first pad member 211 disposed on an upper side (seated occupant side), and the second pad member 212 disposed on a lower side (vehicle body side). The second pad member 212 is formed to be harder than the first pad member 211.

The first pad member 211 is attached to an upper surface of the second pad member 212, and is attached to cover the second pad member 212 from above.

When the first pad member 211 is assembled to the second pad member 212, the first pad member 211 comes into contact with substantially all of the upper surface, a front surface, and both side surfaces of the second pad member 212. In addition, the first pad member 211 comes into contact with a part of a rear surface of the second pad member 212.

The first pad member 211 is made of, for example, a resin material such as urethane foam. In addition, pull-in grooves 211*a* for pulling the skin 202 are formed on an upper surface of the first pad member 211. A plurality of the pull-in grooves 211*a* are formed at intervals in the seat width direction, and includes longitudinal pull-in grooves extending in the seat front to rear direction and lateral pull-in grooves formed at a substantially central portion in the seat front to rear direction and extending in the seat width direction. Further, as shown in FIG. 18, the lateral pull-in groove connects the longitudinal pull-in grooves.

A plurality of attachment recesses 211*b* that hold attachment protrusions 212*b* of the second pad member 212 are provided at the rear of the first pad member 211. Opening portions 211*c* between the attachment recesses 211*b* are formed, and when the first pad member is assembled to the second pad, anchor through portions 212*c* of the second pad member 212 are configured to be exposed from the opening portions 211*c*.

The second pad member 212 is made of, for example, a resin material such as expanded polypropylene (EPP). The second pad member 212 is provided on a back surface 211*d* side of the first pad member 211, and is disposed to overlap the first pad member 211 in the up to down direction.

A sensor accommodation recess 229 for accommodating a detection sensor 250 and an accommodation groove 230 that is provided to be continuous with the sensor accommodation recess 229 and that accommodates a harness 240 are provided on the upper surface of the second pad member 212. The sensor accommodation recess 229 and the accommodation groove 230 are provided to be recessed in a thickness direction of the pad 210.

A plurality of the attachment protrusions 212*b* having a protrusion shape that are provided at intervals in the seat width direction and that are attached to the attachment recesses 211*b* of the first pad member 211, and the anchor through portion 212*c* disposed between the attachment recesses 211*b* adjacent to each other are formed at a rear end portion of the second pad member 212.

The anchor through portions 212*c* are through-holes for passing anchor members (extending members) (not illustrated), specifically, through-holes for passing anchor members for connecting a child safety seat. Incidentally, the anchor members are attached to a vehicle body, and are assembled in a state where the anchor members pass through the anchor through portions 212*c* from the vehicle body to protrude forward from a seat body.

<Skin Hooking Portion 220>

As shown in FIGS. 20 and 22, a plurality of skin hooking portions 220 for hooking and latching an end portion of the skin 202 are provided on a lower surface of the second pad member 212. In addition, hooking holes 203 are formed at the end portion of the skin 202 at positions corresponding to the skin hooking portions 220, and by hooking the hooking holes 203 onto the skin hooking portions 220, as shown in FIG. 22, the skin 202 can be attached to the pad 210 in a state where the first pad member 211 and the second pad member 212 are assembled.

As shown in FIG. 22, each of the skin hooking portions 220 includes a strut portion 221 erected from the lower surface of the second pad member 212, and a claw portion 222 extending from a tip of the strut portion 221, and is formed with an L-shaped cross section as a whole.

Figure 23:
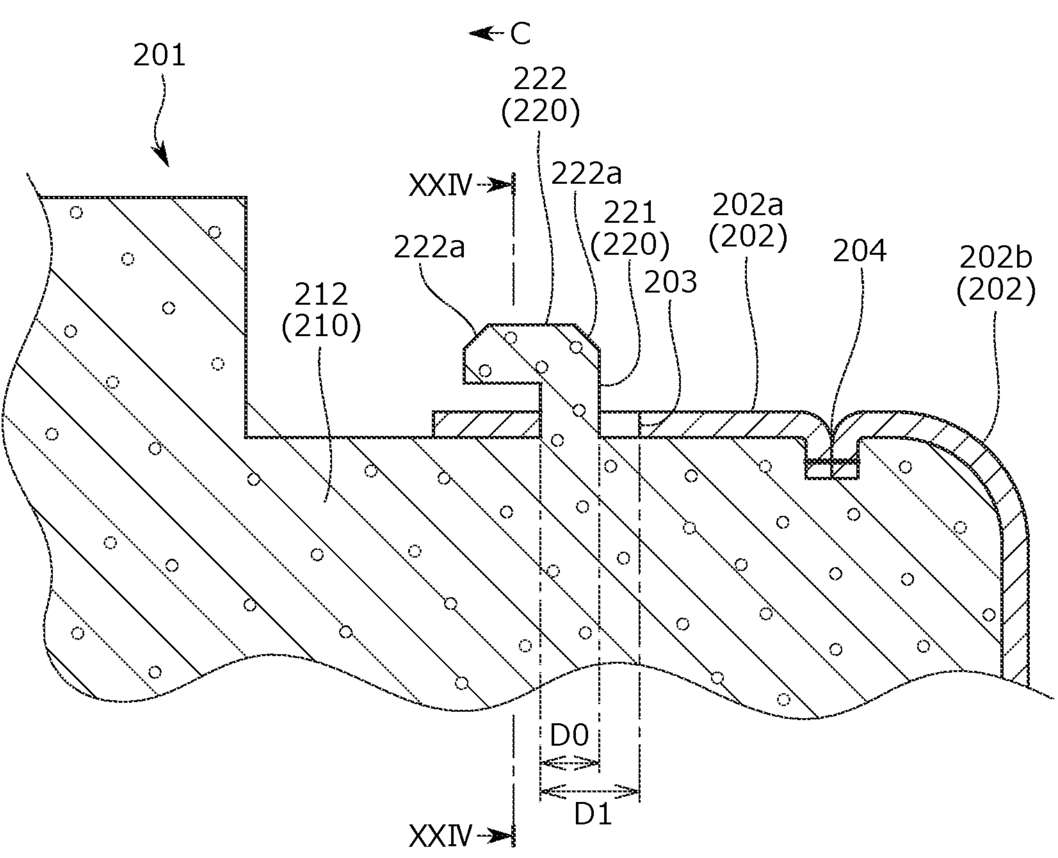
FIG. 23 is a cross-sectional view taken along line XXIII-XXIII of FIG. 22.

The claw portions 222 of the skin hooking portions 220 extend toward the inside of the seat cushion 201 (in the direction of arrow C in FIG. 23). In other words, the claw portions 222 are formed to extend in a direction in which the skin 202 is pulled when the skin 202 is attached.

Since the claw portions 222 extend in the direction in which the skin 202 is pulled, after the skin 202 is attached, the end portion of the skin 202 is less likely to come off from the skin hooking portions 220, and the skin 202 is less likely to come off from the pad 210.

The skin hooking portions 220 for fastening the skin 202 are formed with an L-shaped cross section, and even when the skin hooking portions 220 are damaged for some reason, the skin hooking portions 220 can be easily repaired. Since the skin hooking portions 220 can be easily repaired, even when the skin hooking portions 220 are damaged, for example, there is no need to discard the entirety of the second pad member 212, so that waste can be reduced.

For example, as shown in FIG. 23, the skin 202 is formed by joining a plurality of skin pieces 202*a* and 202*b*. The skin pieces 202*a* and 202*b* are joined by sewing, and for example, a stitch line 204 is provided to be located at a corner portion of the second pad member 212 when the pad 210 is covered.

<Seam 205>

As described above, the hooking holes 203 through which the claw portions 222 of the skin hooking portions 220 or the like pass are formed at the end portion of the skin 202. Since the skin 202 is pulled by the skin hooking portions 220, it is preferable that rigidity in the pulling direction is improved.

Figure 25:
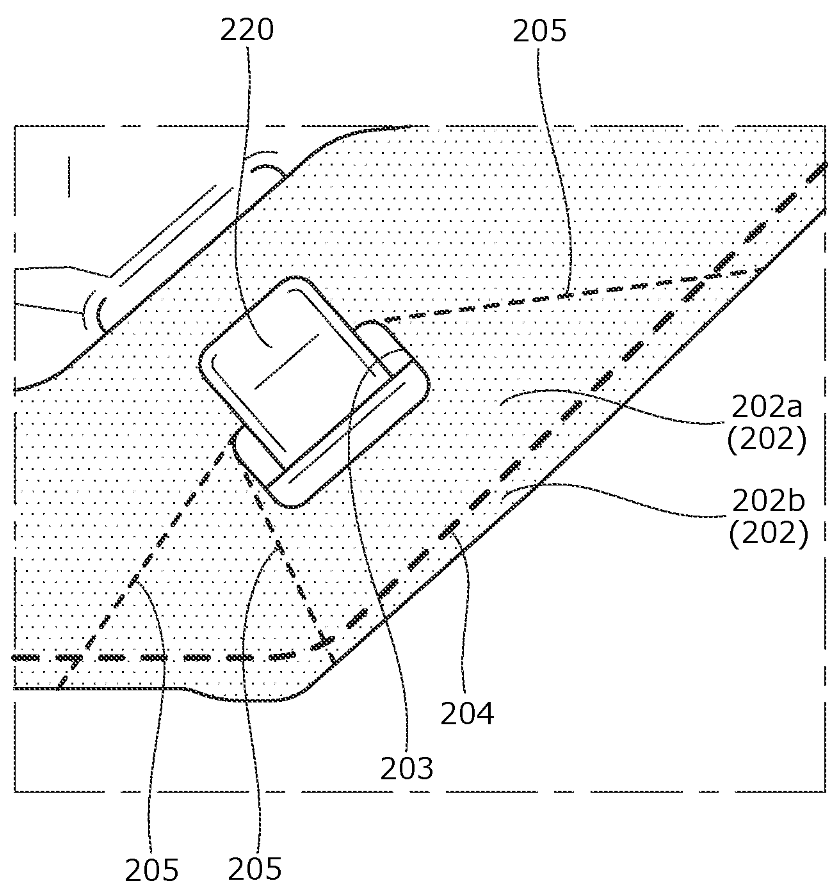
FIG. 25 is an enlarged view showing a portion A of FIG. 22 in an enlarged manner, and is a view showing a seam extending from a skin hooking portion toward a stitch line.

In the present embodiment, as shown in FIG. 25, a seam 205 is provided on the skin 202 along the direction in which the skin 202 is pulled, to increase the rigidity of the skin 202 (in more detail, the skin piece 202*a*). The seam 205 is provided to radially extend toward the stitch line 204 adjacent thereto when the skin 202 is attached to the pad 210. By providing the seam 205 in such a manner, excessive stretching of the skin 202 is suppressed. By making it difficult for the skin 202 to stretch, the skin 202 can be attached with adequate tension.

Incidentally, as shown in FIG. 25, the seam 205 may extend to connect to the stitch line 204. In addition, the seam 205 may be interrupted instead of connecting to the stitch line 204.

Figure 26A:
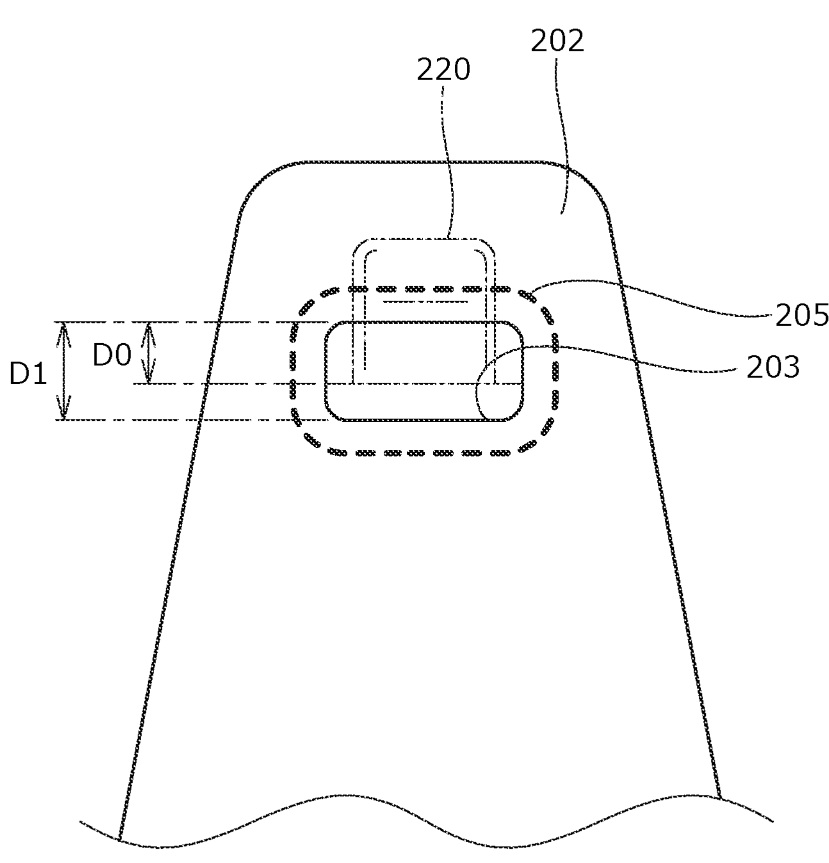
FIG. 26A is an enlarged view showing a portion B of FIG. 22 in an enlarged manner, and is a view showing a seam provided on the skin.
Figure 26B:
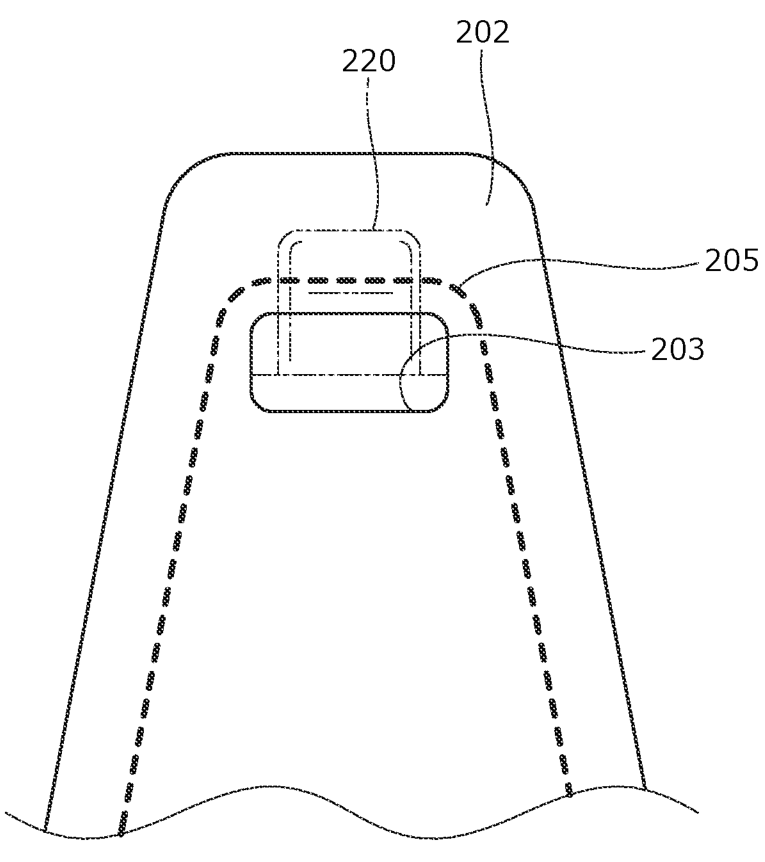
FIG. 26B is a view showing another example of the seam.
Figure 26C:
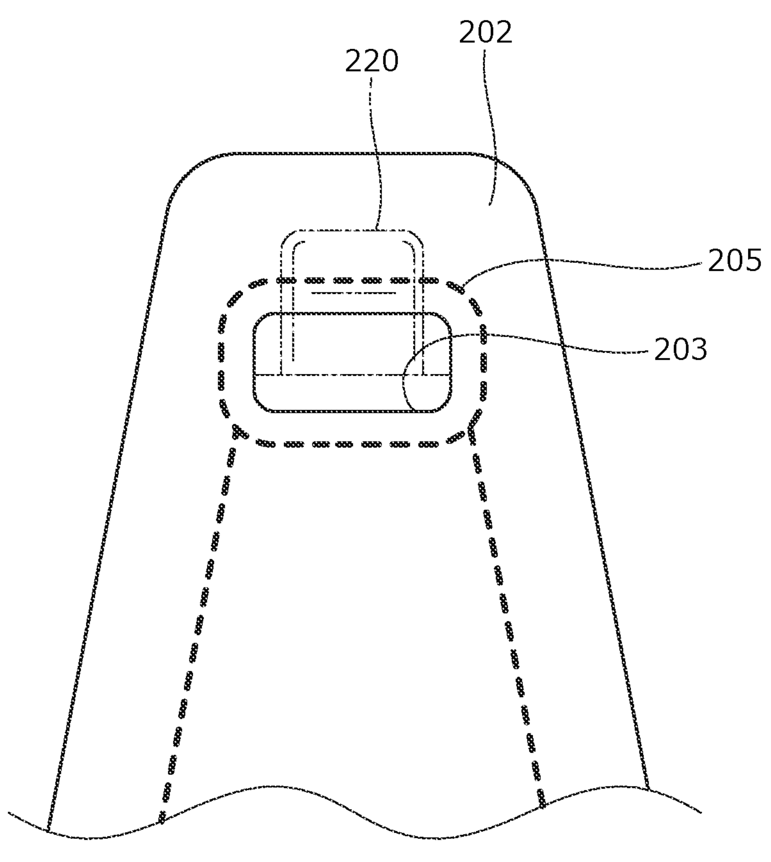
FIG. 26C is a view showing another example of the seam.

As shown in FIGS. 26A to 26C, the seam 205 for increasing the rigidity may be provided around the hooking hole 203 formed in the skin 202.

In the skin 202 shown in FIG. 26A, the seam 205 is provided along the entire circumference of the hooking hole 203.

In the skin 202 shown in FIG. 26B, the seam 205 is provided along a part of the periphery of the hooking hole 203 and along the end portion of the skin 202.

In the skin 202 shown in FIG. 26C, the seam 205 is provided along the entire circumference of the hooking hole 203 and along the end portion of the skin 202.

By providing the seam 205 on the skin 202 in such a manner, the skin 202 is made less likely to stretch, and the seat cushion 201 can be assembled with adequate tension.

Incidentally, the seam 205 provided on the skin 202 may be sewn with a single stitch as in the seam 205 shown in FIGS. 26A and 26B. The workability of sewing is improved by sewing the seam 205 with a single stitch.

When the skin 202 is made of a material that melts when heated (for example, fabric, chemical fiber, PET resin, or the like), in order to improve the rigidity of the hooking hole 203, instead of the seam 205 shown in FIGS. 26A to 26C, a welding portion may be formed around the hooking hole 203 using an ultrasonic welding machine. For example, a reinforcing material such as a resin plate is disposed on a back surface of the skin 202, and the skin 202 and the resin plate or the like are welded. The rigidity around the hooking hole 203 can be improved by welding the resin plate or the like.

In addition, instead of the seam 205 shown in FIGS. 26A to 26C, a melted portion formed by melting the skin 202 itself through heating using an ultrasonic welding machine and by allowing the skin 202 to solidify may be provided. Since the stretching of the melted portion is suppressed, the rigidity of the skin material can be improved. Incidentally, in order to improve the rigidity, both the seam 205 and the melted portion may be formed.

It is preferable that the seam 205 is formed on the skin pieces 202*a* and 202*b* before the skin pieces 202*a* and 202*b* are joined to form the skin 202. In addition, when the seam 205 is automatically sewn using a machine, it is preferable that means for positioning the seam 205 (for example, positioning hole) is provided at a position avoiding the hooking hole 203 formed in the skin piece 202*a*.

<Release Structure>

The hooking hole 203 through which the skin hooking portion 220 passes may be provided with a release structure formed to be larger than the thickness of the strut portion 221 of the skin hooking portion 220. Namely, the hooking hole 203 of the skin 202 covering only a portion that is difficult to flex, such as expanded polypropylene, may be formed to be larger than the thickness of the strut portion 221.

More specifically, as shown in FIGS. 23 and 26A, as the release structure, the hooking hole 203 is formed such that a length D1 of the hooking hole 203 in the direction in which the skin 202 is pulled is larger than a length DO of the strut portion 221. By forming the hooking hole 203 in such a manner, the hooking hole 203 is easily hooked onto the skin hooking portion 220, so that workability during assembly is improved.

<Chamfering of Skin Hooking Portion 220>

In the skin hooking portion 220, as shown in FIG. 23, a corner 222*a* of the claw portion 222 for hooking the skin 202 may be chamfered. The corner 222*a* that is chamfered is a portion at which an upper surface and a side surface of the claw portion 222 are joined, and it is preferable that the corner 222*a* intersecting the direction in which the skin 202 is pulled (the direction of arrow C in the figure) is chamfered.

Figure 24:
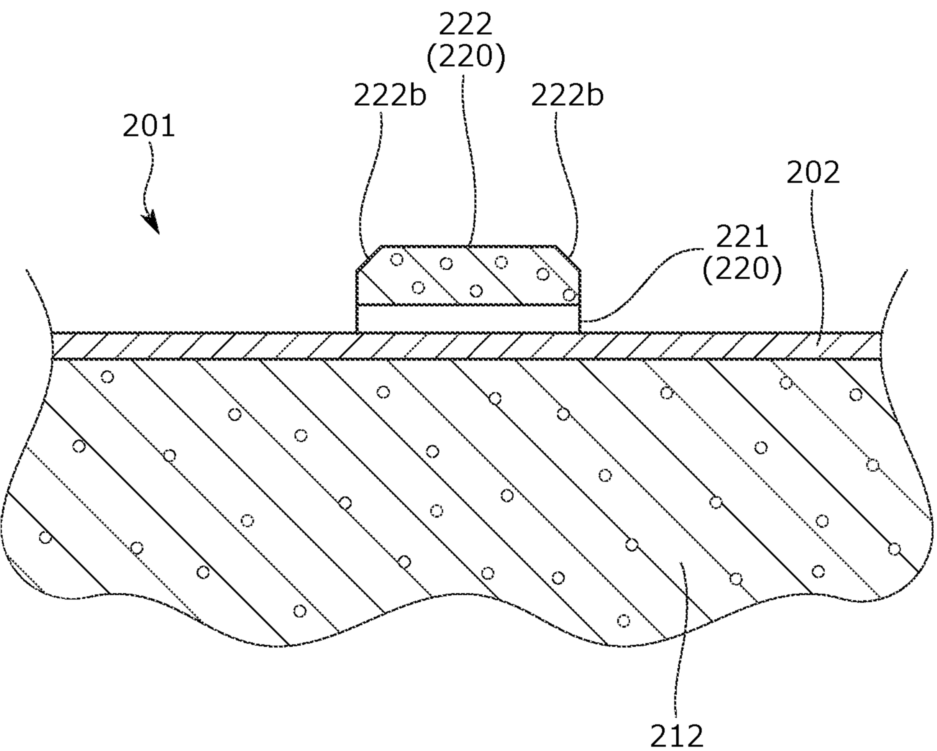
FIG. 24 is a cross-sectional view taken along line XXIV-XXIV of FIG. 23.

In addition, as shown in FIG. 24, a corner 222*b* extending parallel to the pulling direction (the direction of arrow C in FIG. 23) may be chamfered. By chamfering the corners 222*a* and 222*b* of the claw portion 222 of the skin hooking portion 220, the claw portion 222 is easily passed through the hooking hole 203 of the skin 202.

<Bracket 223>

Figure 27:
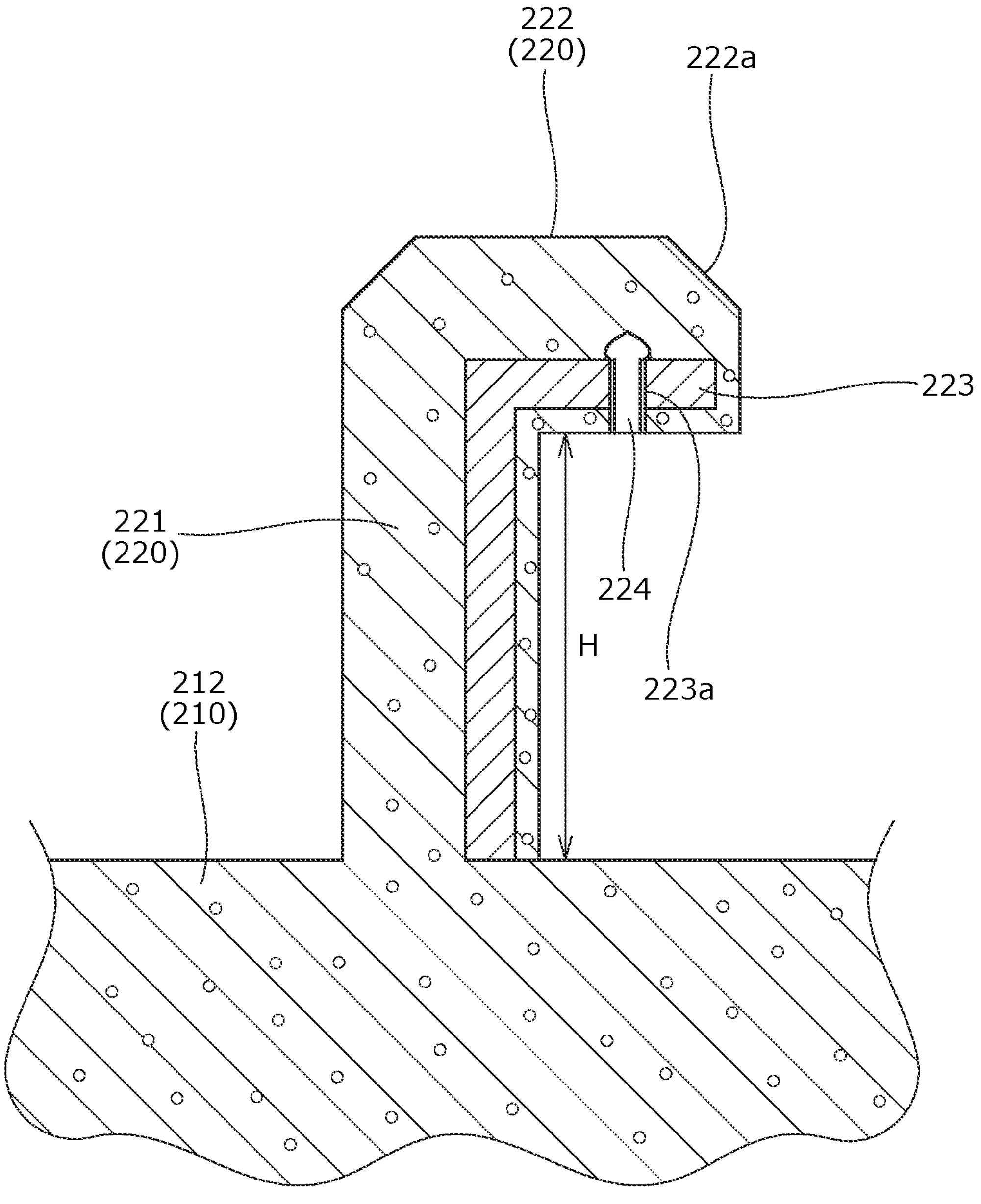
FIG. 27 is a cross-sectional view of the skin hooking portion with a bracket inserted.

As shown in FIG. 27, a bracket 223 having an L-shaped cross section may be inserted inside the skin hooking portion 220. The bracket 223 is preferably made of metal, but may be made of resin. The skin hooking portion 220 is reinforced by inserting the bracket 223 into the skin hooking portion 220. The bracket 223 may be positioned by disposing the bracket 223 up to a tip of the claw portion 222 and by inserting a clip 224 into an insertion hole 223*a* formed at the tip.

Particularly, when a height H of the strut portion 221 is high, in other words, when the claw portion 222 is separated from a surface of the second pad member 212 by a large distance, inserting the bracket 223 is effective.

<Position of Skin Hooking Portion 220>

Figure 28:
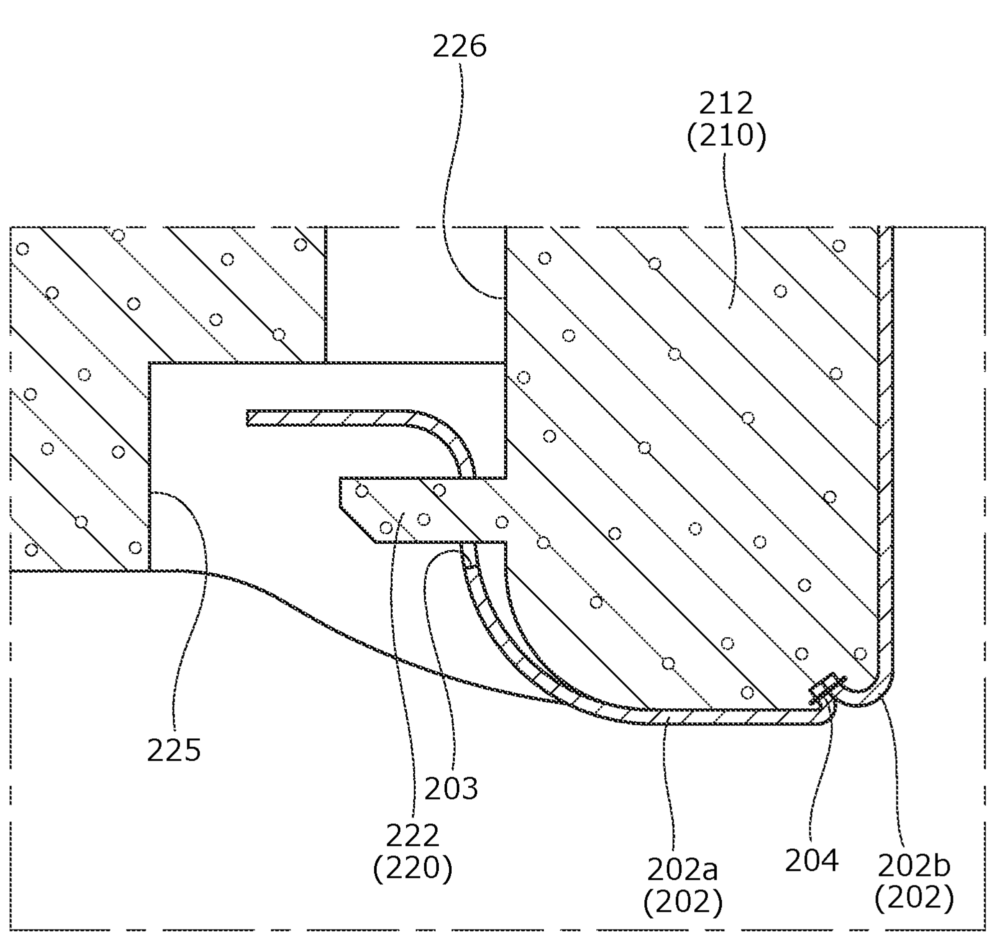
FIG. 28 is a cross-sectional view taken along line XXVIII-XXVIII of FIG. 22, and is a view showing a positional relationship between the skin hooking portion and the stitch line.
Figure 28:
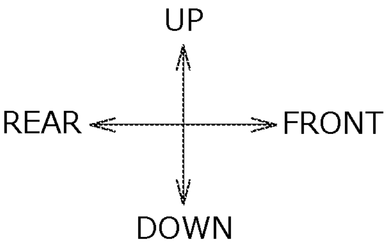

FIG. 28 is a cross-sectional view taken along line XXVIII-XXVIII of FIG. 22, and is a view showing a positional relationship between the skin hooking portion 220 and the stitch line 204 of the skin 202.

In the skin hooking portion 220 shown in FIG. 28, the claw portion 222 extends rearward, and a recess 225 is formed around the claw portion. In addition, a through-hole 226 is formed above the claw portion 222.

As shown in FIG. 28, the position where the skin hooking portion 220 fastens the skin 202, namely, the claw portion 222 of the skin hooking portion 220 is located at a higher position than the stitch line 204 in the vicinity.

By locating the fastening position at a higher position than the stitch line 204, tension is applied to the skin 202, so that the stitch line 204 can appear straight. In addition, the skin hooking portion 220 is less likely to be visible in appearance, and the design appeal of the vehicle seat SA is improved.

<Accommodation Groove 230>

In the second pad member 212, as shown in FIGS. 18 and 19, the accommodation groove 230 for accommodating the harness 240 is provided to face the back surface **211*d* of the first pad member 211**.

The accommodation groove 230 includes a groove body portion 231 extending long in the seat width direction (right to left direction), and a plurality of groove extending portions 232 formed at intervals in the seat width direction and extending from the groove body portion 231 toward the front of the seat.

In addition, a harness latch portion 233 for latching the harness 240 is formed at a predetermined position in an extending direction of the groove body portion 231.

The groove body portion 231 extends in a meandering manner from one end portion (left side position) of the second pad member 212 in the seat width direction to an opposite end portion (right side position) in the seat width direction.

In addition, a plurality of the sensor accommodation recesses 229 that accommodate the detection sensors 250 are formed on an upper surface **212*a* of the second pad member 212. Specifically, one sensor accommodation recess 229 is formed at a center position in the seat width direction, and two sensor accommodation recesses 229** are formed at each of a left lateral position and a right lateral position.

The plurality of groove extending portions 232 are formed to extend forward from the groove body portion 231, and connect the groove body portion 231 and the sensor accommodation recesses 229.

<Harness Latch Portion 233>

A plurality of the harness latch portions 233 latch the harness 240, and are formed at intervals in the extending direction of the accommodation groove 230.

Figure 29:
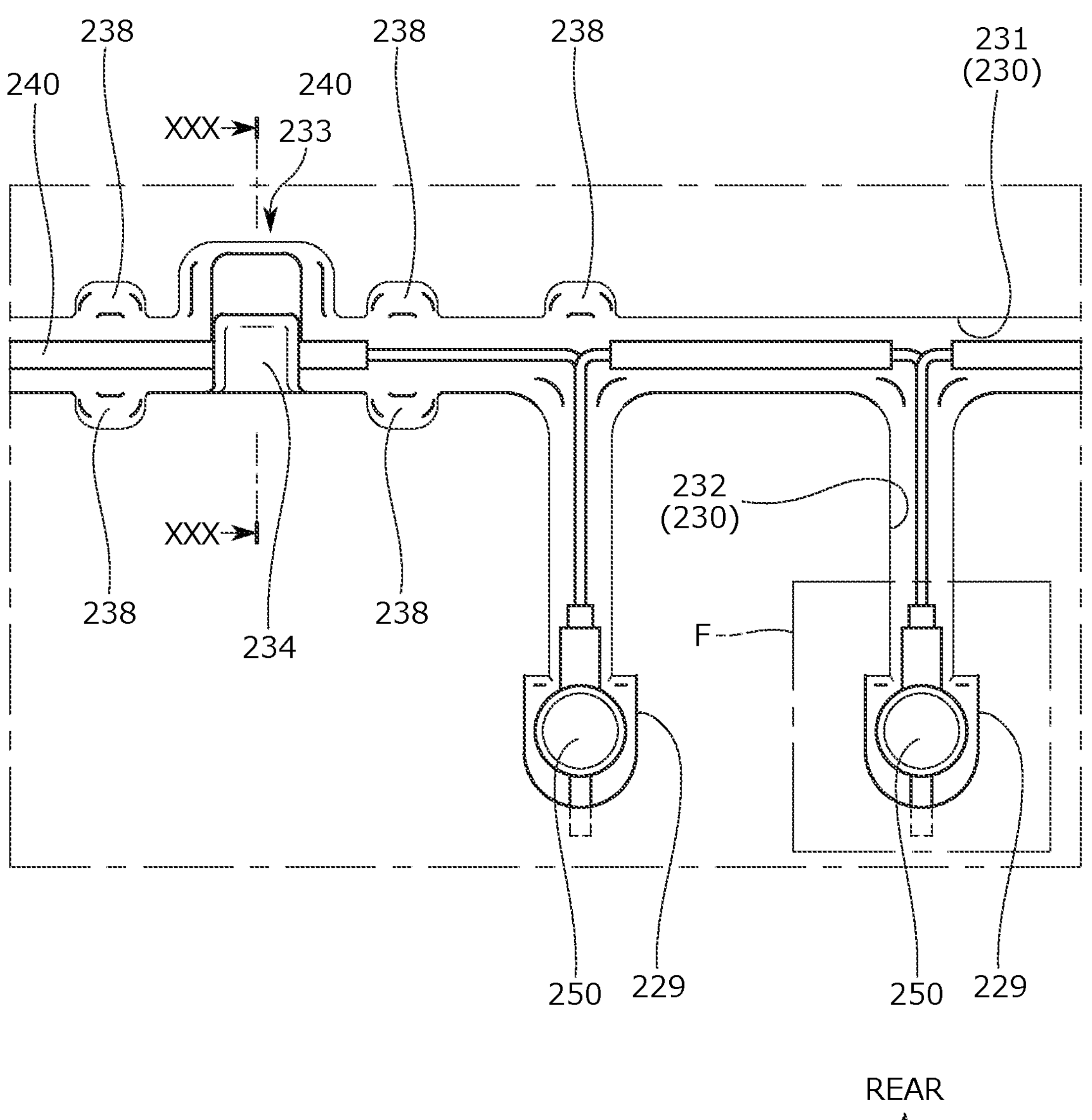
FIG. 29 is a view showing a portion E of FIG. 19 in an enlarged manner.
Figure 30:
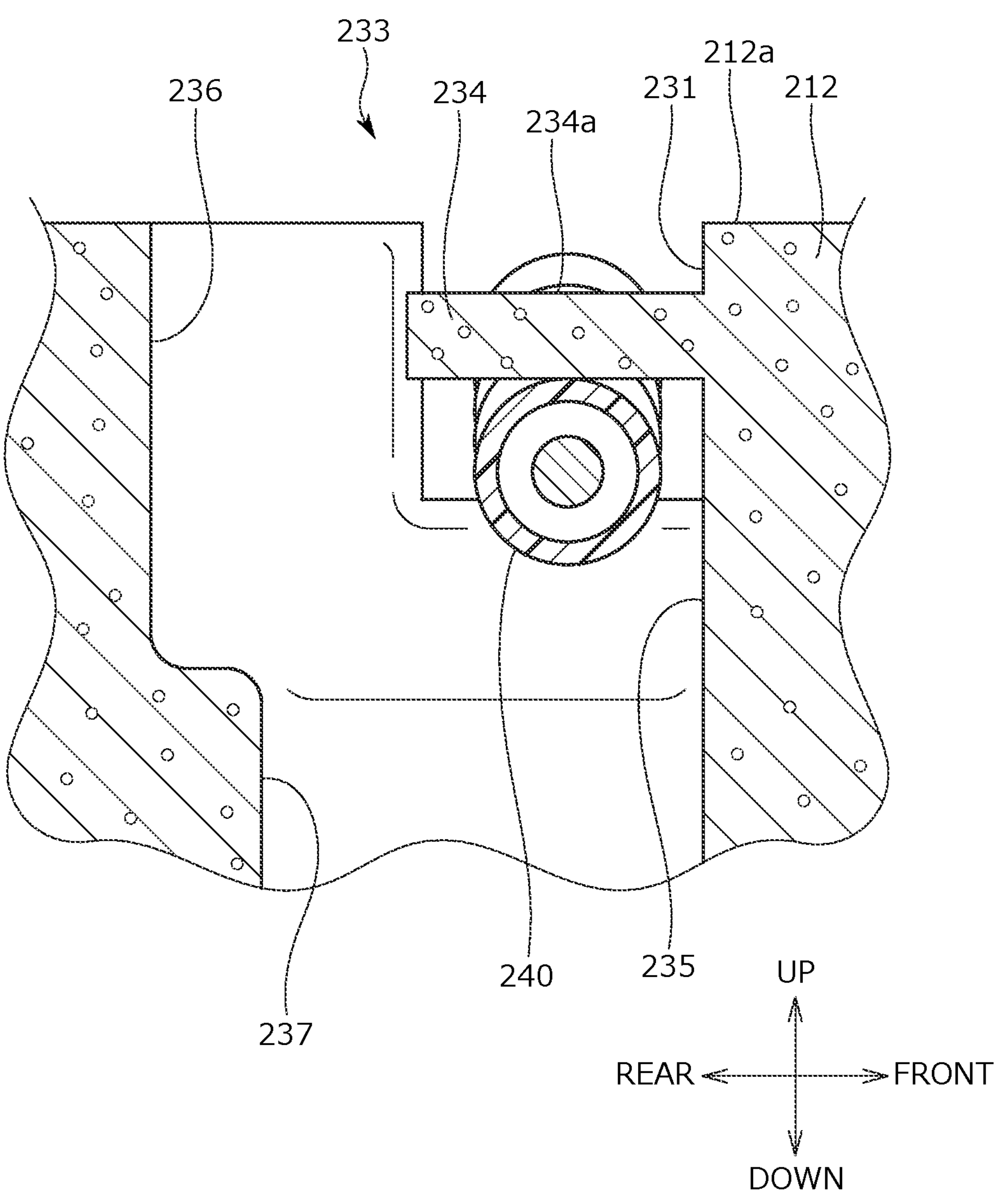
FIG. 30 is a cross-sectional view taken along line XXX-XXX of FIG. 29, and is a view showing a structure of a harness latch portion.

As shown in FIGS. 29 and 30, each of the harness latch portions 233 includes a projection portion 234 that protrudes from one side portion toward the other side portion of the accommodation groove 230 (groove body portion 231) to suppress the coming-off of the harness 240 from the accommodation groove 230.

In addition, each of the harness latch portions 233 is provided with a recess 235 that is provided on a bottom surface of the groove body portion 231 at a position corresponding to the projection portion 234 and that is formed to be recessed downward, and a recess 236 that is formed to be recessed toward the rear of the seat for the insertion of the harness 240. In addition, a through-hole 237 is formed in a bottom surface of the recess 235 to penetrate through the bottom surface in the up to down direction.

In more detail, the projection portion 234 protrudes from an upper portion of a side portion located on the front side of the groove body portion 231 toward a side portion located on the rear side. In other words, as shown in FIG. 29, the projection portion 234 protrudes to extend toward the rear of the seat. For that reason, the projection portion 234 covers the harness 240 accommodated in the accommodation groove 230, from above, so that the harness 240 can be suitably latched.

Further, as shown in FIG. 30, the projection portion 234 is provided on the side portion of the groove body portion 231 such that an upper surface **234*a* of the projection portion 234 is located at a lower position than the upper surface 212*a* of the second pad member 212. For that reason, even when the first pad member 211 is assembled to the second pad member 212, no load is directly applied to the projection portion 234, and damage to the projection portion 234** is suppressed.

<Protruding Direction of Projection Portion 234>

Figure 31:
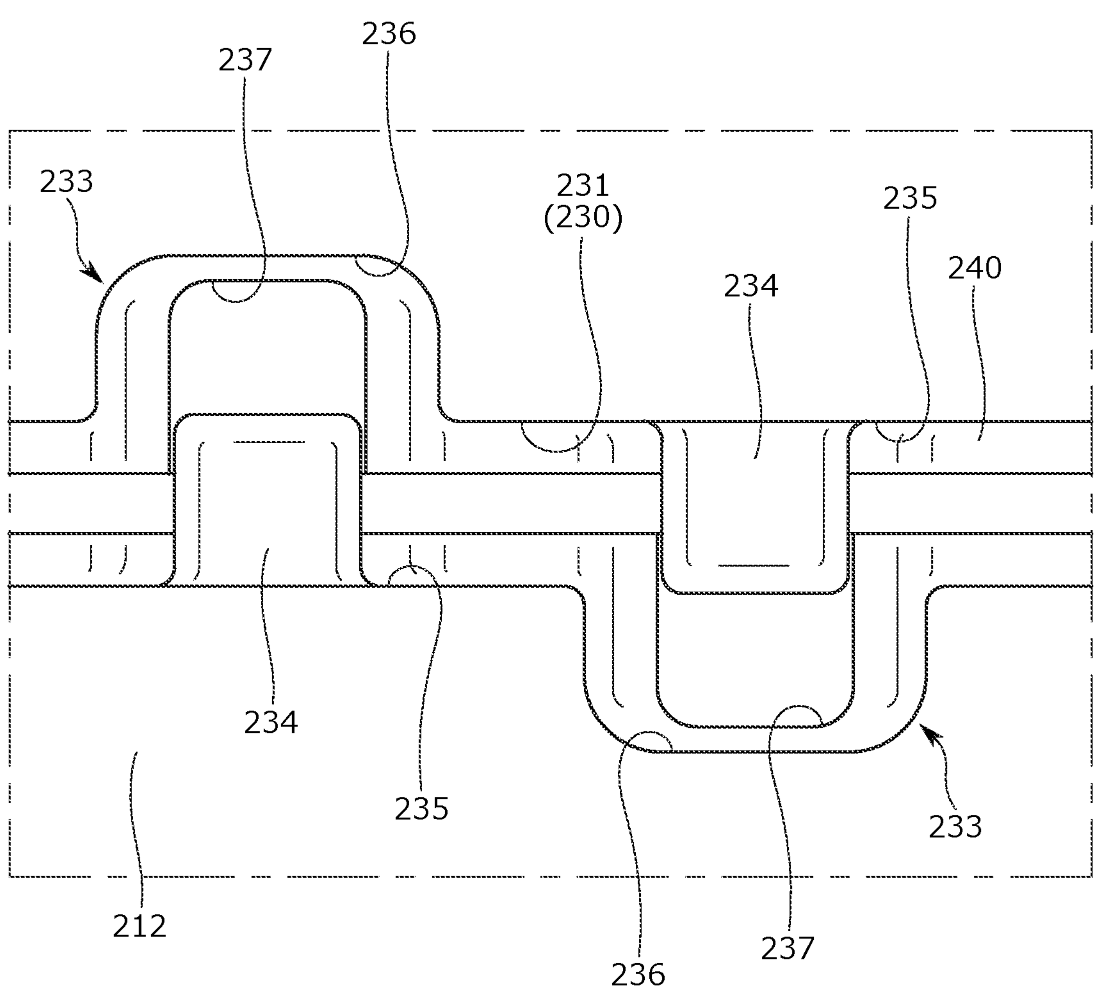
FIG. 31 is a view showing another example of the harness latch portion.
Figure 31:
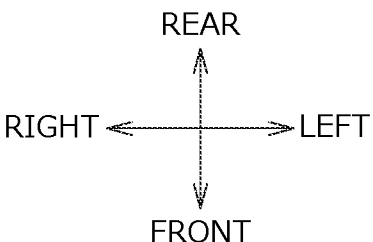

The projection portion 234 of the harness latch portions 233 shown in FIG. 29 extends toward the rear of the seat; however, as shown in FIG. 31, the projection portion 234 may protrude from an upper portion of the side portion located on the rear side of the groove body portion 231 toward the side portion located on the front side. In other words, the projection portion 234 may protrude forward of the seat.

In addition, when the plurality of harness latch portions 233 are disposed, as shown in FIG. 31, the harness latch portions 233 may be provided such that the protruding directions of the projection portions 234 in the harness latch portions 233 adjacent to each other are different from each other. By disposing the harness latch portions 233 such that the protruding directions of the projection portion 234 are different from each other, the coming-off of the harness 240 from the accommodation groove 230 can be more effectively suppressed.

<Release Portion 238>

As shown in FIG. 29, release portions 238 (finger insertion portions) into which a worker inserts the fingers when accommodating or removing the harness 240 from the accommodation groove 230 are provided around the harness latch portion 233 in the groove body portion 231. Specifically, as the release portions 238 for the fingers, four recesses with a size allowing the fingers to fit thereinto are formed on the right and left sides of the harness latch portion 233. By providing the release portions 238 for the fingers, the harness 240 accommodated in the accommodation groove 230 is easily gripped and the removal thereof is facilitated.

The release portions 238 for the fingers may be provided not only around the harness latch portion 233 but also, as shown in FIG. 29, at locations where the harness 240 branches, namely, in the vicinities of bases of the groove extending portions 232 extending from the groove body portion 231. The release portions 238 for the fingers are formed at the locations where the harness 240 branches, as recesses. By forming the release portions 238 for the fingers, the harness 240 is easily gripped and can be easily removed.

In addition, markers indicating the attachment positions of the harness 240 may be added at the locations where the harness 240 branches. The attachment positions of the harness 240 are more easily recognized by adding the markers.

<Position of Accommodation Groove 230>

The accommodation groove 230 is formed on the upper surface 212*a* of the second pad member 212, but is not particularly limited to being formed on the upper surface 212*a*, and may be formed on the lower surface of the second pad member 212. In addition, the accommodation groove 230 may be formed on the back surface of the first pad member 211. In addition, the accommodation groove 230 may be formed on the upper surface of the first pad member 211.

In addition, as shown in FIG. 21, the accommodation groove 230 for passing the harness 240 may be formed on the rear surface of the second pad member 212. The accommodation groove 230 that accommodates a heater harness is formed on the rear surface of the second pad member 212 to extend in a longitudinal direction. The crushing of the harness 240 is suppressed by also forming the accommodation groove 230 on the rear surface in such a manner.

<Method for Fixing Detection Sensor 250>

As shown in FIG. 19, a plurality of the detection sensors 250 that detect the presence or absence of the seated occupants are disposed in the second pad member 212. In more detail, the plurality of sensor accommodation recesses 229 are formed on the upper surface of the second pad member 212, and the detection sensors 250 are accommodated in the sensor accommodation recesses 229. In the related art, the detection sensors 250 are affixed and fixed to the second pad member 212 using a pressure sensitive adhesive or the like. However, when fixing is performed using a pressure sensitive adhesive or the like, a step of applying the pressure sensitive adhesive is required, and it takes time for the pressure sensitive adhesive or the like to be cured.

In the third embodiment, by providing a protruding portion 251 on the detection sensor 250 itself and by inserting the protruding portion 251 into an attachment hole 253 provided in the sensor accommodation recess 229, the detection sensor 250 can be fixed to the sensor accommodation recess 229.

The protruding portion 251 is provided at an end portion 250*b* opposite to an end portion 250*a* at which a coupler insertion portion 254 connected to the harness 240 is provided, and is provided to extend in an insertion direction of the detection sensor 250.

Figure 33:
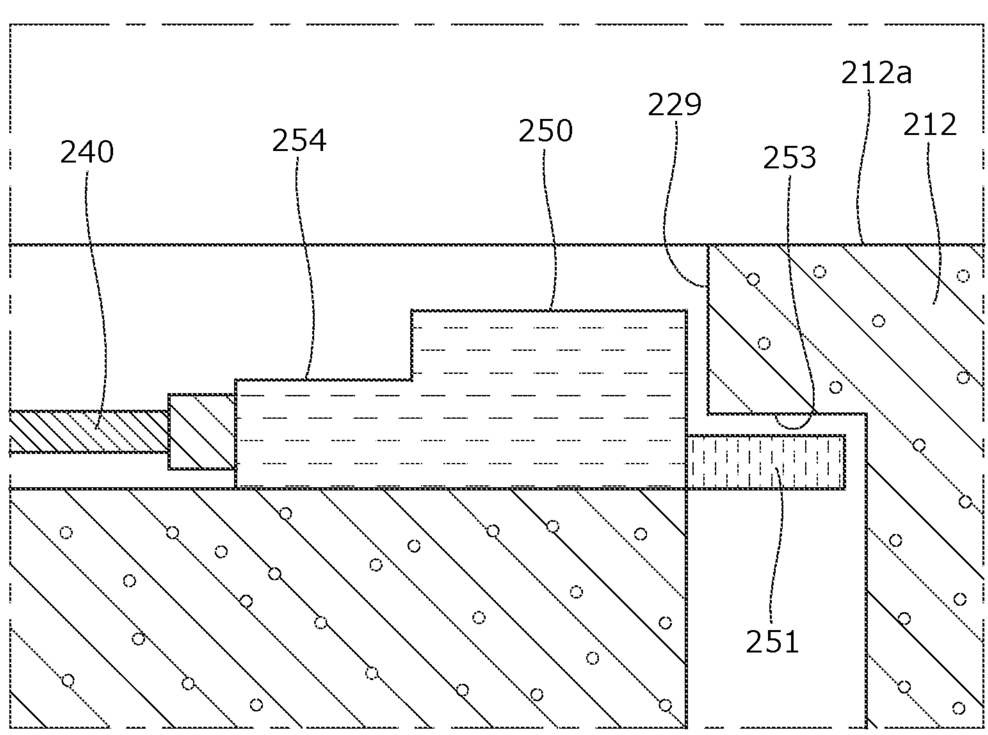
FIG. 33 is a cross-sectional view taken along line XXXIII-XXXIII of FIG. 32, and is a view showing a method for fixing the detection sensor.
Figure 33:
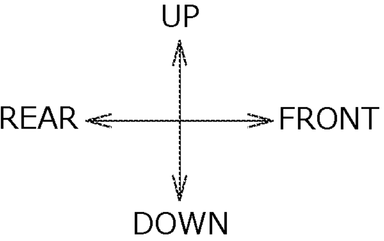

As shown in FIG. 33, the attachment hole 253 is formed in the sensor accommodation recess 229 in advance, and the detection sensor 250 is fixed by inserting the protruding portion 251 into the attachment hole 253.

Since the detection sensor 250 can be attached only by being inserted, the step of applying a pressure sensitive adhesive can be omitted. In addition, by forming the attachment hole 253 in advance, the insertion location of the protruding portion 251 is made clear, so that the detection sensor 250 can be easily attached.

Figure 34A:
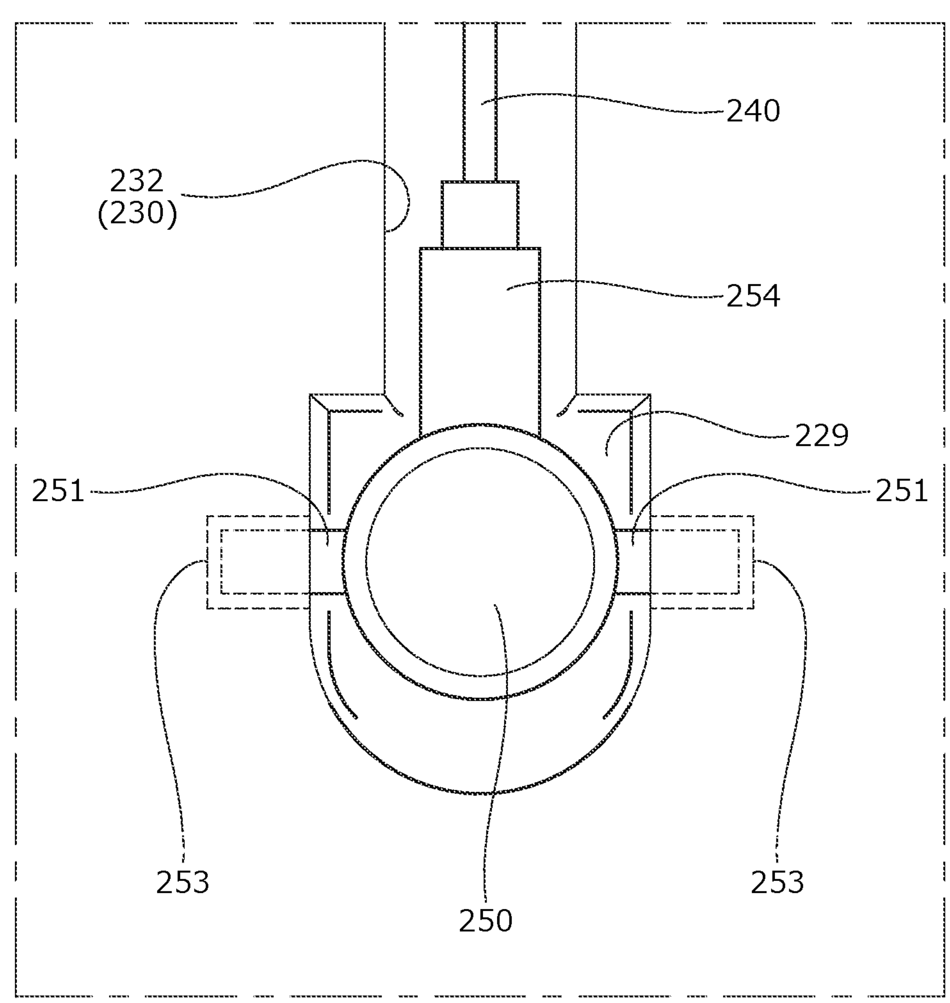
FIG. 34A is a view showing another example of the detection sensor attached to the second pad member.
Figure 34A:
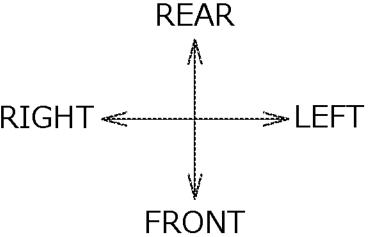

As shown in FIG. 34A, the protruding portions 251 may be provided at both end portions of the detection sensor 250 in the seat width direction (right to left direction). The attachment holes 253 are formed at both side portions of the sensor accommodation recess 229, and the protruding portions 251 at the right and left end portions are stabbed and fixed to the attachment holes 253. The detection sensor 250 can be more firmly fixed to the sensor accommodation recess 229 by fixing the detection sensor 250 using a plurality of the protruding portions 251.

Figure 34B:
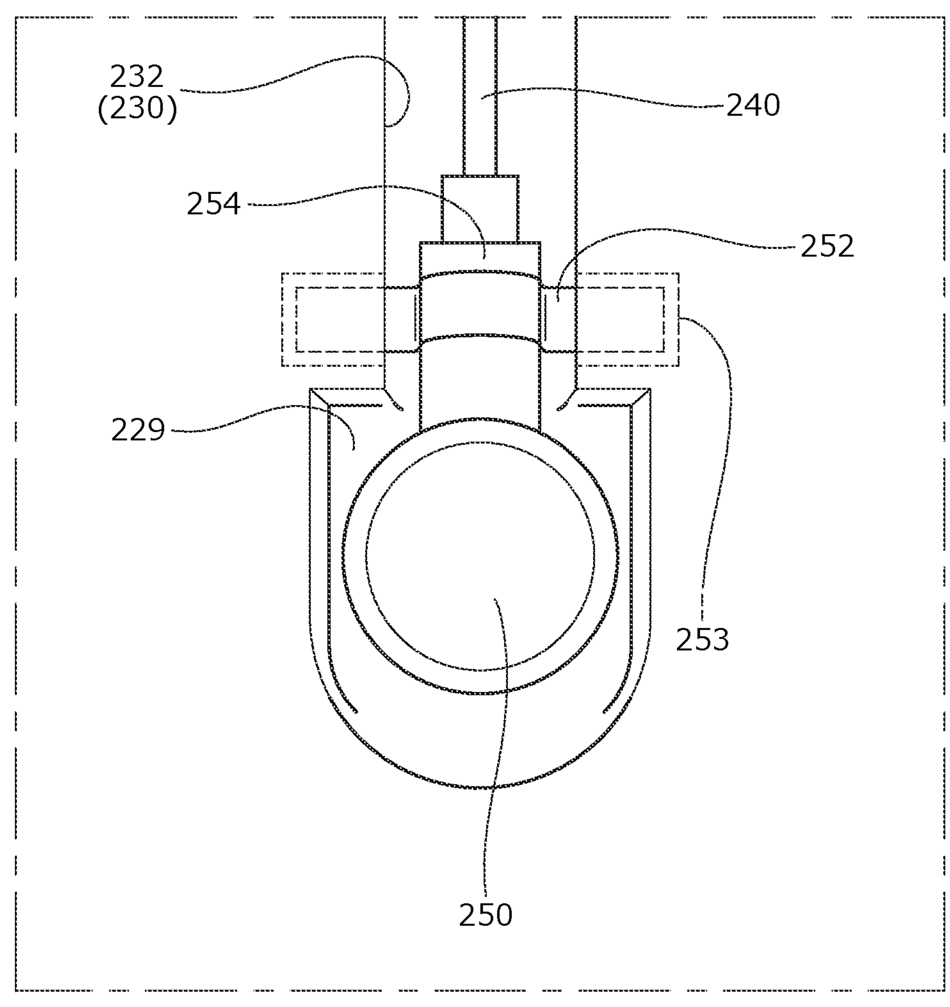
FIG. 34B is a view showing another example of the detection sensor attached to the second pad member.
Figure 34B:
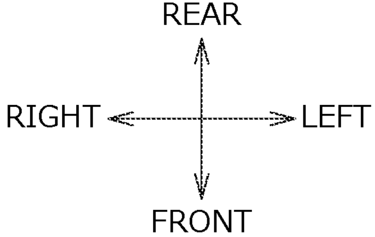
Figure 35:
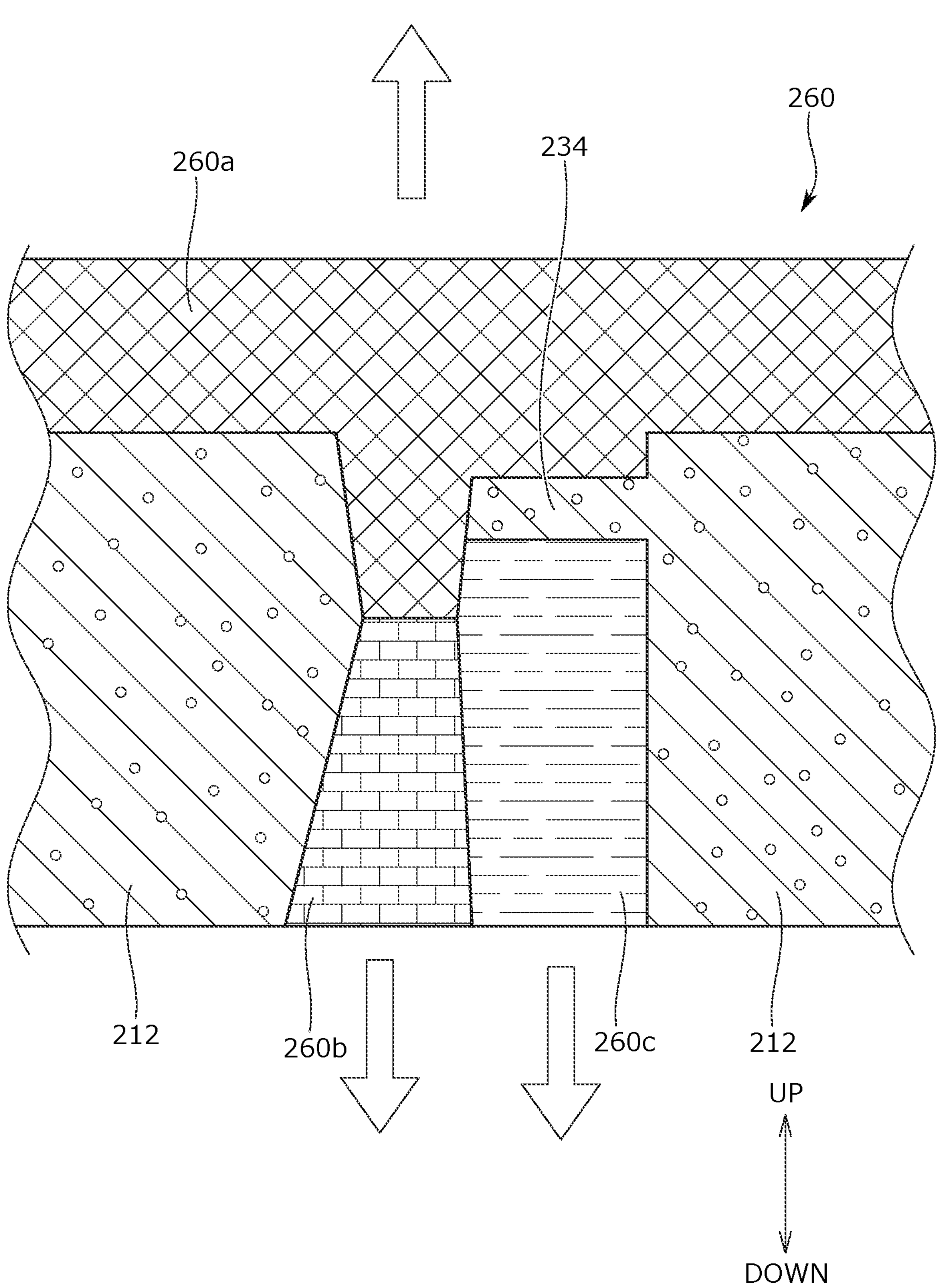
FIG. 35 is an explanatory view of a molding mold for forming the harness latch portion.

In addition, as shown in FIG. 34B, instead of the protruding portion 251, a mat clip 252 may be provided. The mat clip 252 is provided on the coupler insertion portion 254 at a base of the detection sensor 250. The mat clip 252 is a resin or metal plate, and an improvement in rigidity can be expected by attaching the mat clip 252. In this case as well, the attachment holes 253 into which end portions of the mat clip 252 are inserted are formed on both sides of the sensor accommodation recess 229.

Incidentally, the attachment hole 253 may be larger than the protruding portion 251 or the mat clip 252. When the attachment hole 253 is larger, the protruding portion 251 or the mat clip 252 is easily stabbed.

When the attachment hole 253 is smaller than the protruding portion or the mat clip, it is difficult to stab the protruding portion or the mat clip, but the position is easily determined without wobbling.

The attachment hole 253 is formed at the same time when the second pad member 212 is foam-molded.

Incidentally, the attachment hole 253 may not be formed in the sensor accommodation recess 229, and in this case, the detection sensor 250 is attached by directly stabbing the protruding portion 251 into the side portion of the sensor accommodation recess 229.

<Molding Mold 260>

Figure 32:
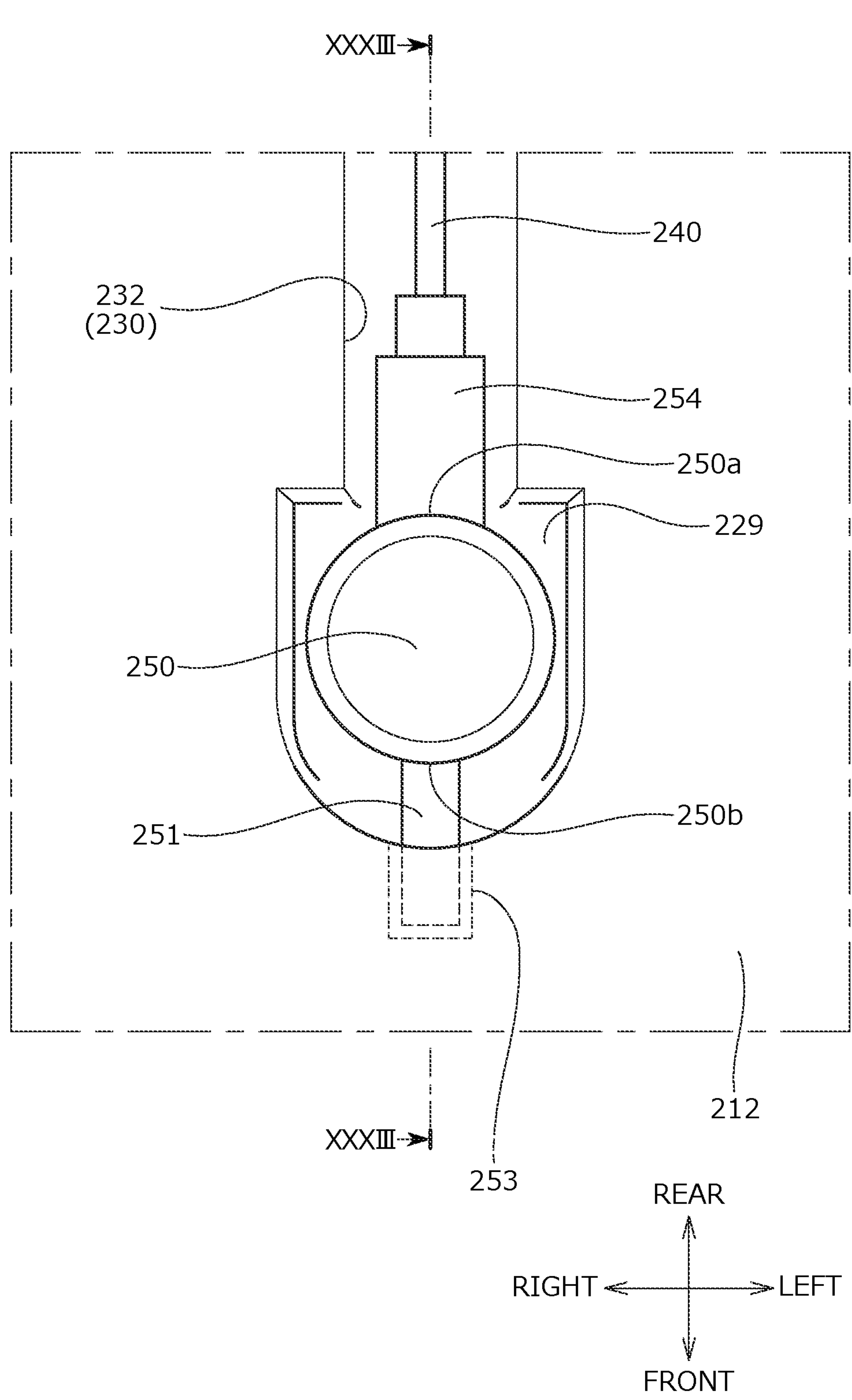
FIG. 32 is a view showing a portion F of FIG. 29 in an enlarged manner, and is a view showing a detection sensor fixed to the second pad member.

A method for forming the harness latch portion 233 will be described with reference to FIG. 32. FIG. 32 is a cross-sectional view schematically showing a configuration of a mold for forming the harness latch portion 233. When the harness latch portion 233 is formed, it is preferable that the harness latch portion 233 is formed by combining a plurality of molding molds 260, and as shown in FIG. 32, it is preferable that the harness latch portion 233 is formed using three types of the molding molds 260 (a first mold 260*a* to a third mold 260*c*).

More specifically, the through-hole 237 is formed by bringing the first mold 260*a* and the second mold 260*b* into contact with each other, and the projection portion 234 of the harness latch portion 233 is formed by the first mold 260*a* and the third mold 260*c*. In this case, it is preferable that the first mold 260*a* is shaped such that the width tapers downward, and that the second mold 260*b* and the third mold 260*c* are shaped such that the width tapers upward. The ease of removing the first mold 260*a* to the third mold 260*c* is improved by forming the molding mold 260 in such a manner.

In addition, it is preferable that the second mold 260*b* and the third mold 260*c* are not integrated with each other. Namely, by using separate members for the second mold 260*b* and the third mold 260*c*, the second mold 260*b* and the third mold 260*c* can be separately removed after the second pad member 212 is formed. By using separate members, manufacturing is facilitated, and the molds are easily filled up to a tip portion of the projection portion 234 with expanded polypropylene (EPP).

<Harness Attachment Plate 241>

The seat cushion 201 is assembled by forming the pad 210 through placing the first pad member 211 on the second pad member 212, and then by wiring the harness 240, by covering the pad 210 with the skin 202, and by hooking the end portion of the skin 202 onto the skin hooking portion 220.

Attaching the harness 240 to the back surface of the skin 202 in advance during assembly is convenient for wiring the harness 240.

Figure 36:
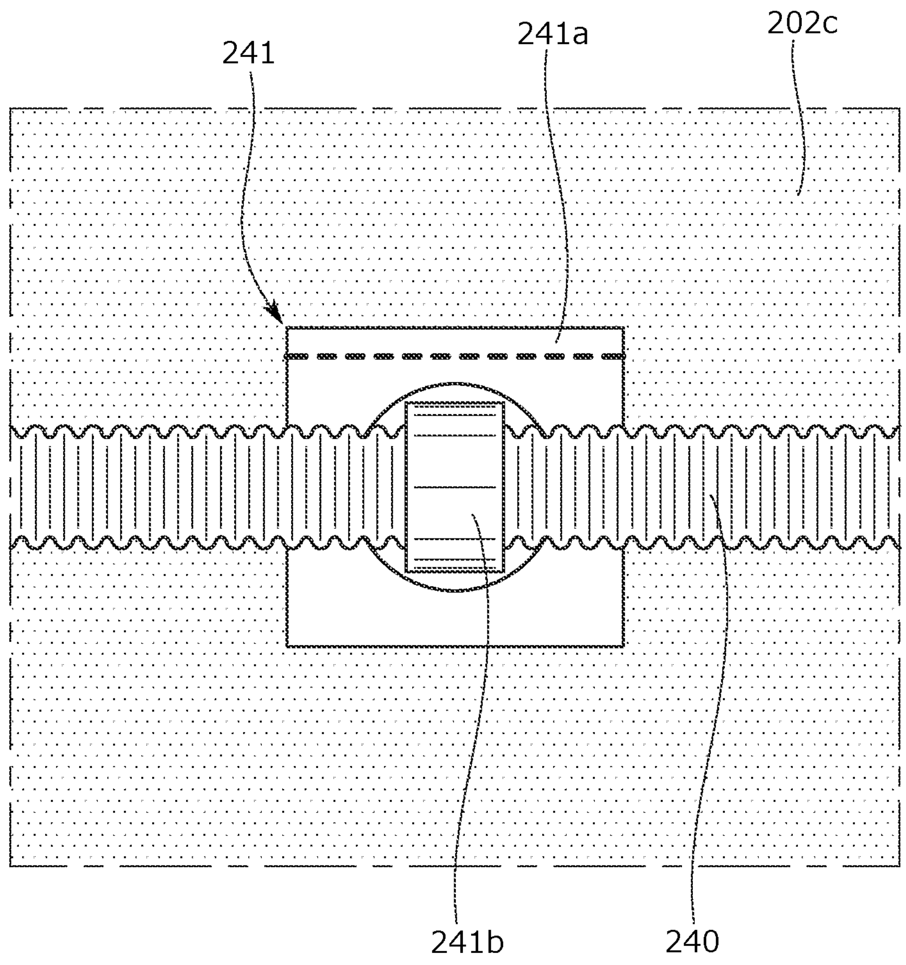
FIG. 36 is a view showing a harness attachment plate made of resin that is provided on the skin.

As shown in FIG. 36, a harness attachment plate 241 made of resin is provided on the back surface of the skin 202 of the third embodiment, and the harness 240 attached to the pad 210 can be fixed to a back surface 202*c* of the skin 202.

The harness attachment plate 241 includes an attachment portion 241*a* having a plate shape, and a holding portion 241*b* holding the harness 240 and connected to the attachment portion 241*a*.

The harness attachment plate 241 is fixed to the skin 202 by sewing. The sewing is one example, and the harness attachment plate 241 may be fixed to the back surface 202*c* of the skin 202 using an adhesive. By attaching the harness 240 to the back surface 202*c* of the skin 202, the wiring of the harness 240 and the attachment of the skin 202 can be performed at the same time, and the assembly man-hours can be reduced.

<Back Surface Material 242>

Figure 37:
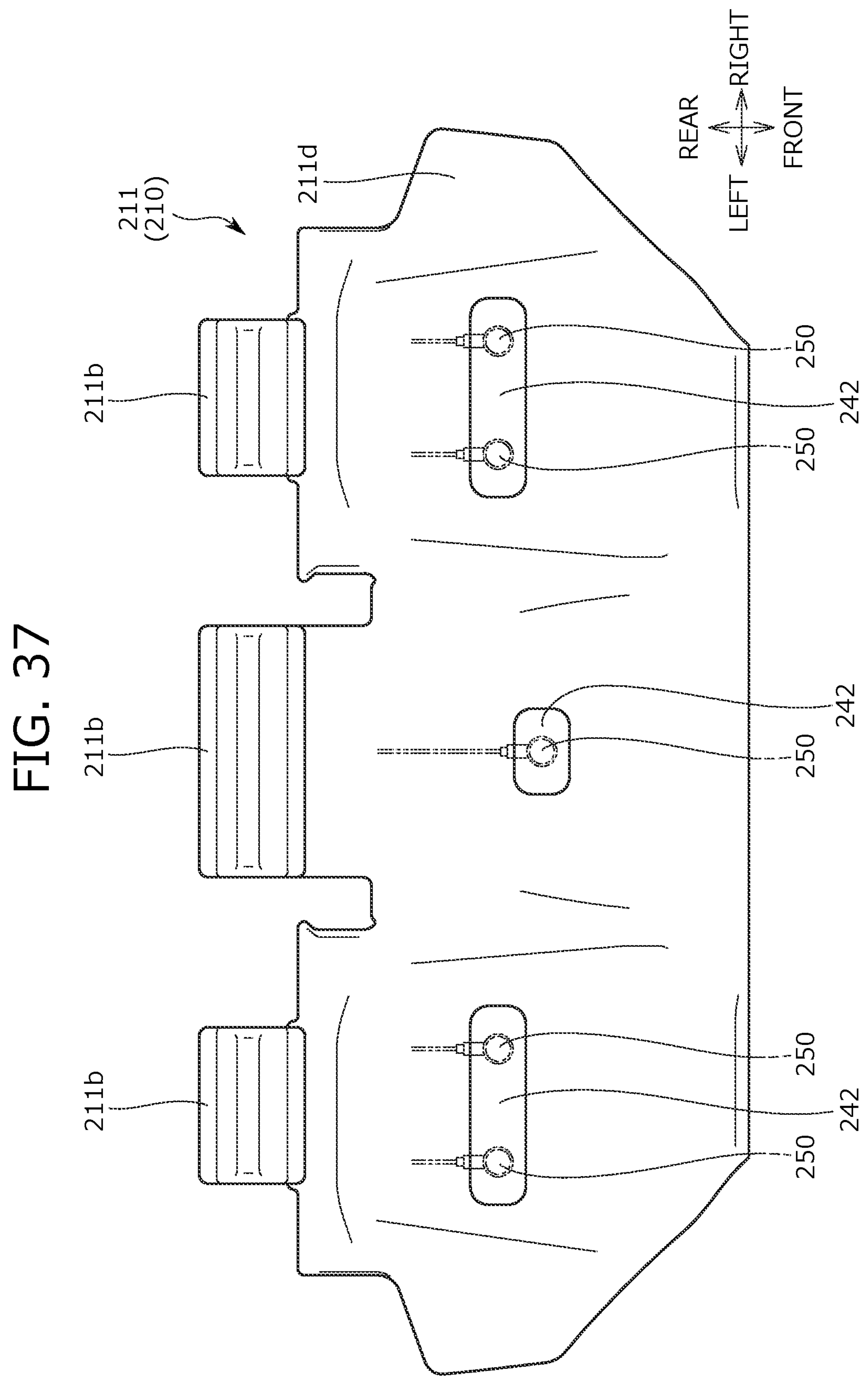
FIG. 37 is a bottom view showing a back surface of a first pad member, and is a view showing the position of a back surface material provided on the back surface of the first pad member.

As shown in FIG. 37, a back surface material 242 may be attached to the back surface 211*d* of the first pad member 211. The back surface material 242 is provided at a position where the back surface material 242 comes into contact with the detection sensor 250 of the second pad member 212 when the first pad member 211 is assembled to the second pad member 212.

By providing the back surface material 242 on the back surface 211*d* of the first pad member 211 at the position where the back surface material 242 comes into contact with the detection sensor 250, the transmission of a load to the detection sensor 250 is made better.

The back surface material 242 is made of, for example, a sheet material having elasticity, and for example, a resin sheet material made of polyvinyl chloride resin is used. The back surface material 242 may be woven fabric, knitted fabric, nonwoven fabric, or the like made of natural fibers or synthetic fibers. In addition, the back surface material 242 may be attached to the back surface 211*d* of the first pad member 211 using an adhesive or the like.

The third embodiment has been described above with reference to the drawings. Incidentally, the vehicle seat has been provided as one example of the conveyance seat of the present invention, and the configuration example has been described; however, the present invention is not limited to the vehicle seat mounted in a ground traveling conveyance including wheels, such as an automobile and a railway, and may be applied to a seat mounted in an aircraft, a ship, or the like moving in environments other than the ground.

Supplementary notes on the second embodiment will be provided as follows.

(Supplementary Note 1)

A conveyance seat including:

a seat pad;

a skin covering the seat pad; and an engaging member provided on the skin to be engageable or disengageable from the seat pad, wherein the engaging member includes an insertion portion insertable into the seat pad.

(Supplementary Note 2)

In the conveyance seat according to Supplementary Note 1, wherein a plurality of the insertion portions are provided on the engaging member, and the plurality of insertion portions include at least a first insertion portion disposed at one end portion of the engaging member, and a second insertion portion disposed at the other end portion located opposite to the one end portion.

(Supplementary Note 3)

In the conveyance seat according to Supplementary Note 1 or 2, wherein the insertion portion is formed in a protrusion shape.

(Supplementary Note 4)

In the conveyance seat according to Supplementary Note 3, wherein the engaging member has a flat plate shape, and the insertion portion protrudes from an end portion of the engaging member in an in-plane direction.

(Supplementary Note 5)

In the conveyance seat according to Supplementary Note 4, wherein a cut is formed on a surface of the engaging member facing a seat pad side.

(Supplementary Note 6)

In the conveyance seat according to any one of Supplementary Notes 1 to 5, wherein a hole portion or a cutout portion is formed in the engaging member.

(Supplementary Note 7)

In the conveyance seat according to any of Supplementary Notes 1 to 6, wherein a recess that engages with the engaging member is formed in the seat pad, and an inserted portion into which the insertion portion of the engaging member is inserted is formed on an inner wall of the recess.

(Supplementary Note 8)

In the conveyance seat according to Supplementary Note 7, wherein the recess is formed such that a width increases from an opening portion toward a bottom portion of the recess.

(Supplementary Note 9)

In the conveyance seat according to Supplementary Note 7 or 8, wherein a rigid portion having a higher rigidity than the seat pad is provided around the recess of the seat pad.

(Supplementary Note 10)

The conveyance seat according to any of Supplementary Notes 1 to 9 further including:

a seat back including the seat pad and the skin;

a seat cushion connected to a lower end portion of the seat back;

a headrest provided on an upper side of the seat back; and a seat frame forming a skeleton of the seat cushion and the seat back.

REFERENCE SIGNS LIST

<First embodiment>

| | |
|---|---|
| 1: | vehicle seat |
| 2: | seat back |
| 3: | seat cushion |
| 4: | headrest |
| 5: | seat cushion pad (seat pad) |
| 10: | first pad member |
| 11, 11A: | second through-hole |
| 12: | pull-in groove |
| 13: | pull-in hole |
| 14: | bulging portion |
| 20: | second pad member |
| 21, 21B: | first through-hole |
| 22: | opening portion (third through-hole) |
| 23, 23A, 23B: | protruding portion |
| 23a: | tip portion |
| 23b: | base portion |
| 24: | bent portion |
| 25: | elevated portion |
| 26: | guide groove |
| 28: | recess |
| 30: | skin |

-continued

| REFERENCE SIGNS LIST | |
|---|---|
| 31: | hole portion (locked portion) |
| 32: | pull-in portion (locked portion) |
| 41: | first pad-side mold |
| 42: | second pad-side mold |
| <Second embodiment> | |
| S: | vehicle seat (conveyance seat) |
| S1: | seat cushion |
| S2: | seat back |
| S3: | headrest |
| F: | seat frame |
| 101: | cushion frame |
| 102: | back frame |
| 103: | cushion side frame |
| 104a: | pan frame |
| 104b: | front pipe |
| 104c: | rear pipe |
| 105: | spring |
| 106a: | upper frame |
| 106b: | lower frame |
| 106c: | headrest guide |
| 107: | back side frame |
| 108: | pressure receiving plate |
| 109: | cushion pad (seat pad) |
| 110: | back pad (seat pad) |
| 111, 111A: | recess |
| 111a: | opening portion |
| 111b: | bottom portion |
| 112: | inner wall |
| 113: | inserted portion |
| 115: | lining (rigid portion) |
| 120: | skin |
| 120a: | surface |
| 120b: | back surface |
| 121: | skin groove |
| 122: | connecting member |
| 123: | attachment member |
| 130, 130A to 130F: | engaging member |
| 130a: | upper end |
| 130b: | lower end |
| 131, 131A to 131F: | insertion portion |
| 131a: | first insertion portion |
| 131b: | second insertion portion |
| 132: | cut |
| 133: | cutout portion |
| 134: | hole portion |
| <Third embodiment> | |
| SA: | vehicle seat |
| 201: | seat cushion |
| 202: | skin |
| 202a, 202b: | skin piece |
| 202c: | back surface |
| 203: | hooking hole |
| 204: | stitch line |
| 205: | seam |
| 210: | pad |
| 211: | first pad member |
| 211a: | pull-in groove |
| 211b: | attachment recess |
| 211c: | opening portion |
| 211d: | back surface |
| 212: | second pad member |
| 212a: | upper surface |
| 212b: | attachment protrusion |
| 212c: | anchor through portion |
| 220: | skin hooking portion |
| 221: | strut portion |
| 222: | claw portion |
| 222a, 222b: | corner |
| 223: | bracket |
| 223a: | insertion hole |
| 224: | clip |
| 225: | recess |
| 226: | through-hole |
| 229: | sensor accommodation recess |
| 230: | accommodation groove |

-continued

| REFERENCE SIGNS LIST | |
|---|---|
| 231: | groove body portion |
| 232: | groove extending portion |
| 233: | harness latch portion |
| 234: | projection portion |
| 234a: | upper surface |
| 235, 236: | recess |
| 237: | through-hole |
| 238: | release portion (finger insertion portion) |
| 240: | harness |
| 241: | harness attachment plate |
| 241a: | attachment portion |
| 241b: | holding portion |
| 242: | back surface material |
| 250: | detection sensor |
| 250a, 250b: | end portion |
| 251: | protruding portion |
| 252: | mat clip |
| 253: | attachment hole |
| 254: | coupler insertion portion |
| 260: | molding mold |
| 260a: | first mold |
| 260b: | second mold |
| 260c: | third mold |

The invention claimed is:

1. A conveyance seat, comprising:

a seat pad; and a skin covering the seat pad, wherein the seat pad includes a first pad member and a second pad member harder than the first pad member, the second pad member is provided with a protruding portion integrally formed with the second pad member to lock the skin, the skin is provided with a locked portion locked to the protruding portion, wherein a first through-hole is formed in the second pad member at a position adjacent to the protruding portion, and a second through-hole communicating with the first through-hole is formed in the first pad member.

2. The conveyance seat according to claim 1, wherein the locked portion of the skin is a hole portion into which the protruding portion is inserted.

3. The conveyance seat according to claim 1, wherein the protruding portion includes a bent portion bent at a tip.

4. The conveyance seat according to claim 1, wherein an elevated portion extending lower than the protruding portion is provided around the protruding portion of the second pad member.

5. The conveyance seat according to claim 1, wherein a thickness of a base portion of the protruding portion is larger than a thickness of a tip portion of the protruding portion.

6. The conveyance seat according to claim 1, wherein the locked portion of the skin is locked to the protruding portion through the first through-hole and the second through-hole.

7. The conveyance seat according to claim 1, wherein the first pad member is provided with a pull-in groove for pulling the skin, and the second through-hole is formed in the pull-in groove.

8. The conveyance seat according to claim 1, wherein a third through-hole having a width wider than a width of the first through-hole is formed in the second pad member, and the first through-hole is disposed at a position overlapping the third through-hole in a seat width direction.

9. The conveyance seat according to claim 1, further comprising:

a seat cushion including the seat pad and the skin;

a seat back including a seat back frame forming a skeleton and connected to a rear end portion of the seat cushion; and a headrest provided on an upper side of the seat back.

10. A conveyance seat, comprising:

a seat pad; and a skin covering the seat pad, wherein the seat pad includes a first pad member and a second pad member harder than the first pad member, the second pad member is provided with a protruding portion integrally formed with the second pad member to lock the skin, the skin is provided with a locked portion locked to the protruding portion, and wherein the locked portion of the skin is a hole portion into which the protruding portion is inserted.

11. A conveyance seat, comprising:

a seat pad; and a skin covering the seat pad, wherein the seat pad includes a first pad member and a second pad member harder than the first pad member, the second pad member is provided with a protruding portion integrally formed with the second pad member to lock the skin, the skin is provided with a locked portion locked to the protruding portion, and wherein the protruding portion includes a bent portion bent at a tip.

* * * * *